(12) United States Patent
Hubbell et al.

(10) Patent No.: US 9,227,568 B1
(45) Date of Patent: Jan. 5, 2016

(54) SYSTEM AND METHOD FOR MANAGING DRIVER SENSORY COMMUNICATION DEVICES IN A TRANSPORTATION VEHICLE

(71) Applicant: Spirited Eagle Enterprises, LLC, Rock Hill, SC (US)

(72) Inventors: Jerry K. Hubbell, Farmington, MI (US); Alan C. Lesesky, Charlotte, NC (US)

(73) Assignee: Spirited Eagle Enterprises LLC, Charlotte, NC (US)

( * ) Notice: Subject to any disclaimer, the term of this patent is extended or adjusted under 35 U.S.C. 154(b) by 142 days.

(21) Appl. No.: 13/770,609

(22) Filed: Feb. 19, 2013

Related U.S. Application Data

(63) Continuation-in-part of application No. 13/343,385, filed on Jan. 4, 2012.

(60) Provisional application No. 61/633,825, filed on Feb. 17, 2012, provisional application No. 61/685,707, filed on Mar. 22, 2012.

(51) Int. Cl.
| | |
|---|---|
| *B60R 1/00* | (2006.01) |
| *B60R 1/06* | (2006.01) |
| *B60R 1/08* | (2006.01) |
| *B62D 49/06* | (2006.01) |
| *G02B 5/10* | (2006.01) |

(52) U.S. Cl.
CPC . *B60R 1/081* (2013.01); *B60R 1/00* (2013.01); *B60R 1/006* (2013.01); *B60R 1/06* (2013.01); *B60R 1/0605* (2013.01); *B60R 1/08* (2013.01); *B62D 49/0614* (2013.01); *G02B 5/10* (2013.01)

(58) Field of Classification Search
CPC ...... B62D 49/0614; B60R 1/00; B60R 1/006; B60R 1/06; B60R 1/08; B60R 1/081; B60R 1/0605
USPC .......................... 359/507, 841, 862, 864, 866
See application file for complete search history.

(56) References Cited

U.S. PATENT DOCUMENTS

| | | | |
|---|---|---|---|
| 6,270,225 B1 * | 8/2001 | Goolsby | 359/866 |
| 6,398,377 B1 * | 6/2002 | Chou | 359/868 |
| 6,588,911 B1 * | 7/2003 | Martinez | 359/854 |
| 6,940,940 B2 | 9/2005 | Kranz | |
| 6,962,422 B1 * | 11/2005 | Englander | 359/864 |
| 2002/0163743 A1 * | 11/2002 | Lang et al. | 359/841 |
| 2004/0184168 A1 * | 9/2004 | Murray | 359/862 |
| 2004/0233284 A1 | 11/2004 | Lesesky et al. | |
| 2006/0132944 A1 * | 6/2006 | Matsuura et al. | 359/879 |
| 2011/0176232 A1 * | 7/2011 | Englander | 359/841 |
| 2014/0036366 A1 * | 2/2014 | van Velthuizen | 359/507 |

* cited by examiner

*Primary Examiner* — Mussa A Shaawat
*Assistant Examiner* — Thomas Ingram
(74) *Attorney, Agent, or Firm* — Schwartz Law Firm, P.C.

(57) ABSTRACT

A situation communication mirror is adapted for mounting to a transportation vehicle, such as a heavy duty tractor-trailer combination. The situation communication mirror comprises a rearward facing reflective member having at least three integrally-formed and arcuately distinct reflective surface areas. The first reflective surface area has a relatively slight curvature defining a relatively focused driver field of view. The second and third reflective surface areas each have an increased curvature as compared to the first surface area, and respectively define wider driver fields of view.

12 Claims, 60 Drawing Sheets

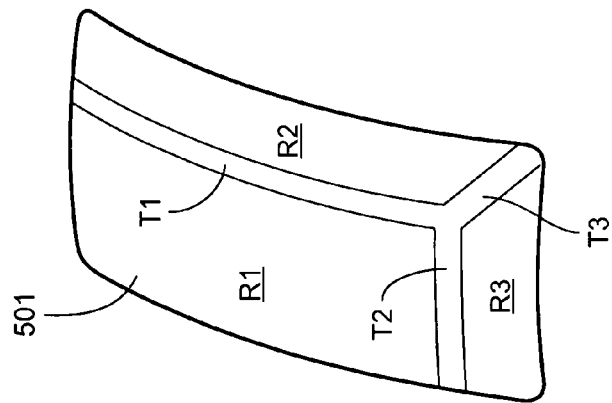
Fig. 59
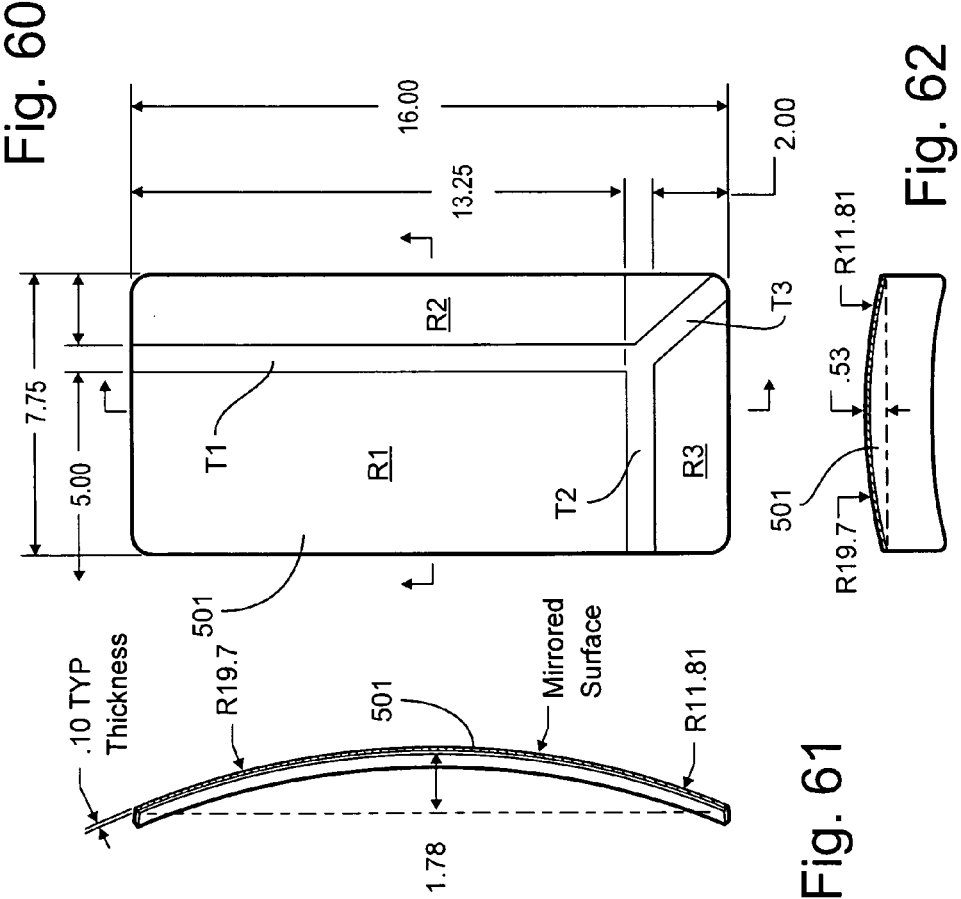
Fig. 60
Fig. 61
Fig. 62

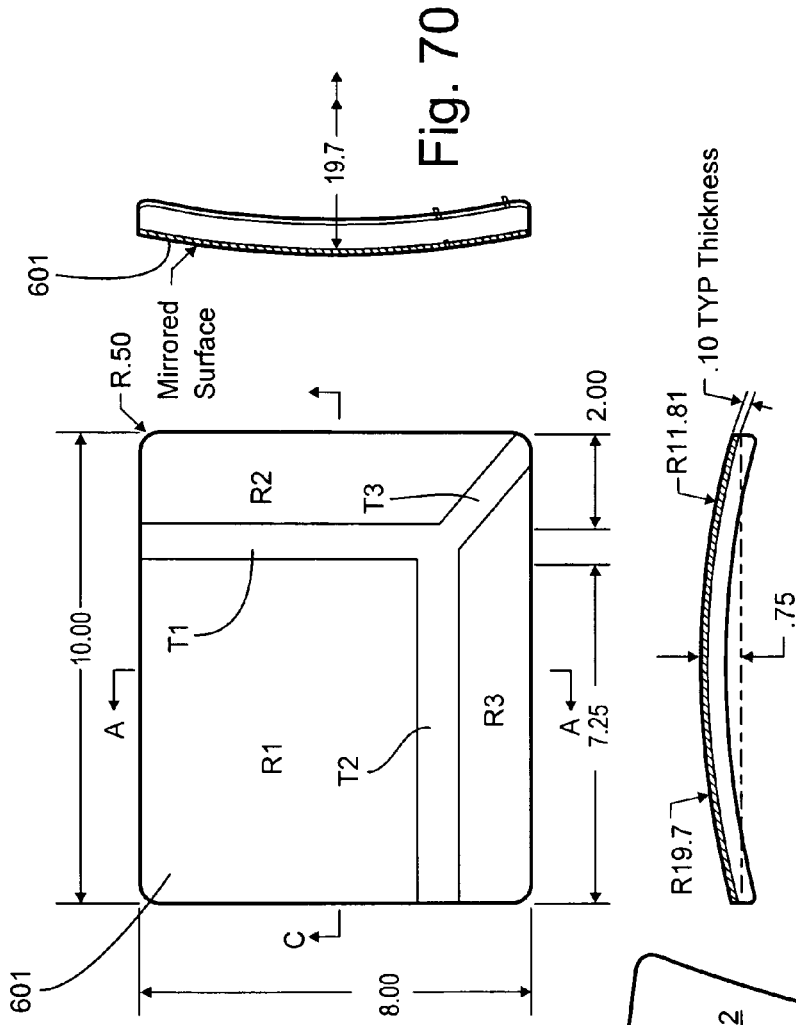
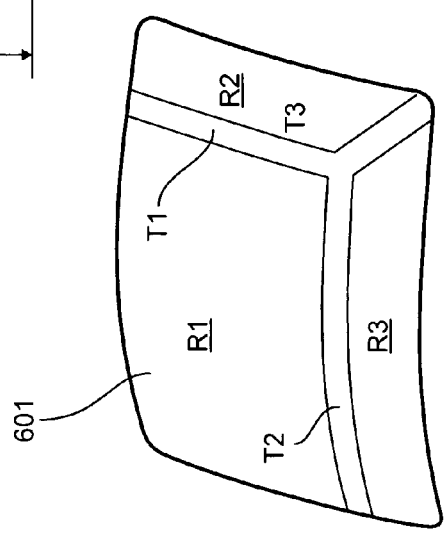
Fig. 70
Fig. 71
Fig. 69
Fig. 68

SYSTEM AND METHOD FOR MANAGING DRIVER SENSORY COMMUNICATION DEVICES IN A TRANSPORTATION VEHICLE

TECHNICAL FIELD AND BACKGROUND OF THE INVENTION

This disclosure relates broadly and generally to a system and method for enhancing driver situational awareness in a transportation vehicle. Other embodiments and implementations of the present disclosure may be applicable in completing visual systems and parts inspections, cargo inspections, trailer inspections, vehicle operation monitoring, security surveillance, driver performance monitoring, safety checks, and others—all done by the driver from within the cab or by an administrator from a remote location. The present example of the invention, discussed further herein, involves technology and methodology for enhancing driver situational awareness by increasing viewing areas within and surrounding the vehicle. The ability to "see" within and around the vehicle is of fundamental importance for any driver. This is particularly evident when lane changing/merging, turning and cornering, backing-up, starting forward movement, passing beneath overhead structures, and other such maneuvers.

Vision or "blind spot" problems in the heavy-duty trucking industry has resulted in action taken by the Technology and Maintenance Council (TMC) of the American Trucking Association (ATA). The TMC recently issued a position paper demanding that the industry improve the ability of drivers to see, and specified a minimum set of vision targets deemed essential. The Society of Automotive Engineers (SAE) Truck and Bus Council also established a Vision Task Force in the Human Factors Committee. While This Task Force upgraded SAE Standard J1750 with additional methodology to measure vision, it did not include the acceptance criteria requested by TMC. A Vision Task Force was therefore established in TMC to define the minimum viewable targets required to measure improved vision in heavy trucks. TMC issued Recommended Practice (RP-428) entitled "Guidelines for Vision Devices" after conducting a survey among drivers to determine the priority ranking of vision targets during specific driving maneuvers. The vision targets specified in RP-428 are illustrated in FIG. 1—at respective solid circular markers "M".

In various exemplary embodiments discussed herein, the present disclosure provides situation assessment tools applicable for allowing drivers to "see" (or sense) a broader area around and adjacent the vehicle—including the targets specified in RP-428. As described further herein, the disclosure utilizes various computer and communications technologies, electronics, sensors, controllers, and data buses to enhance driver situational awareness and situational understanding.

Vehicle Data Bus

In the heavy duty trucking industry, the Society of Automotive Engineers (SAE) has developed standards for the physical layer and data elements to be used for an onboard network. The SAE sought to establish this standard across all brands of heavy duty trucks—the original standard being recognized by two designators: J1708—the physical layer (i.e., twisted-pair wiring), and J1587—the message layer or data format. This standard was put into production, and included a specific diagnostic connector (commonly referred to as the 6-pin "Deutsch" connector) to be used on all heavy duty vehicles. This connector provided access to the vehicle bus along with battery power and ground connections with an option for a connection to a proprietary network that may be available on the vehicle.

One more recent standard (SAE J1939) customized the requirements for the physical connections and data elements to meet the requirements of the heavy duty vehicle environment. With J1939, data rates were now up to 250 Kbits/second and more control modules were supported in the network. J1939 also has its own unique connector—still called a Deutsch plug, but changed to 9-pins. The connector still has power, ground and J1708 connections in addition to the new J1939 wires. It also added the option for a second CAN connection for proprietary data networks. As new requirements are added for additional vehicle safety features such as body control modules, stability control and other third-party safety-system components, J1939 has continued to evolve and has been upgraded to a 500 Kbits/second network based on a new standard, J1939-14. Other exemplary interface standards include SAE J1850, SAE J1455, SAE J2497[PLC], RS232, OBD 2, CAN1 and CAN2.

SUMMARY OF EXEMPLARY EMBODIMENTS

Various exemplary embodiments of the present invention are described below. Use of the term "exemplary" means illustrative or by way of example only, and any reference herein to "the invention" is not intended to restrict or limit the invention to exact features or steps of any one or more of the exemplary embodiments disclosed in the present specification. References to "exemplary embodiment," "one embodiment," "an embodiment," "various embodiments," and the like, may indicate that the embodiment(s) of the invention so described may include a particular feature, structure, or characteristic, but not every embodiment necessarily includes the particular feature, structure, or characteristic. Further, repeated use of the phrase "in one embodiment," or "in an exemplary embodiment," do not necessarily refer to the same embodiment, although they may.

It is also noted that terms like "preferably", "commonly", and "typically" are not utilized herein to limit the scope of the claimed invention or to imply that certain features are critical, essential, or even important to the structure or function of the claimed invention. Rather, these terms are merely intended to highlight alternative or additional features that may or may not be utilized in a particular embodiment of the present invention.

In one exemplary embodiment, the present disclosure comprises a situation communication mirror (SCM) adapted for mounting to a transportation vehicle, such as a heavy duty tractor-trailer combination. The situation communication mirror comprises a rearward facing reflective member having at least three integrally-formed and arcuately distinct reflective surface areas. The first reflective surface area has a relatively slight curvature defining a relatively focused (but broad) driver field of view. The term "relatively focused" refers to a view having less visual distortion, as provided by a larger radius (i.e., less curved) reflective surface area. The second and third reflective surface areas each have an increased curvature as compared to the first surface area, and respectively define wide-angle fields of view. The term "wider" FOV refers to a view with potentially increased visual distortion resulting from a smaller radius (i.e., more curved) reflective surface area. Alternatively, a comparable wide FOV may be achieved utilizing mirror technology described in prior U.S. Pat. No. 8,180,606 entitled "Wide Angle Substantially Non-distorting Mirror". The complete disclosure of this prior patent is incorporated by reference herein.

As used herein, the term "rearward facing" refers to an object (e.g., video camera, mirror, other situation communication tool) oriented, pointed, or situated to capture or reflect a field of view which is generally to the rear of (or behind) the driver or other user. The term "forward facing" is the opposite of rearward facing, and refers to an object oriented, pointed, or situated to capture or reflect a field of view which is generally to the front of the driver or other user.

According to another exemplary embodiment, the first reflective surface area is greater in dimension than the second and third reflective surface areas.

According to another exemplary embodiment, the first reflective surface area extends substantially from a top edge of the reflective member towards a bottom edge of the reflective member.

According to another exemplary embodiment, the first reflective surface area further extends substantially from an inside edge of the reflective member towards an outside edge of the reflective member.

According to another exemplary embodiment, the first reflective surface area has a curvature radius in the range of 500 to 3000 mm.

According to another exemplary embodiment, the second reflective surface area comprises a longitudinal outside margin of the reflective member, and extends substantially from a top edge of the reflective member towards a bottom edge of the reflective member.

According to another exemplary embodiment, the second reflective surface area has a curvature radius in the range of 300 to 600 mm.

According to another exemplary embodiment, the third reflective surface area comprises a longitudinal bottom margin of the reflective member, and extends substantially from an inside edge of the reflective member towards an outside edge of the reflective member.

According to another exemplary embodiment, the third reflective surface area has a curvature radius in the range of 200-400.

According to another exemplary embodiment, the situation communication mirror is mounted to a body of the vehicle adjacent at least one of the driver and passenger side doors.

According to another exemplary embodiment, the situation communication mirror is mounted to a body of the vehicle adjacent at least one of the driver and passenger side fenders on opposite sides of the engine hood and in front of the vehicle cab.

In another exemplary embodiment, the present disclosure comprises a system and method for enhancing situational awareness of a vehicle driver, passenger, or remote user outside of the vehicle. The term "situational awareness" refers broadly herein to a knowledge, understanding, or consciousness of the state or condition of the environment, events, or circumstances within or around the transportation vehicle. The disclosure includes strategically locating a plurality of (digital or analog) sensory or "situation" communication devices on the vehicle. The sensory communication devices are operatively connected (e.g., wireless or hardwired) to a user network via an onboard access point. At least one of the sensory communication devices is activated upon a triggering event. A vehicle data signal comprising realtime vehicle information is transmitted from the activated sensory communication device to the user network. Using a computing device, a user accesses the network to receive the realtime vehicle information transmitted by the activated sensory communication device. In one exemplary embodiment, the sensory communication devices reside in a normal sleep mode, and awaken only upon occurrence of the predetermined triggering event. The triggering event may awaken only certain "targeted" (or user-specified) sensory communication devices.

The sensory communication devices (e.g., video cameras and/or reflective surfaces) may be strategically located within and about interior and exterior portions of the vehicle including, for example, inside and outside the vehicle trailer, the front grille, front and rear fenders, mirror housings, top of front windshield inside vehicle cab, top of roof outside vehicle cab, and other desired points. Infrared lighting may also be used in dark conditions.

According to another exemplary embodiment, the triggering event comprises at least one of a group consisting of activating a vehicle turn signal, activating headlights, turning a steering wheel of the vehicle, vehicle braking, vehicle acceleration, vehicle speed, airbag deployment, and vehicle collision.

According to another exemplary embodiment, the triggering event comprises moving the vehicle transmission to a predetermined gear (e.g., reverse, park, neutral, etc.).

According to another exemplary embodiment, the triggering event comprises the presence and detection of motion or obstacles in or around the vehicle. In this embodiment, the vehicle may include strategically located motion and distance sensors.

According to another exemplary embodiment, at least one of the sensory communication devices comprises a sensory or situation communication mirror (or SCM).

According to another exemplary embodiment, at least one of the sensory communication devices comprises a video camera.

According to another exemplary embodiment, at least one of the sensory communication devices comprises a microphone for transmitting realtime audible sound.

According to another exemplary embodiment, at least one of the sensory communication devices comprises a CCTV.

According to another exemplary embodiment, at least one of the sensory communication devices comprises an IP-based digital still camera.

According to another exemplary embodiment, the computing device comprises a Tablet computer with an integrated display screen and touchscreen interface.

According to another exemplary embodiment, the computing device comprises a web-enabled smartphone.

According to another exemplary embodiment, connecting the sensory communication devices comprises enrolling the sensory communication devices on the user network in a secured online user account.

According to another exemplary embodiment, the disclosure includes logging in to the user account via security password.

According to another exemplary embodiment, the disclosure comprises recording and storing the realtime vehicle information transmitted by the activated sensory communication device using an onboard network-attached digital video recorder.

According to another exemplary embodiment, the disclosure comprises recording and storing the realtime vehicle information transmitted by the activated sensory communication device using internal flash memory.

According to another exemplary embodiment, the disclosure comprises recording and storing the realtime vehicle information transmitted by the activated sensory communication device to a remote server (as in the case of IP cameras).

According to another exemplary embodiment, the activated sensory communication device is automatically selected without user intervention.

According to another exemplary embodiment, the disclosure comprises using Video Content Analysis (VCA) for automatically analyzing the realtime vehicle information transmitted by the activated sensory communication device.

According to another exemplary embodiment, the disclosure comprises combining a plurality realtime vehicle data signal feeds of respective user networks in a single networked multi-user system.

According to another exemplary embodiment, the activated sensory communication device utilizes facial recognition technology for automatically verifying a driver of the transportation vehicle.

According to another exemplary embodiment, the computing device comprises application software for enabling a dashboard-centric interface with tab icons for manually activating respective sensory communication devices on the user network, such that when the user selects a tab icon, the realtime vehicle information transmitted by the activated sensory communication device is output to the user.

According to another exemplary embodiment, the vehicle data signal accessed on the user network is encrypted using a cryptographic protocol.

According to another exemplary embodiment, the transportation vehicle comprises one selected from a group consisting of heavy duty tractors, trailers for heavy duty tractors, boat and other trailers, passenger vehicles, golf carts, all-terrain vehicles, recreational vehicles, military vehicles, trains, buses, aircraft, and watercraft.

In another exemplary embodiment, the disclosure comprises a computer-implemented system which utilizes a plurality of strategically located sensory communication devices for enhancing situational awareness in a transportation vehicle.

In yet another exemplary embodiment, the disclosure utilizes a plurality of strategically located sensory communication devices and comprises a computer program product including program instructions tangibly stored on a computer-readable medium and operable to cause a computing device to interface with the communication devices and perform a method for enhancing situational awareness in a transportation vehicle.

In still another exemplary embodiment, the disclosure utilizes a plurality of strategically located sensory communication devices and comprises a non-transitory computer-readable storage medium storing computer-executable instructions, executable by processing logic of a computing device, including one or more instructions, that when executed by the processing logic, cause the processing logic to interface with the communication devices and perform a method for enhancing situational awareness in a transportation vehicle.

In still another exemplary embodiment, the disclosure comprises an article of manufacture comprising a non-transitory computer-readable storage medium, and executable program instructions embodied in the storage medium that when executed by processing logic of a computing device causes the processing logic to perform a method for enhancing situational awareness in a transportation vehicle.

Exemplary Mobile Computing Device and Software

The exemplary mobile computing device utilized by drivers in the present disclosure may implement a computer program product (e.g., mobile app) comprising program instructions tangibly stored on a storage medium, and operable to cause a computing device to perform a method for enhancing situational awareness and situational understanding in a transportation vehicle. The present disclosure further comprises a computer-readable storage medium storing computer-executable instructions, executable by processing logic of a computing device, including one or more instructions, that when executed by the processing logic, cause the processing logic to perform a method for enhancing situational awareness and situational understanding in a transportation vehicle. In yet another exemplary embodiment, the present disclosure comprises an article of manufacture including a computer-readable storage medium, and executable program instructions embodied in the storage medium that when executed by processing logic of a computing device causes the processing logic to perform a method for enhancing situational awareness and situational understanding in a transportation vehicle.

The mobile computing device may incorporate or comprise any general or specific purpose machine with processing logic capable of manipulating data according to a set of program instructions. In one embodiment, the computing device comprises a mobile Tablet computer such as the iPAD®4 by Apple Inc using iOS 6.0. Exemplary product specifications for the iPAD®4 are copied below.

Display
  9.7-inch (diagonal) LED-backlit glossy widescreen Multi-Touch display with IPS technology
  2048 by 1536 (QXGA); 3.1 million pixels
  Fingerprint-resistant oleophobic coating
  Support for display of multiple languages and characters simultaneously
iPad 4 Processor
  Apple A6 Processor
  1.4 GHz Apple A6X ScO, quad-core PowerVR SGX554MP4 GPU
  iPad 4 Internal Memory/Storage Capacity
  For iPad Wi-Fi, iPad Wi-Fi+Celluar, and iPad WiFi+3G:
  16 GB, 32 GB, 64 GB, or 128 GB internal flash memory (or flash drive)
Wireless
  Wi-Fi (802.11a/b/g/n)
  Wi-Fi+Cellular
  Bluetooth 2.1+EDR technology The exemplary Tablet includes card slots for removable flash and SIM cards, and may have up to 128 GB of non-volatile internal memory. One or more of the flash and SIM cards and internal memory may comprise computer-readable storage media containing program instructions applicable for effecting the present method for enhancing situational awareness in a transportation vehicle, described further below. As generally known and understood in the art, the flash card is an electronic flash memory data storage device used for storing digital information. The card is small, re-recordable, and able to retain data without power. For example, Secure Digital (SD) is a non-volatile memory card format developed by the SD Card Association for use in portable devices. SD has an official maximum capacity of 2 GB, though some are available up to 8 GB or more.

The SIM card contains an integrated circuit that securely stores the service-subscriber key (IMSI) used to identify a subscriber on mobile devices including the exemplary Tablet. SIM hardware typically consists of a microprocessor, ROM, persistent (non-volatile) EEPROM or flash memory, volatile RAM, and a serial I/O interface, SIM software typically consists of an operating system, file system, and application programs. The SIM may incorporate the use of a SIM Toolkit (STK), which is an application programming interface (API) for securely loading applications (e.g., applets) or data to the SIM for storage in the SIM and execution by the mobile device. The STK allows a mobile operator (such as a wireless carrier) to create/provision services by loading them into the SIM without changing other elements of the mobile device. One convenient way for loading applications to the SIM is over-the-air (OTA) via the Short Message Service (SMS) protocol.

Secure data or application storage in a memory card or other device may be provided by a Secure Element (SE). The SE can be embedded in the logic circuitry of the Tablet (or other mobile device), can be installed in a SIM, or can be incorporated in a removable SD card (secure digital memory card), among other possible implementations. Depending on the type of Secure Element (SE) that hosts an applet, the features implemented by the applet may differ. Although an SE is typically Java Card compliant regardless of its form factor and usage, it may implement features or functions (included in the operating system and/or in libraries) that are specific to that type of SE. For example, a UICC (Universal Integrated Circuit Card) may implement features that are used for network communications, such as text messaging and STK, whereas in certain embedded SE devices, these features may not be implemented.

Additionally, to identify a user's Tablet (or other mobile device), a unique serial number called International Mobile Equipment Identity, IMEI, may be assigned to the device. As known by persons skilled in the art, IMEI is standardized by ETSI and 3GPP, and mobile devices which do not follow these standards may not have an IMEI. The IMEI number is used by the network to identify valid mobile devices. IMEI identifies the device, not the user (the user is identified by an International Mobile Subscriber Identity, IMSI), by a 15-digit number and includes information about the source of the mobile device, the model, and serial number.

Other features of the exemplary Tablet may include front-facing and rearm facing cameras, Dolby Digital 5.1 surround sound, video mirroring and video out support, built-in speaker and microphone, built-in 25-watt-hour rechargeable lithium-polymer battery, and sensors including three-axis gyro, accelerometer, and ambient light sensor. The audio playback of the fourth-generation iPad® has a frequency response of 20 Hz to 20,000 Hz The exemplary Tablet may also combine A-GPS and other location services including Wi-Fi Positioning System and cell-site triangulation, or hybrid positioning system. Mobile device tracking tracks the current position of a mobile device, even when it is moving. To locate the device, it must emit at least the roaming signal to contact the next nearby antenna tower, but the process does not require an active call. GSM localisation is then done by multilateration based on the signal strength to nearby antenna masts. Mobile positioning, which includes location based service that discloses the actual coordinates of a mobile device bearer, is a technology used by telecommunication companies to approximate where a mobile device and thereby also its user (bearer), temporarily resides.

The exemplary Tablet may incorporate a capacitive touchscreen. As generally know and understood in the art, capacitive touchscreens tend to be more accurate and responsive than resistive screens. Because they require a conductive material, such as a finger tip, for input, they are not common among (stylus using) Tablet PCs but are more prominent on the smaller scale Tablet computer devices for ease of use, which generally do not use a stylus, and need multi-touch capabilities. In alternative embodiments, the Tablet may comprise a resistive touchscreen. Resistive touchscreens are passive and can respond to any kind of pressure on the screen. They allow a high level of precision (which may be needed, when the touch screen tries to emulate a mouse for precision pointing, which in Tablet personal computers is common). Because of the high resolution of detection, a stylus or fingernail is often used for resistive screens. The exemplary touchscreen technology may also include palm recognition, multi-touch capabilities, and pressure sensitive films.

Referring to FIG. 2A, other software and hardware features of the exemplary mobile Tablet 10 include telematics (ICT) 11, cellular or satellite communication 12, wireless connectivity to remote cameras 13, GPS 14, heater pad 15, wireless speakers 16, voice activation 17, and two-way voice/data communication with corporate office 18. In an alternative embodiment, the present disclosure employs a cab-integrated computing device 20 (e.g., "carputer") illustrated in FIG. 2B comprising one or more of the above hardware and software features including wireless connectivity to video cameras 13, cell or satellite communication 12, two-way voice/data communication with corporate office 18, and further including data bus connections [SAE J1939 and J1455, RS 232, and powerline carrier (PLC)-21A-21D, respectively], right turn input 22, left turn input 23, head lamp input 24, vehicle door inputs 25, 12/24 volt DC 26, ND inputs 27, and USB ports 28. In this embodiment, the driver's Tablet computer may be "parked" (via data bus and other subsystem connections) inside the cab of the vehicle.

BRIEF DESCRIPTION OF THE DRAWINGS

Exemplary embodiments of the present invention will hereinafter be described in conjunction with the following drawing figures, wherein like numerals denote like elements, and wherein:

FIGS. 53 and 54 illustrate an alternative "hybrid" SCM, and software-enabled interface for managing the exemplary SCM;

FIGS. 59-62 are views of the exemplary side-mounted SCM reflective member;

FIGS. 68-71 are views of the exemplary fender-mounted SCM reflective member.

DESCRIPTION OF EXEMPLARY EMBODIMENTS AND BEST MODE

Figure 1:
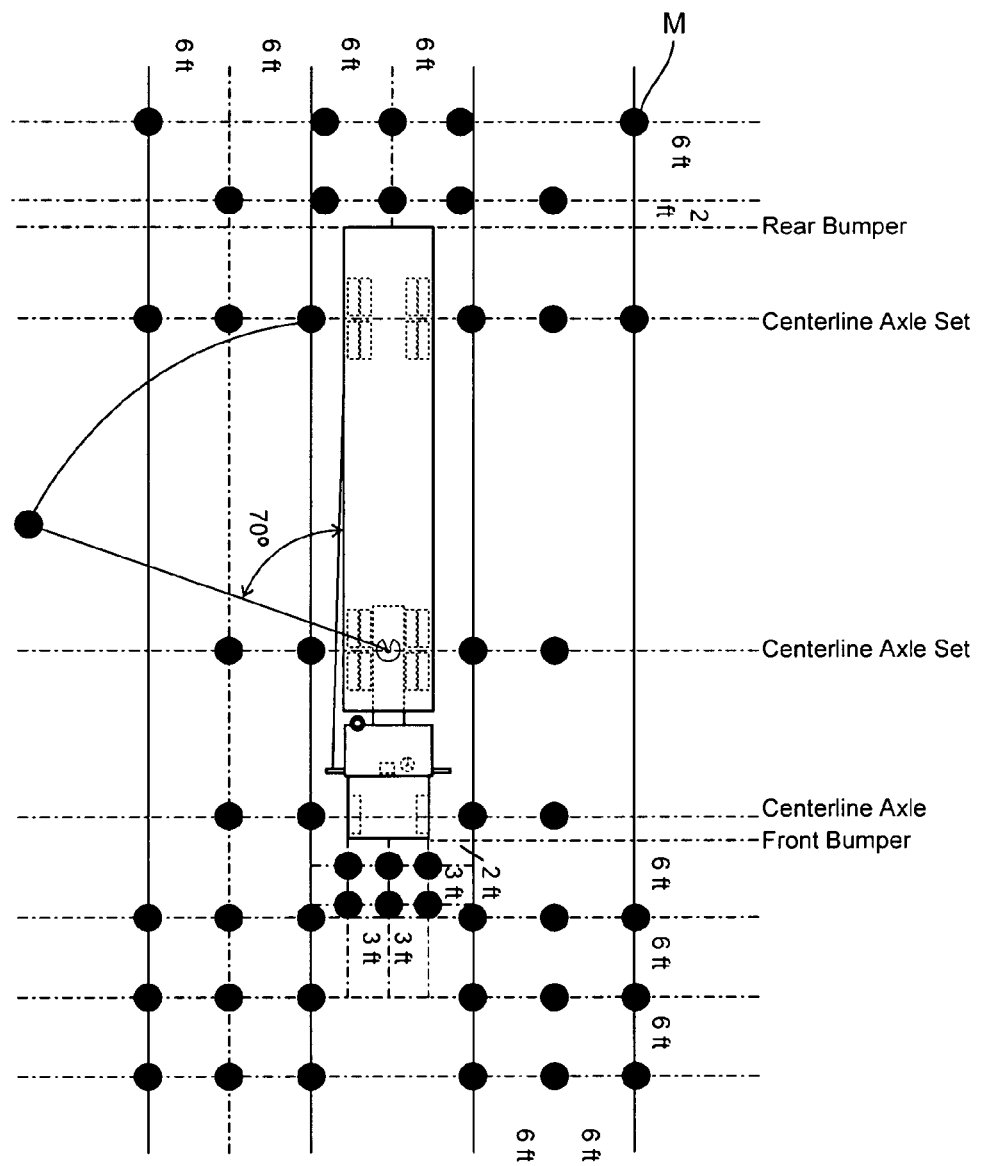
FIG. 1 illustrates vision targets specified in TMC Recommended Practice 428 entitled "Guidelines for Vision Devices"
Figure 2A:
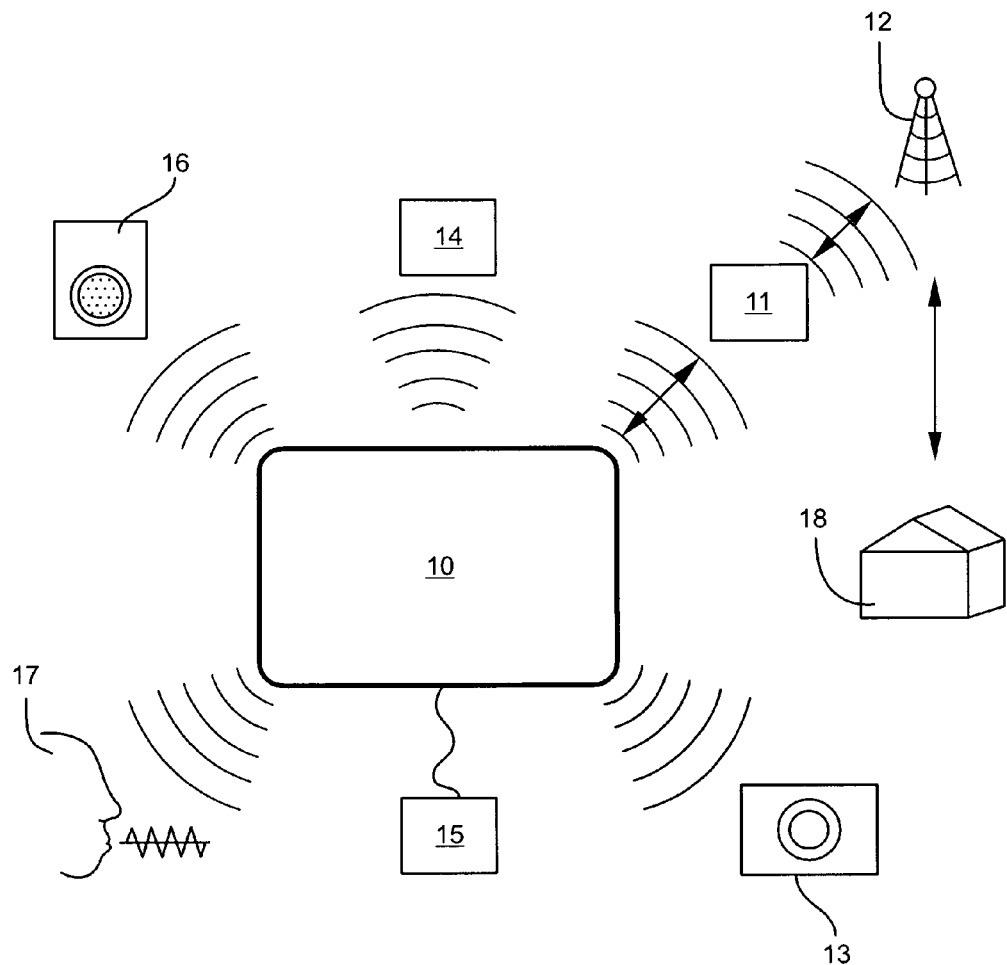
FIG. 2A is a schematic diagram illustrating various exemplary connections and features of a mobile Tablet computer adapted for use in the present disclosure.
Figure 2B:
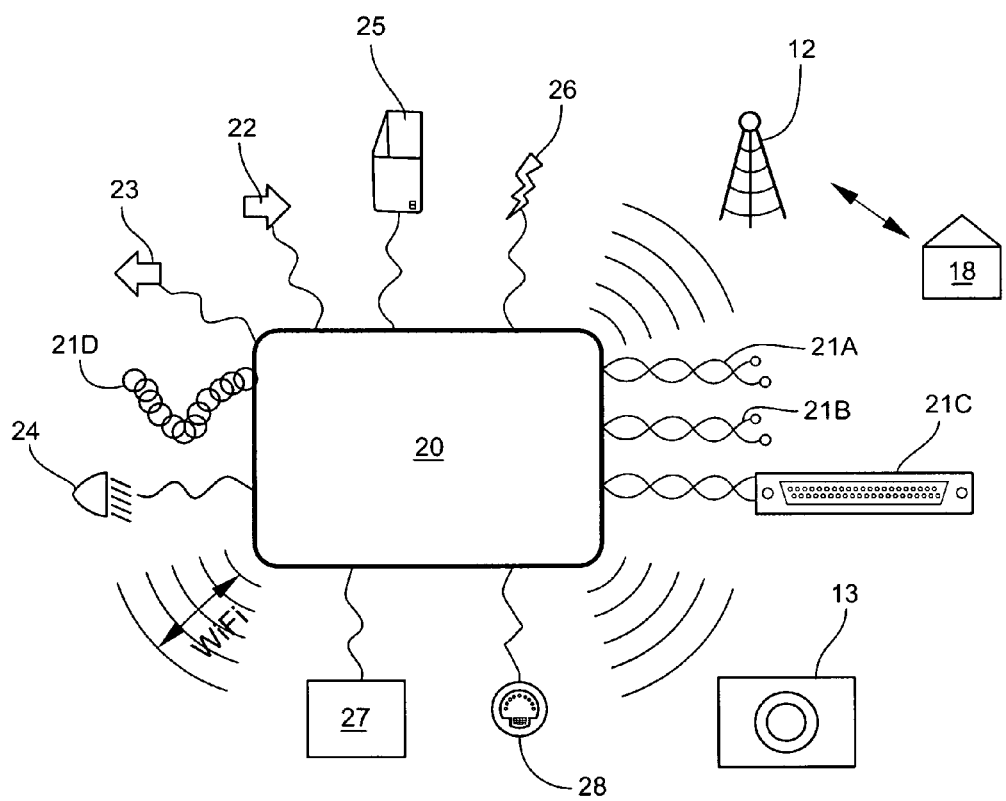
FIG. 2B is a further schematic diagram illustrating various exemplary connections and features of an alternative mobile Tablet computer (or cab-integrated computing device) "parked" inside a cab of the vehicle.

The present invention is described more fully hereinafter with reference to the accompanying drawings, in which one or more exemplary embodiments of the invention are shown. Like numbers used herein refer to like elements throughout. This invention may, however, be embodied in many different forms and should not be construed as limited to the embodiments set forth herein; rather, these embodiments are provided so that this disclosure will be operative, enabling, and complete. Accordingly, the particular arrangements disclosed are meant to be illustrative only and not limiting as to the scope of the invention, which is to be given the full breadth of the appended claims and any and all equivalents thereof. Moreover, many embodiments, such as adaptations, variations, modifications, and equivalent arrangements, will be implicitly disclosed by the embodiments described herein and fall within the scope of the present invention.

Although specific terms are employed herein, they are used in a generic and descriptive sense only and not for purposes of limitation. Unless otherwise expressly defined herein, such terms are intended to be given their broad ordinary and customary meaning not inconsistent with that applicable in the relevant industry and without restriction to any specific embodiment hereinafter described. As used herein, the article "a" is intended to include one or more items. Where only one item is intended, the term "one", "single", or similar language is used. When used herein to join a list of items, the term "or" denotes at least one of the items, but does not exclude a plurality of items of the list.

For exemplary methods or processes of the invention, the sequence and/or arrangement of steps described herein are illustrative and not restrictive. Accordingly, it should be understood that, although steps of various processes or methods may be shown and described as being in a sequence or temporal arrangement, the steps of any such processes or methods are not limited to being carried out in any particular sequence or arrangement, absent an indication otherwise. Indeed, the steps in such processes or methods generally may be carried out in various different sequences and arrangements while still falling within the scope of the present invention.

Additionally, any references to advantages, benefits, unexpected results, or operability of the present invention are not intended as an affirmation that the invention has been previously reduced to practice or that any testing has been performed. Likewise, unless stated otherwise, use of verbs in the past tense (present perfect or preterit) is not intended to indicate or imply that the invention has been previously reduced to practice or that any testing has been performed.

Situational Awareness, Assessment, and Understanding

In one exemplary implementation, the present disclosure utilizes various advancements in data communications, computers, electronics, and video technologies to enhance driver "situational awareness"—i.e., his/her perception of environmental elements with respect to time and/or space, the comprehension of their meaning, and the projection of their status after some variable, such as a predetermined event or change in time. Situational awareness (SA) involves being aware of what is happening in the vicinity, in order to understand how information, events, and one's own actions will impact goals and objectives, both immediately and in the near future. Lacking or inadequate situational awareness has been identified as one of the primary factors in accidents attributed to human error. Situational awareness is especially important in industries where the information flow can be quite high and poor decisions may lead to serious consequences. In short, SA involves "knowing what is going on around you so you can figure out what to do next."

Being aware of what is happening around you and understanding what the information means to you now and in the future, is the basis for situational awareness (SA). In the context of the present disclosure, situational awareness may be viewed as a state of knowledge, and situational assessment as the processes or "tools" used to achieve that knowledge. Situational understanding is the product of applying analysis and judgement to the situational awareness. Fleet drivers in the heavy-duty trucking industry are highly dependent on situational awareness. By uncovering how drivers think and operate, SA-oriented tools, vehicle design and training may help reduce human errors and minimize liability.

Figure 3:
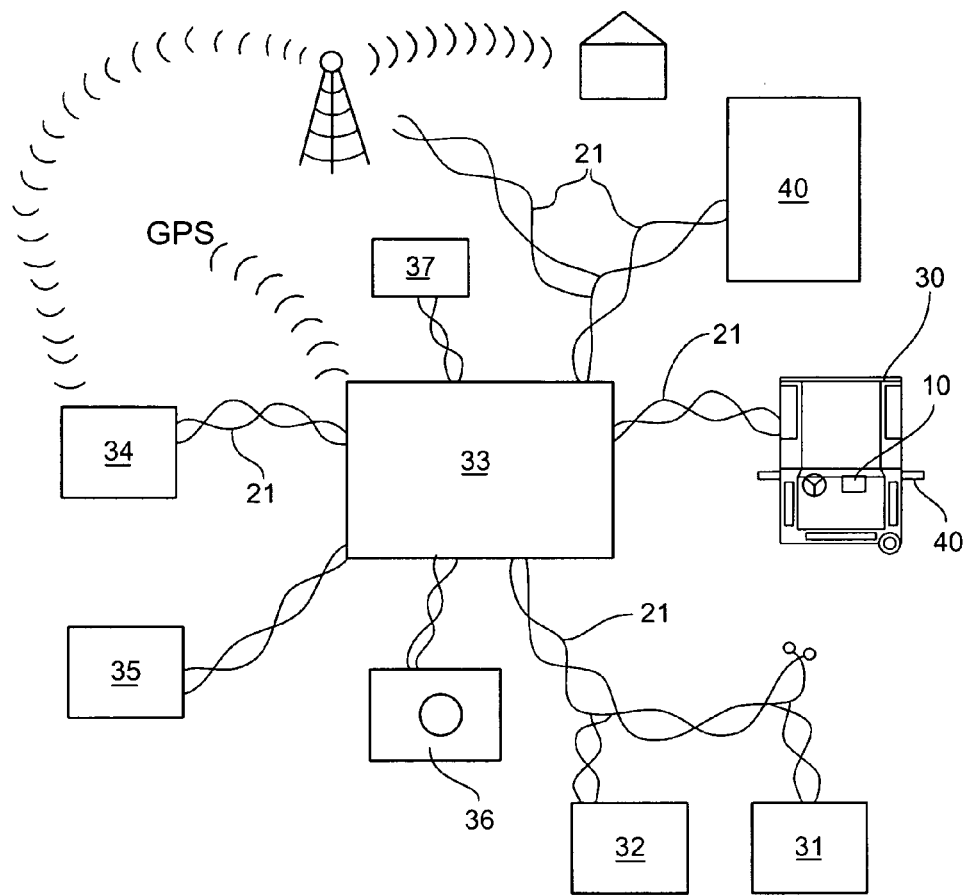
FIG. 3 is a schematic diagram illustrating various connections and features of exemplary driver-side and passenger-side situation communication mirrors ("SCMs") of the present disclosure.
Figure 4A:
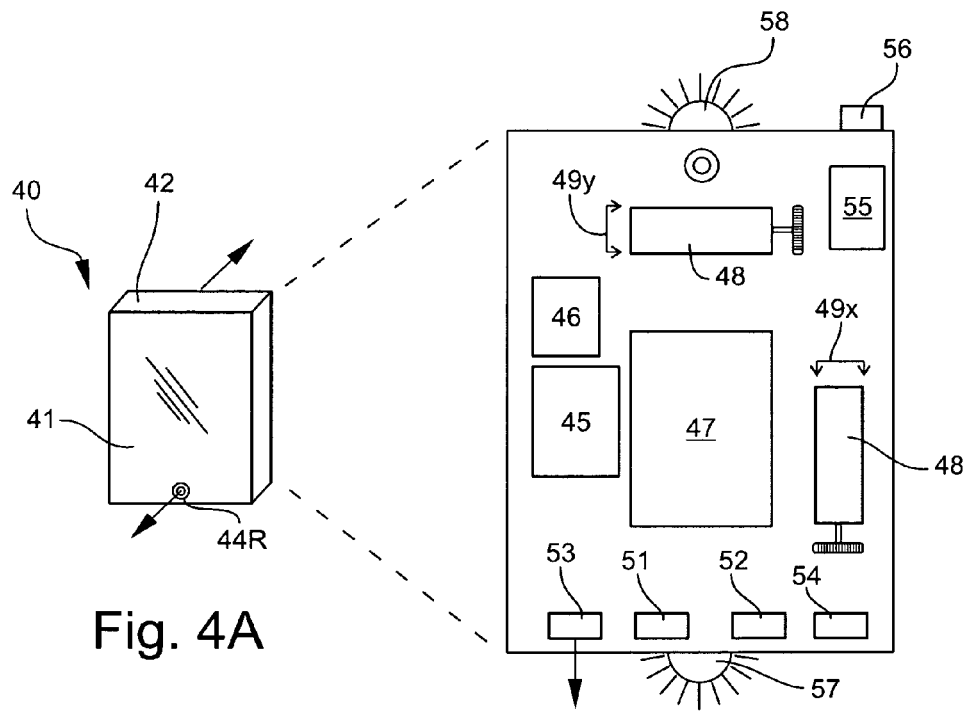
FIGS. 4A and 4B are respective front and rear views of the exemplary SCM with various internal components and electronics represented schematically.
Figure 4B:
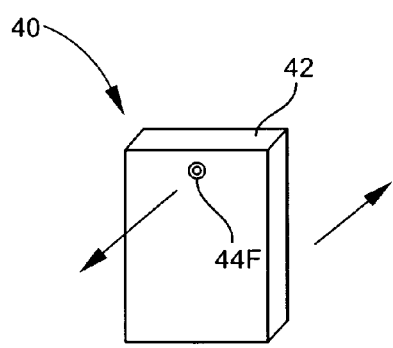

FIG. 3 illustrates exemplary components and features of the present disclosure in the field of heavy-duty transportation vehicles. The exemplary components and features function to enhance driver situational awareness through advanced and strategic situation assessment tools, and further to document and record situational understanding for subsequent analysis, judgement, evaluation, training, and the like.

The exemplary heavy-duty truck 30 comprises a number electronic subsystems including ABS 31, engine controller 32, and others, connected through the vehicle's data bus 21 (e.g., SAE J1939, SAE J1850, SAE J1708, OBD 2, and CAN) to an integrated onboard computing device 33 (or "Recorder") comprising a non-transitory data storage medium, transceiver and other electronics. The Recorder is further connected via data bus 21 to an onboard driver log box (EBOR) 34 with transceiver, other tractor-trailer subsystems 35, strategically arranged interior and exterior video cameras 36 ("Sensory Communication Devices" or "SCDs"), noise-cancellation sensors 37 and integrated exterior combination mirror-cameras 40 ("Sensory Communication Mirrors" or "SCMs"). The Sensory Communication Mirrors 40, described further below, may comprise one or more integrated video cameras, microphones, and other electronics and sensors operatively connected (via built-in Wi-Fi, Bluetooth, or other wireless standard) to a driver's Tablet computer 10. As previously described above, the exemplary Tablet 10 may include a capacitive touchscreen display (interface), processor, internal flash memory, and more. The Tablet 10 may also comprise suitable application software for enabling a dashboard-centric interface with touchscreen tab icons. One commercially available Tablet is the iPad®4 by Apple.

Time stamped vehicle data is captured and stored by the integrated Recorder at predetermined intervals (e.g., every 1 to 30 mins). Examples of vehicle data include travel speed, engine RPM, engine temperature, tire pressure, ABS status/condition, transmission data, vehicle location (via GPS), and event-actuated video and audio clips. In the event of an accident or collision, the vehicle data stored by the Recorder can be analyzed to help determine/evaluate the driver's situational awareness and understanding, and the relative effectiveness of various situational assessment tools (e.g., the integrated mirror-cameras and strategically arranged video cameras) under the given circumstances. The onboard driver log (EBOR) data is also stored by the Recorder, and can be transmitted periodically or on-demand back to a home office through cellular or satellite communications.

Examples of vehicle data communications technologies and applications in the heavy-duty trucking industry are described in prior U.S. Pat. Nos. 8,276,996, 8,232,871, 7,967,396, 7,817,019. Prior U.S. Pat. No. 8,032,277 describes a system and method for driver activity and vehicle operation logging and reporting. The collective disclosures of all of these prior publications are incorporated by reference herein.

Exterior Situation Communication Mirrors (SCMs)

Referring to FIGS. 4A, 4B, and 5-8, the exemplary sensory communication devices described herein may include sensory or "situation" communication mirrors (SCM's) 40. The exemplary driver side and passenger side SCMs 40 function to increase the driver's rearward and forward facing view ranges, as demonstrated in FIGS. 7 and 8, respectively. In the exemplary embodiment, the SCMs 40 are adjustably mounted to the vehicle body on both driver and passenger sides of the cab, and comprise respective reflective members (surfaces) 41 formed by polished metal or glass. Each SCM 40 comprises a robust protective housing 42 incorporating forward and rearward facing video cameras 44F and 44R, microphones 45, speakers 46, electronic control unit (ECU) 47, electric motors 48, encoders 49X and 49Y, wash and dry solenoids 51, 52, road and ambient temperature sensors 53, 54, heating element 55, transceivers and other electronics [not shown]. The encoders (or transducers—optical or magnetic) sense the position and orientation of the SCM for use as a stored reference for the particular driver, as discussed further below. The encoders may be rotary or linear, and either absolute or incremental. Other electronics may include a compressor for encoding data (e.g., audio/video/images) into a smaller form; an audio encoder capable of capturing, compressing and converting audio; a video encoder capable of capturing, compressing and converting audio/video; and a multiplexer capable of combining multiple inputs into one output. The SCM housing may further incorporate turn signal 56, step 57, and marker 58 lamps; and analog to digital (A/D) ports and digital input/output (I/O) ports [not shown].

The exemplary rearward and forward facing video cameras may comprise wireless centralized or decentralized IP cameras (with 2-way audio), wireless or hardwired CCTV video cameras, digital still cameras, and the like adapted for capturing audio, video, and imagery data in and around the vehicle. The video cameras may be web-enabled, and may comprise transceivers and flash memory for software upgrades, troubleshooting, and the like. Each of the video cameras may be operatively aligned or "paired" with the vehicle data bus, and may be synched as discussed further below with the driver's mobile computing device (e.g., Tablet computer) to display live video on the Tablet's display screen. Although the discussion below refers to the driver's Tablet computer or simply "Tablet", it is understood that the inventions, concepts and features of the present disclosure maybe applicable to, or enabled by, any suitable computing device including, for example, smartphones, netbook computers, laptop computers, ultra mobile PCs, PDAs, Internet tablets (PDA with web browser), and the like. Additionally, the SCM's may incorporate other situation assessment tools including, for example, closed circuit digital photography (CCDP) and other IP-based digital still cameras.

Wireless data connections used by the SCDs (including SCMs), vehicle, and driver's Tablet may comprise one or more of cellular, Wi-Fi, Bluetooth, or satellite technologies; or a combination of networks from multiple cellular networks; or a mix of cellular, Wi-Fi and satellite. When using a mix of networks, the present disclosure may comprise a mobile virtual private network (mobile VPN) to handle security concerns, to perform network logins, and to maintain application connections to prevent crashes or data loss during network transitions or coverage loss. Cellular data service uses technologies such as GSM, CDMA or GPRS, and 3G and 4G networks such as W-CDMA, EDGE or CDMA2000. These networks are usually available within range of commercial cell towers. Wi-Fi connections may be either on a private business network or accessed through an access point (or "hotspot"), and have a typical range of from 100 feet up to 1000 feet. Satellite Internet access covers areas where cellular and Wi-Fi are not available, and may be set up anywhere the driver has a line of sight to the satellite's location.

The SCM reflective member (e.g., mirror) may be adjustably mounted within the exterior housing, and operatively controlled by the ECU, encoders and DC motors ("drive means") to vary its orientation as desired by the driver. In one exemplary implementation, a position sensor produces a signal indicating an actual orientation of the reflective member. The ECU may comprise means for storing a value indicating a pre-selected orientation for the reflective member, and means for comparing this value with the signal from the position sensor to produce a control signal for the drive means. The DC motors vary the orientation of the reflective member about horizontal and vertical axis, respectively. Each of the motors may be coupled to drive respective potentiometers arranged to provide an analogue voltage indicating the orientation of the reflective member about the corresponding axis. The two potentiometers are connected to respective analogue inputs of the ECU. The exemplary ECU may further comprise first and second power outputs which can supply energizing voltages of either polarity to the DC motors to cause rotation in either direction, together with a single polarity output which may be connected to the heat element for demisting and/or defrosting the reflective member. The driver may store in his computer Table (and/or ECU) any number of desired pre-selected orientations for the reflective member of each SCM. One example of an adjustable mirror assembly for a motor vehicle is described in prior U.S. Pat. No. 4,871,953. The complete disclosure of this patent is incorporated by reference herein.

In addition to the above, each SCM comprises one or more wash and dry nozzles operatively connected to respective flexible lines (e.g., rubber tubes, hoses and channels) running from the SCMs to the engine compartment of the vehicle, and adapted for cleaning and drying the reflective members. The wash nozzle at each SCM is fluidly coupled to a washer reservoir with an attached electrical washer pump. The washer pump is activated by the driver (or other user within or outside the vehicle) from the Tablet computer. When activated, as discussed further below, the windshield washer pump draws stored wash fluid from the reservoir into the pump, pressurizes the fluid and injects it through the lines to the washer nozzle at the selected SCM. A solenoid valve in the washer fluid line controls where the washer fluid is delivered—either the driver side SCM or the passenger side SCM. The dry nozzles connect in a similar manner through flexible lines to a blower fan (or other source) located in the engine compartment. Using the driver's Tablet computer, the user touches one of the two onscreen SCMs icons thereby commanding the selected solenoid valve to open for a predetermined time (e.g., 10 secs.). The blower fan directs heated or ambient air through the flexible line and opened valve to the selected dry nozzle pointed toward the reflective member of the SCM.

Figure 5:
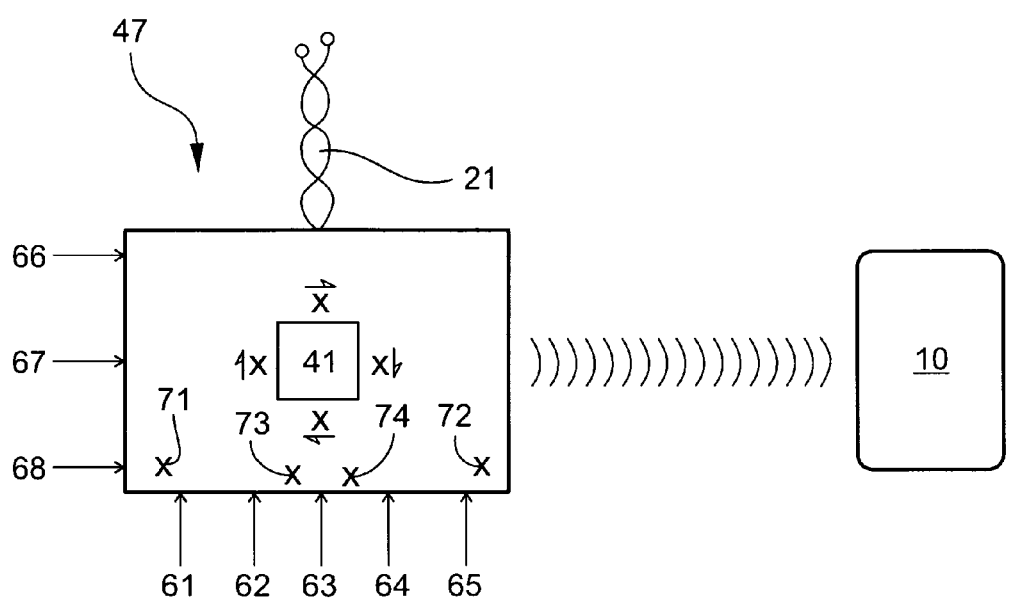
FIG. 5 is a schematic view of the electronic control module (ECU) housed inside the exemplary SCM.
Figure 6:
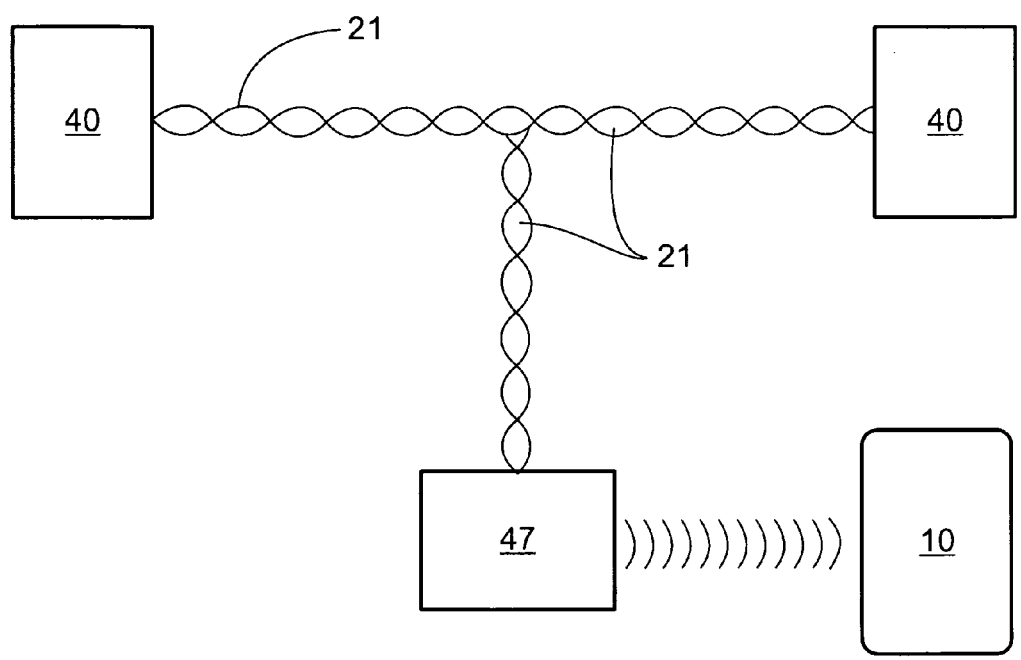
FIG. 6 is a schematic view illustrating an alternative cab-integrated ECU connected to each of the SCMs via the vehicle data bus, and wirelessly to the driver's Tablet computer or other onboard or remote computing device.

In the present context, the electronic control unit (ECU) 47 refers broadly to any embedded system (e.g., microprocessor or data processor) that controls one or more of the electrical systems or subsystems of the SCM 40. As illustrated in FIG. 5 the exemplary ECU connects to the vehicle data bus 21 and to the driver's Tablet computer 10 (or other onboard or remote computing device) via Wi-Fi, Bluetooth, Wave, or related wireless standards. The exemplary ECU comprises inputs for +12/24 volts 61, -ground 62, heat 63, step lamp 64, marker lamp 65, left turn 66, head lamp 67, right turn 68, and other electronics including left and right mirror controls 71, 72, and surface wash and dry controls 73, 73. In an alternative embodiment shown in FIG. 6, the ECU 47 is cab-integrated and connects to each of the SCMs 40 via the data bus 21, and to the driver's Tablet computer 10 (or other integrated onboard or remote computing device) by Wi-Fi, Bluetooth, Wave, or the like. In either case, ECU 47 functions include controlling orientation of the reflective members 41 (e.g., in, out, up, down), and operation of the wash and dry systems, lamp activation, and others.

Figure 7:
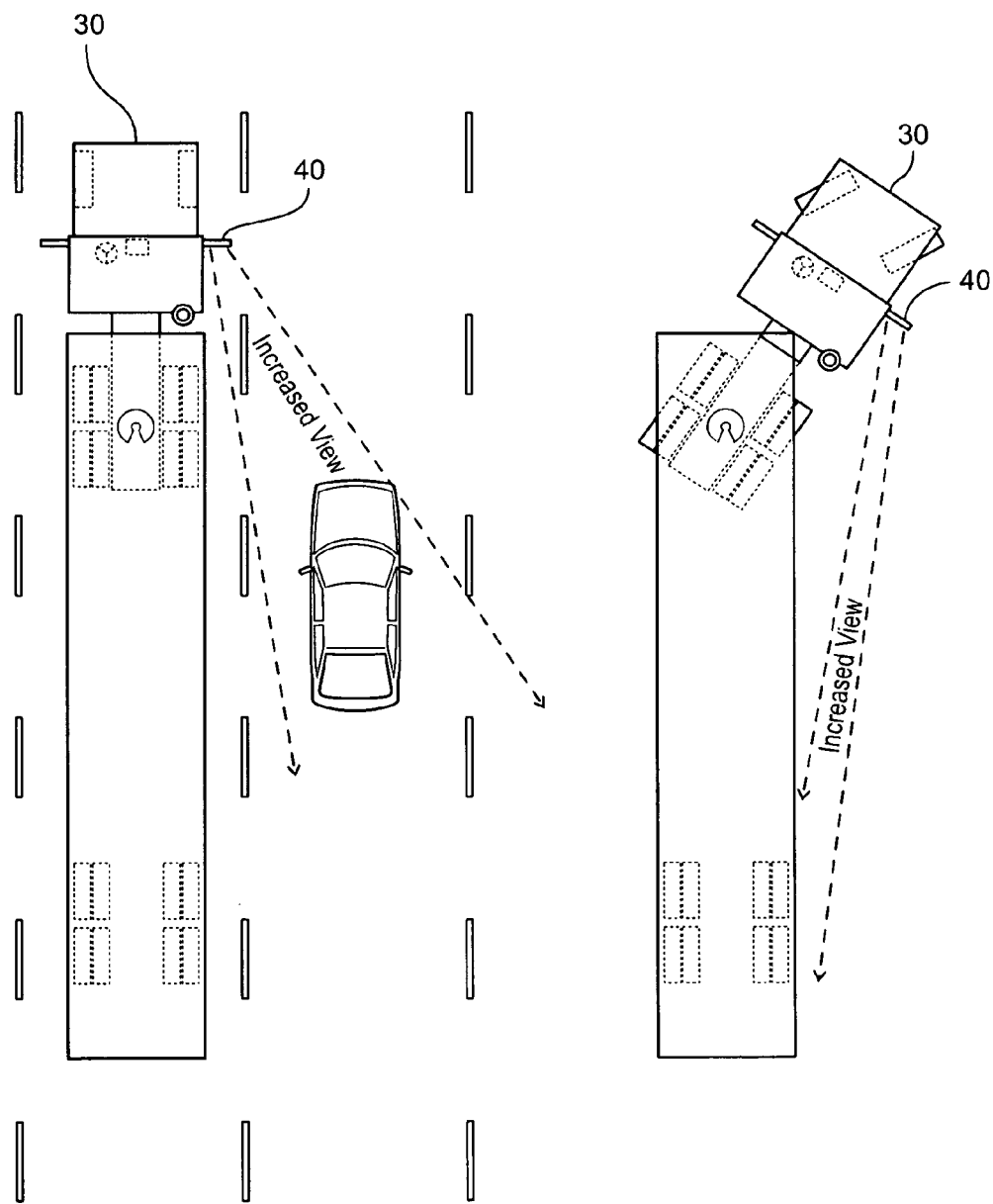
FIGS. 7 and 8 are schematic views demonstrating an increased view range of the driver utilizing the exemplary SCMs of the present disclosure.
Figure 8:
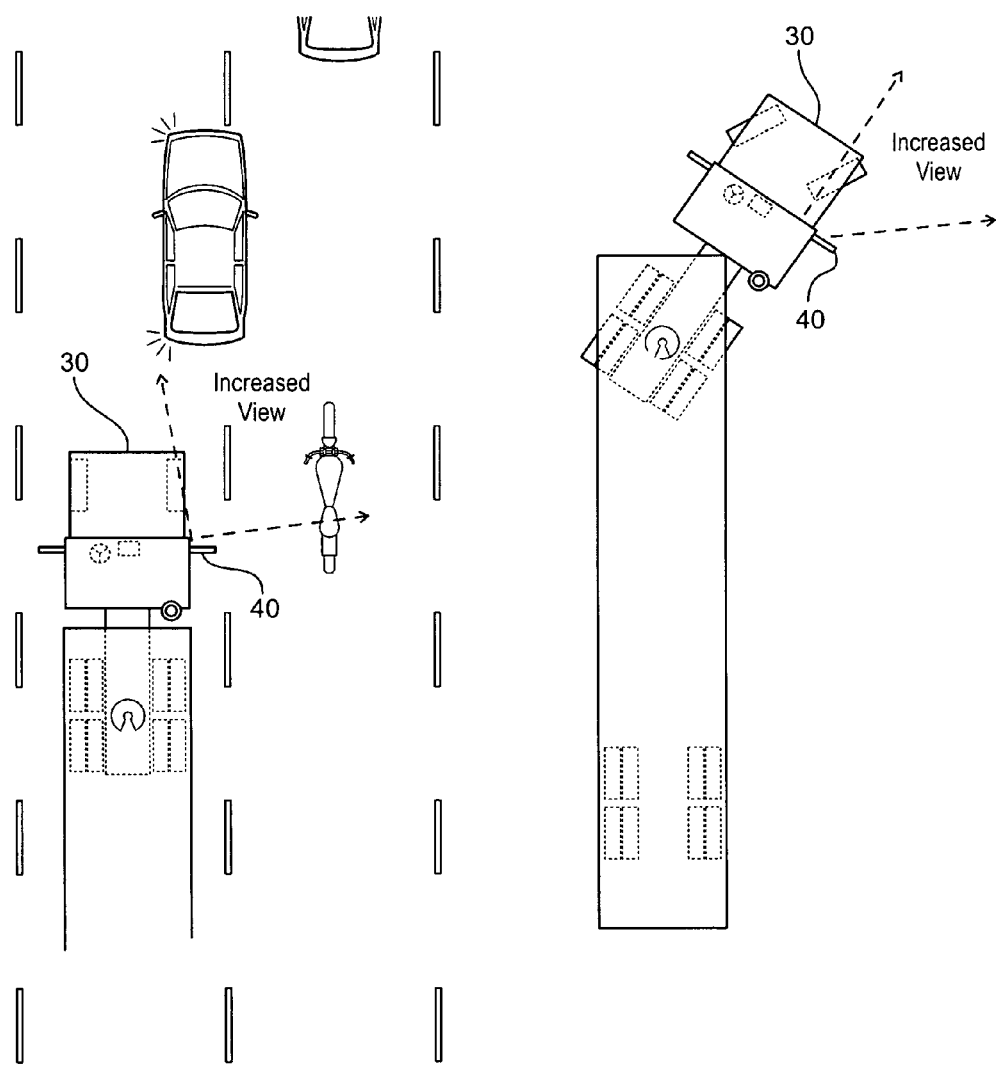

FIGS. 7 and 8 demonstrate the increased forward and rearward view ranges utilizing the present driver side and passenger side SCMs 40 and Tablet 10 (or cab-integrated) display in a combination tractor-trailer vehicle 30. In FIG. 7, vehicles utilizing the exemplary SCMs 40 have an increased view range of the right side of the trailer. When traveling straight (forward), the driver has an increased rearward-facing view range of the righthand lane, and can see where other vehicles are located in relation to the tractor-trailer. When making a righthand turn, the driver has an increased view range (using camera display) of the bogie wheels. This increased range will also allow the driver to see any obstacles in the relation to the rear of the trailer and wheels. As demonstrated in FIG. 8, tractor-trailer vehicles utilizing the present driver side and passenger side SCMs also have an increased view range of the front fender area. For example, when traveling straight (forward) the driver has an increased forward-facing view range of the righthand lane and on-ramps in front of vehicle, and can see where other vehicles are located in the relation to the tractor. When making a righthand turn, the drive may also have an increased forward-facing view range of the right front fender area.

Figure 9:
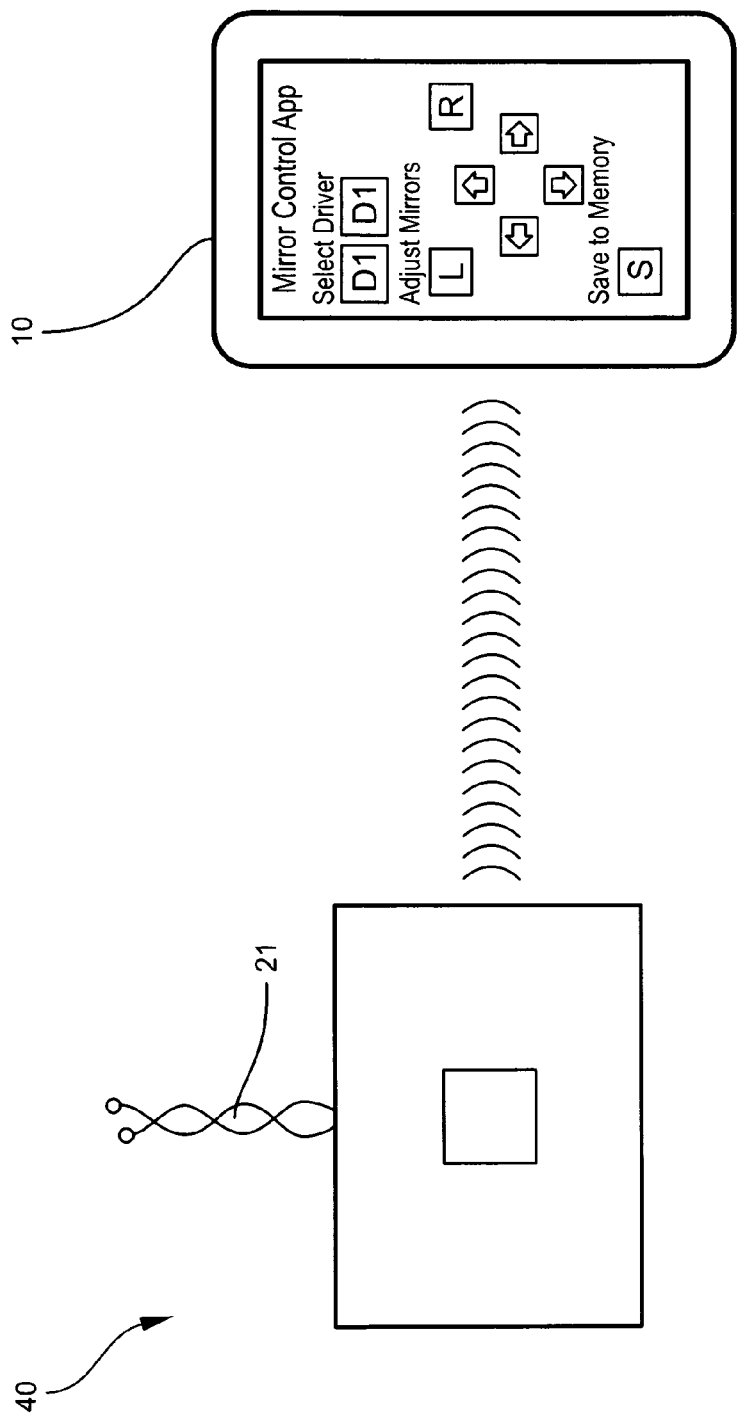
FIGS. 9 and 10 illustrate respective touchscreen user interfaces enabled by the present Tablet computer for transmitting control commands to the ECU of the SCM.
Figure 10:
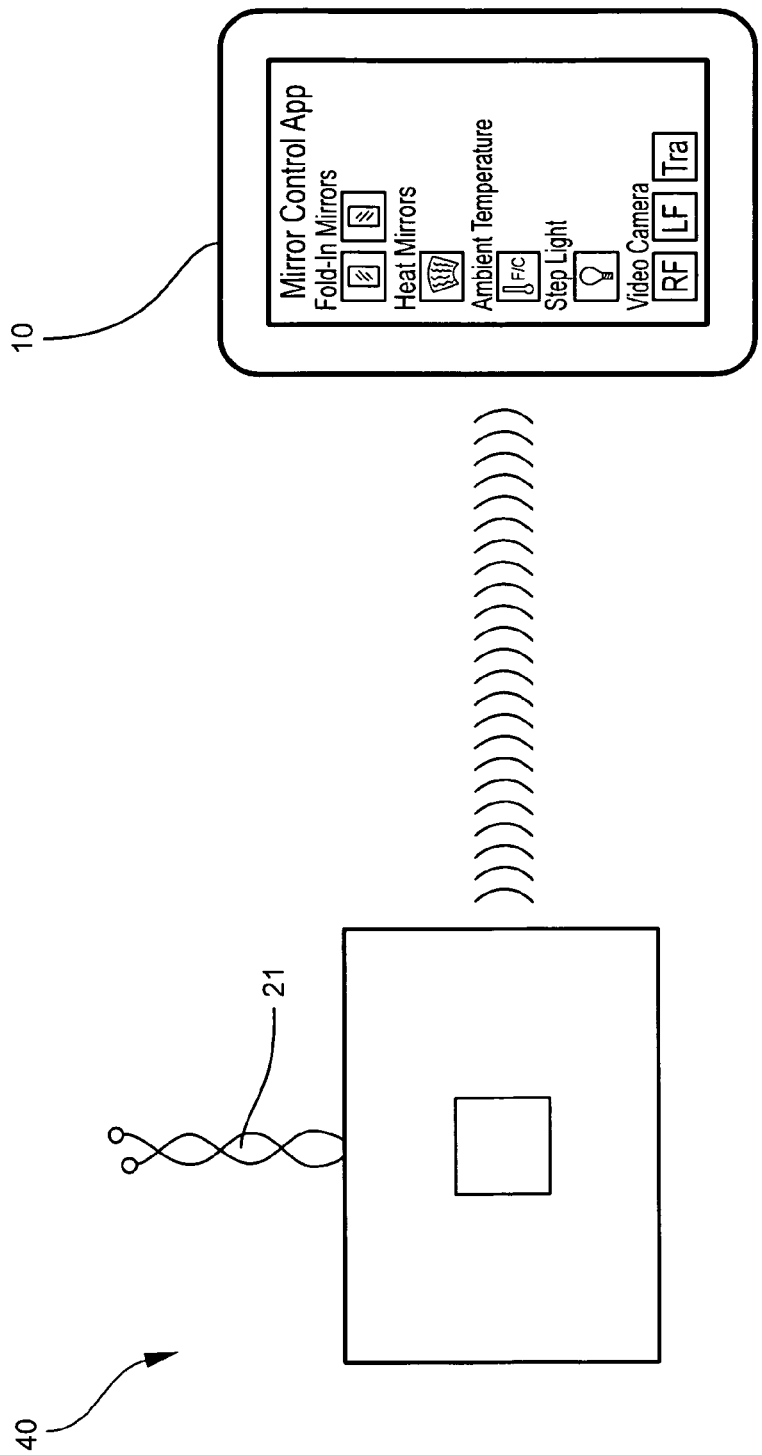
Figure 11:
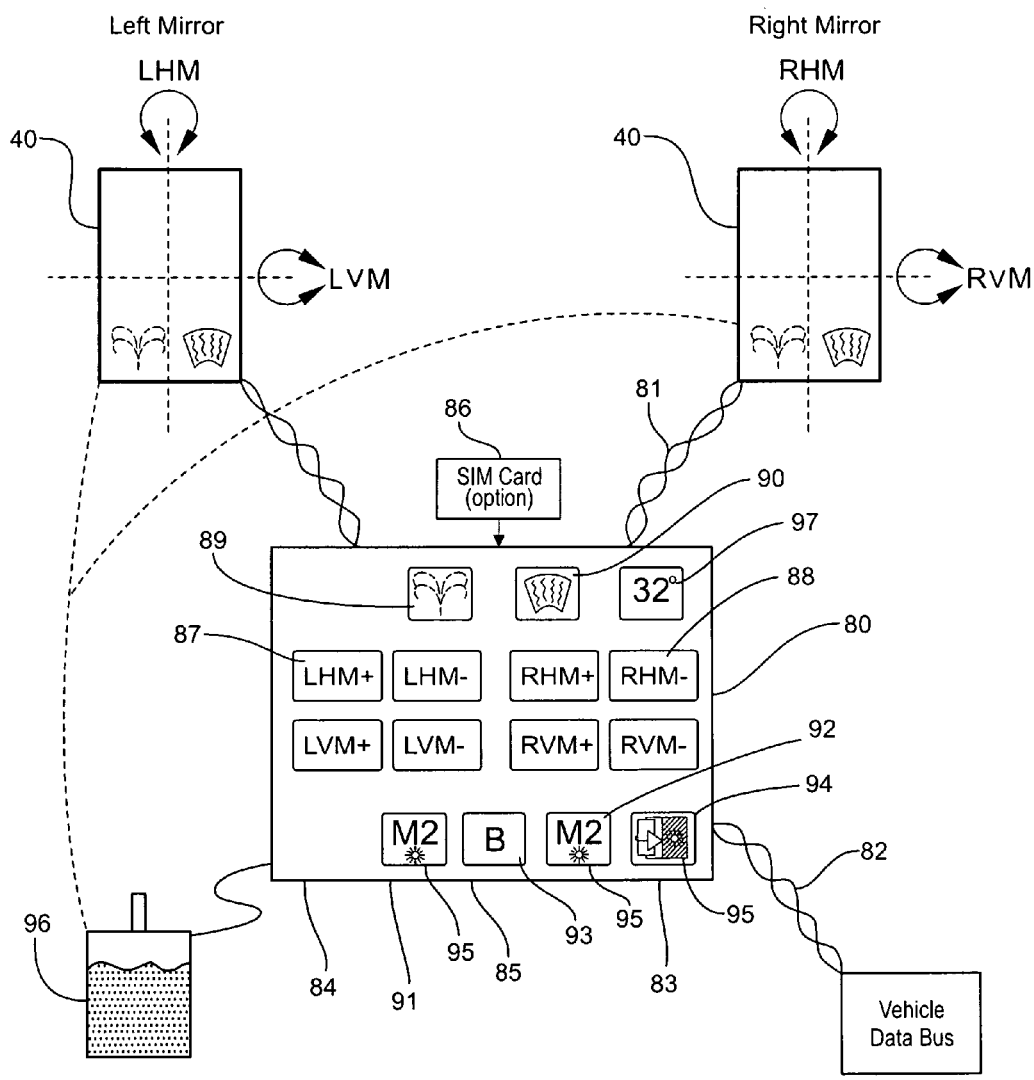
FIG. 11 illustrates an alternative cab-integrated control panel comprising a software-enabled touchscreen interface for transmitting control commands to the SCMs.

FIGS. 9 and 10 illustrate various communication, interaction and control features of the present disclosure. Components and features of the exemplary SCMs 40 are described above. In this embodiment, the driver's Tablet 10 may wirelessly connect to the Sensory Communication Mirrors (SCMs) 40, and include various touchscreen tab icons or other input means which function to transmit selected command signals and instruction to the ECU. For example, touchscreen icons "D1" and "D2" may signal the ECU to adjust orientation of the reflective member to respective predetermined settings previously entered and saved by first and second vehicle drivers. This may be especially useful when driving tandem routes, as the selected icon "D1" or "D2" would automatically properly orient the SCM reflective members for the individual driver. Touchscreen icons labeled "L" and "R" and direction arrows control custom adjustment of the SCM reflective members, while icon "S" saves the entered orientation in memory for subsequent use. Further touchscreen interaction and control features are illustrated in FIG. 10. Using the Tablet's touchscreen interface, tab icons may be selected to automatically fold-in one or both of the SCM, touchscreen icon may signal the ECU to activate heating elements to demist or defrost the SCM reflective surfaces, touchscreen icon may signal the ECU to display ambient temperature data, while other touchscreen icons may selectively activate video cameras and other integrated situation assessment tools of the SCM.

In alternative embodiments shown in FIGS. 11-15, a permanent (dedicated) control panel 80 is integrated into the dash of the vehicle, and comprises software enabling alternative touchscreen interfaces with icons designed to control various features and functionality of the SCMs 40. Components and features of the exemplary SCMs 40 are described above. The control panel 80 may operatively connect to the SCMs 40 via CAN2 data bus 81 (or other interface standard), and to the to the vehicle data bus via CAN1 82 (or other interface standard). The data bus connection may communicate transmission data, such as when the vehicle is in reverse gear, thereby signally the control panel (and ECU) to move the SCMs 40 into a pre-programmed backup memory orientation 83. The exemplary control panel 80 may also comprise ND ports 84, I/O ports 85, and an optional SIM card 86. The exemplary SIM card contains a microprocessor (integrated circuit), ROM, persistent (nonvolatile) EEPROM or flash memory, volatile RAM, and a serial I/O interface. SIM software may consist of an operating system, file system, and application programs.

The exemplary user interface may further include touchscreen icons for lefthand and righthand mirror adjustment 87, 88, mirror wash and mirror heat icons 89, 90, first and second mirror memory icons 91, 92, memory backup position icon 93, and mirror parking/unparking icon 94. The mirror memory icons comprise respective LEDs 95 which may glow to indicate the particular stored orientation of the SCM reflective member (e.g., position 1 or position 2). Likewise, the mirror parking/unparking icon 94 may have an LED 95 which glows when the SCMs 40 are parked (or folded inwardly). The panel 80 may also comprise an ambient temperature display 97. The mirror wash, dry and heat functions operate in a conventional manner discussed above. The wash function may utilize the existing vehicle wash fluid reservoir 96, such that when the driver manually actuates the hand-control for washing the front windshield the SCD reflective surfaces are also washed. Alternatively, the SCM wash may utilizes one or more separate wash fluid reservoirs with respective attached pumps and fluid lines.

Figure 12:
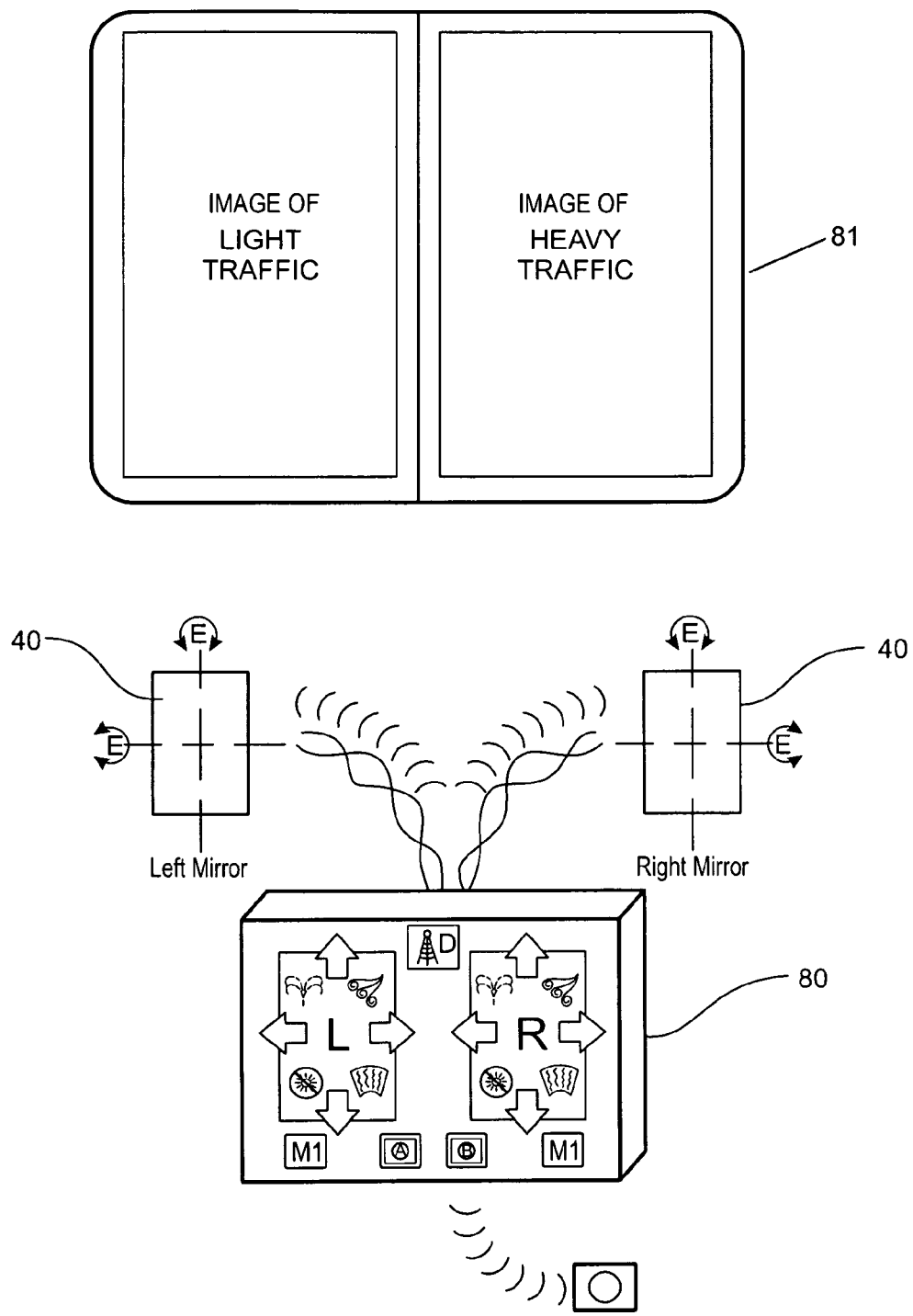
FIGS. 12, 13, 14, and 15 illustrate various exemplary implementations of the present SCM using the cab-integrated control panel.

A second example of the present disclosure employing an integrated control panel 80 with touchscreen interface is shown in FIG. 12. In this embodiment, the video display 81 and touchscreen control panel are integrated with the dash of the vehicle. The integrated control panel 80 comprises touchscreen control icons which allow the driver to adjust the reflective members of each SCM 40. The control panel 80 includes icons for washing, drying and heating the reflective members, and activating anti-glare (auto-dimming) feature. The control panel 80 may also comprise override icons for the video cameras, should the driver wish to view a specific area full screen—e.g., rear bogie wheels when making a right turn.

Figure 13:
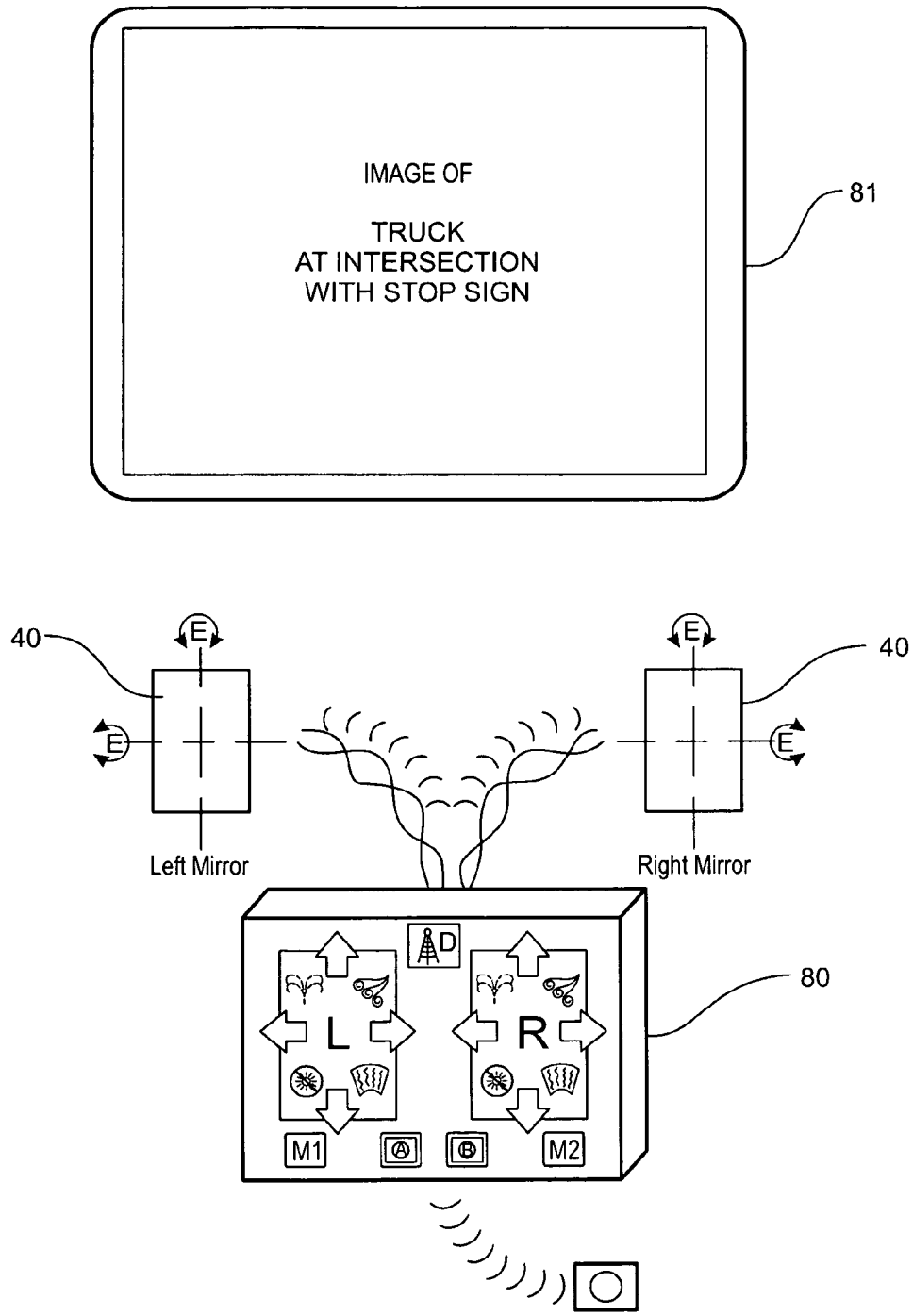

A third example of the present disclosure employing an integrated control panel 80 with touchscreen interface is shown in FIG. 13. The video display 81 and touchscreen control panel are likewise integrated with the dash of the vehicle. The control panel has touchscreen control icons which allow the driver to adjust the reflective members of each SCM 40. In this embodiment, an additional SA option is provided for a right turn signal sensor (or switch) which automatically inputs a realtime feed from Camera-B to the video display 81, allowing the driver to focus his attention on driving around the corner without manually engaging a Camera-B icon. The video input would allow the driver to view the curb, stop sign, pedestrians, and bicycle simultaneously in realtime while turning the corner.

Figure 14:
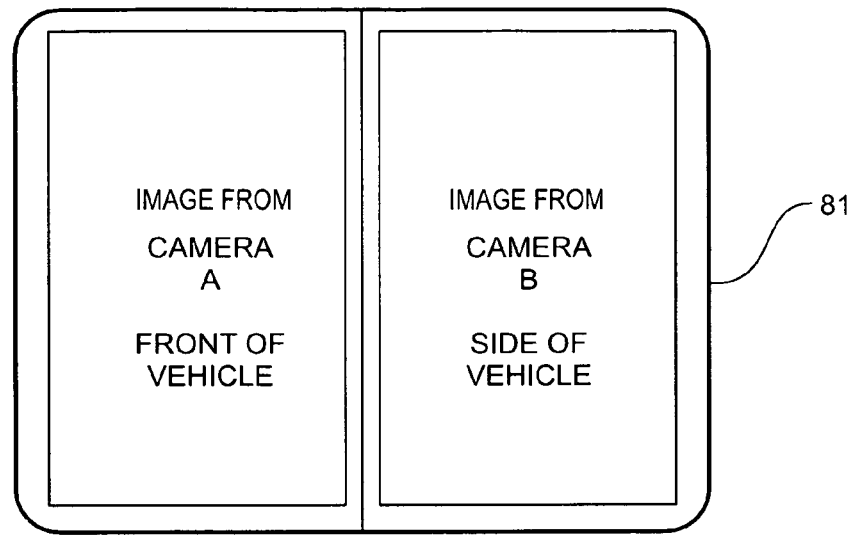
Figure 14:
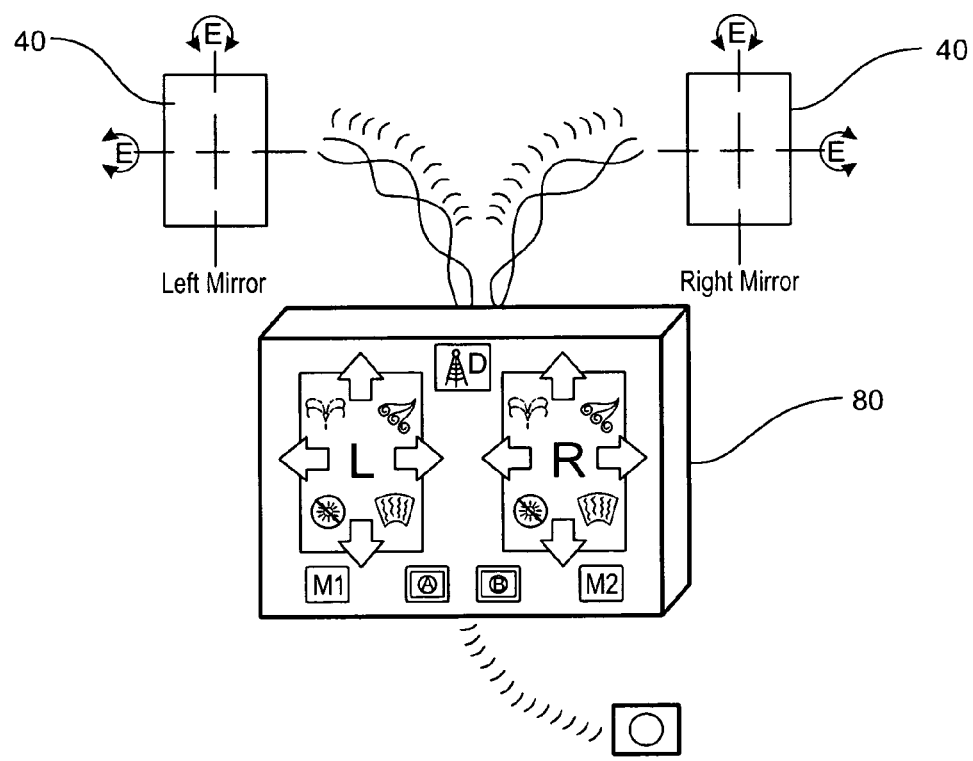

A fourth example of the present disclosure employing an integrated control panel 80 with touchscreen interface is shown in FIG. 14. The video display 81 and touchscreen control panel are likewise integrated with the dash of the vehicle. The control panel 80 has touchscreen control icons which allow the driver to adjust the reflective members of each SCM. In this embodiment, an additional SA option utilizes steering wheel sensors which input a realtime video feed from either Camera-A or Camera-B automatically when turning, thereby allowing the driver to maintain his focus on the particular driving maneuver.

Figure 15:
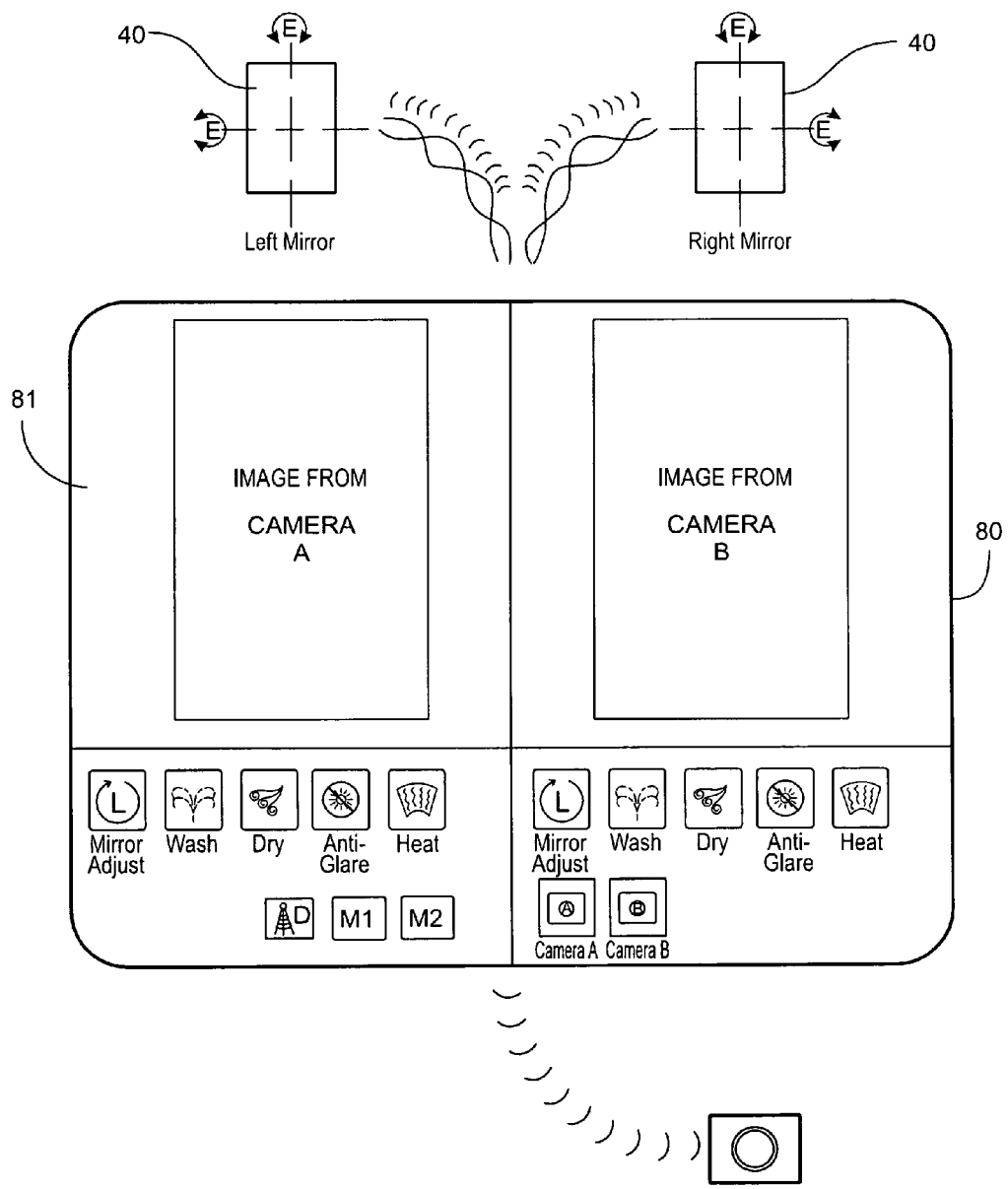

In a fifth example of the present disclosure, the touchscreen control panel 80 and video display 81 are integrated with the dash of the vehicle. In this embodiment, input from video cameras A and B can be displayed on the screen side-by-side, as shown in FIG. 15; or the driver can override input and show only the feed from one selected camera. The display may also show a rear view of vehicle when in reverse.

Alternative Driver Interaction

Figure 16:
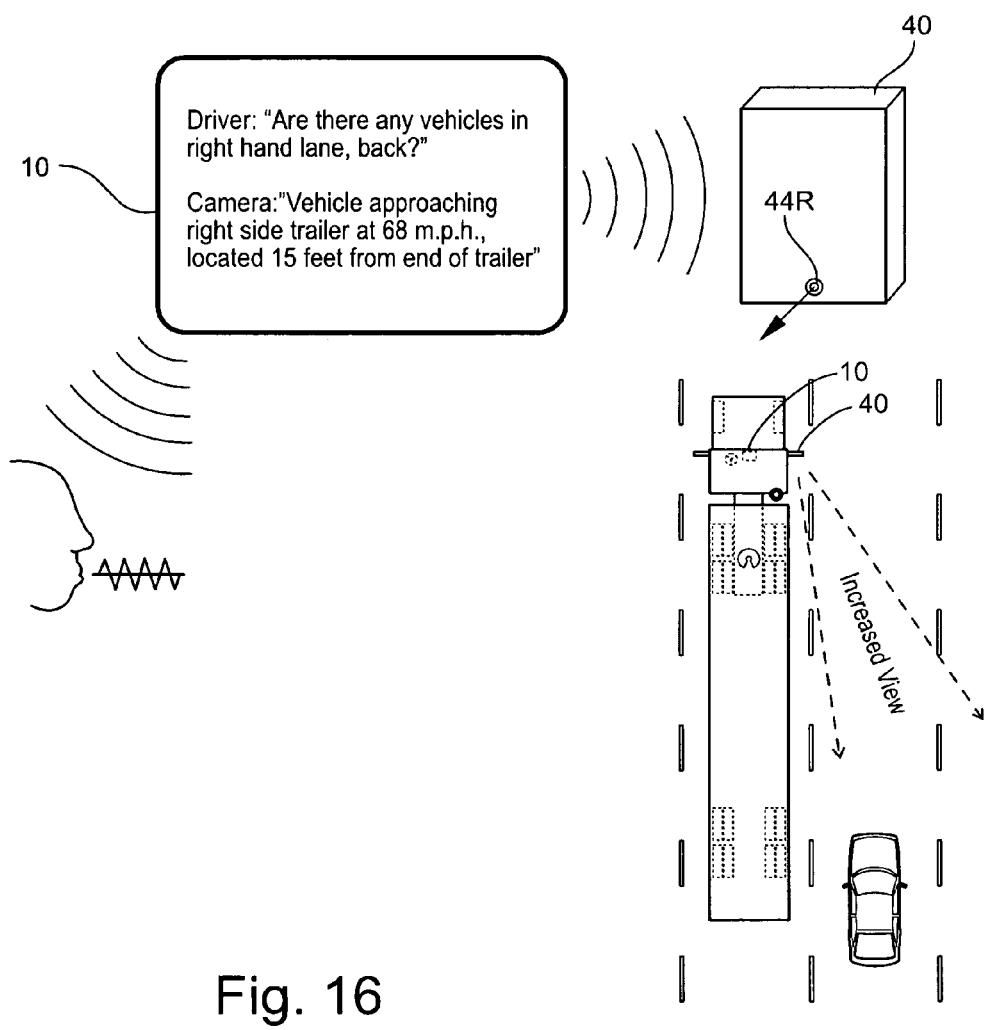
FIGS. 16 and 17 are schematic views demonstrating voice interaction with the exemplary SCMs.
Figure 17:
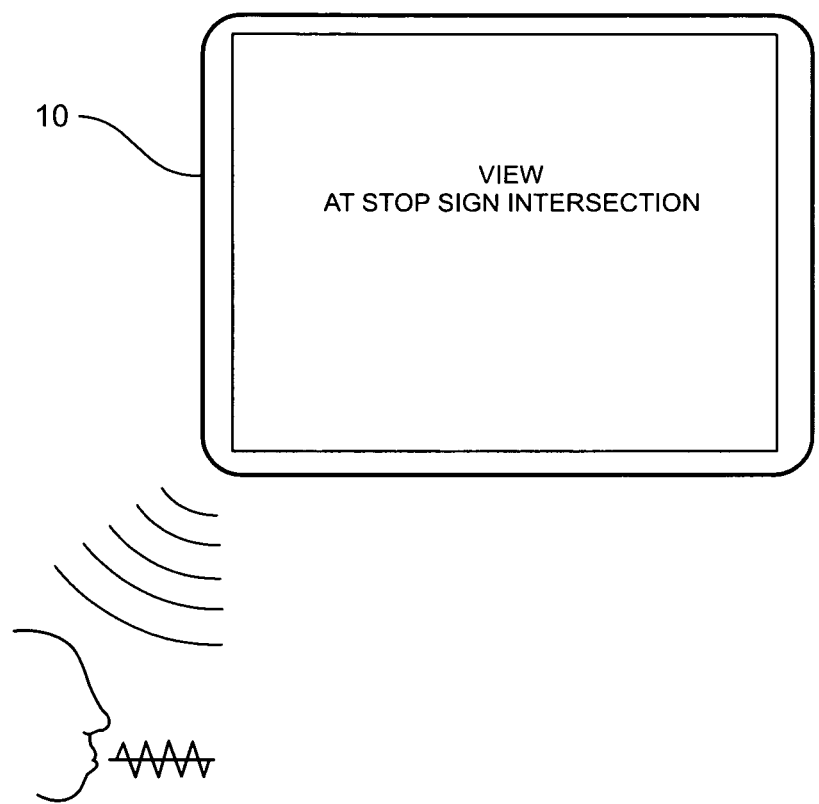

As demonstrated in FIGS. 16 and 17, the present disclosure also contemplates driver interaction with the SCMs 40 using voice commands/queries and computer-generated voice responses. Voice commands may be initiated by the driver and responses received via Tablet 10 microphone, either within or around the cab, or at any remote location (e.g., restaurant, filling station, hotel room, or the like). In the example of FIG. 16, the driver uses the Tablet computer to query the ECUs of the SCMs 40. Using voice control (or speech recognition) software, the ECU can be instructed to manipulate the rearward and/or forward facing video cameras 44R, 44F of a selected SCM 40 in order to scan a desired area (e.g., right hand travel lane), and to then communicate status back to the driver by computer-generated voice response via the Tablet 10. Each video camera may include pan and zoom capabilities, and hardware and software features enabling moving-object detection, identification, and tracking. Information concerning object speed, acceleration, distance to vehicle, and size may be automatically communicated by voice response through the Tablet to the driver. In FIG. 17, when maneuvering the vehicle the driver may be warned through voice response via Tablet of any still or moving objects detected by the forward or rearward facing video cameras of the SCMs. For example, the driver may initiate a voice command "Turning Right" via Tablet microphone. This command directs the ECU to automatically activate the SCM video cameras and right turn signal marker, and to then voice-respond back to the driver via Tablet any necessary warning concerning potential obstacles or hazards. SCM software may also recognize the speed and acceleration/deceleration of other vehicles, and can voice-respond suitable commands to the driver, such as "slow down" or "come to a stop". In other examples, the driver may use voice commands to unfold the SCMs and heat the reflective surfaces, or to receive realtime data concerning vehicle subsystems, traffic updates, ambient and road temperatures, or the like.

Figure 18:
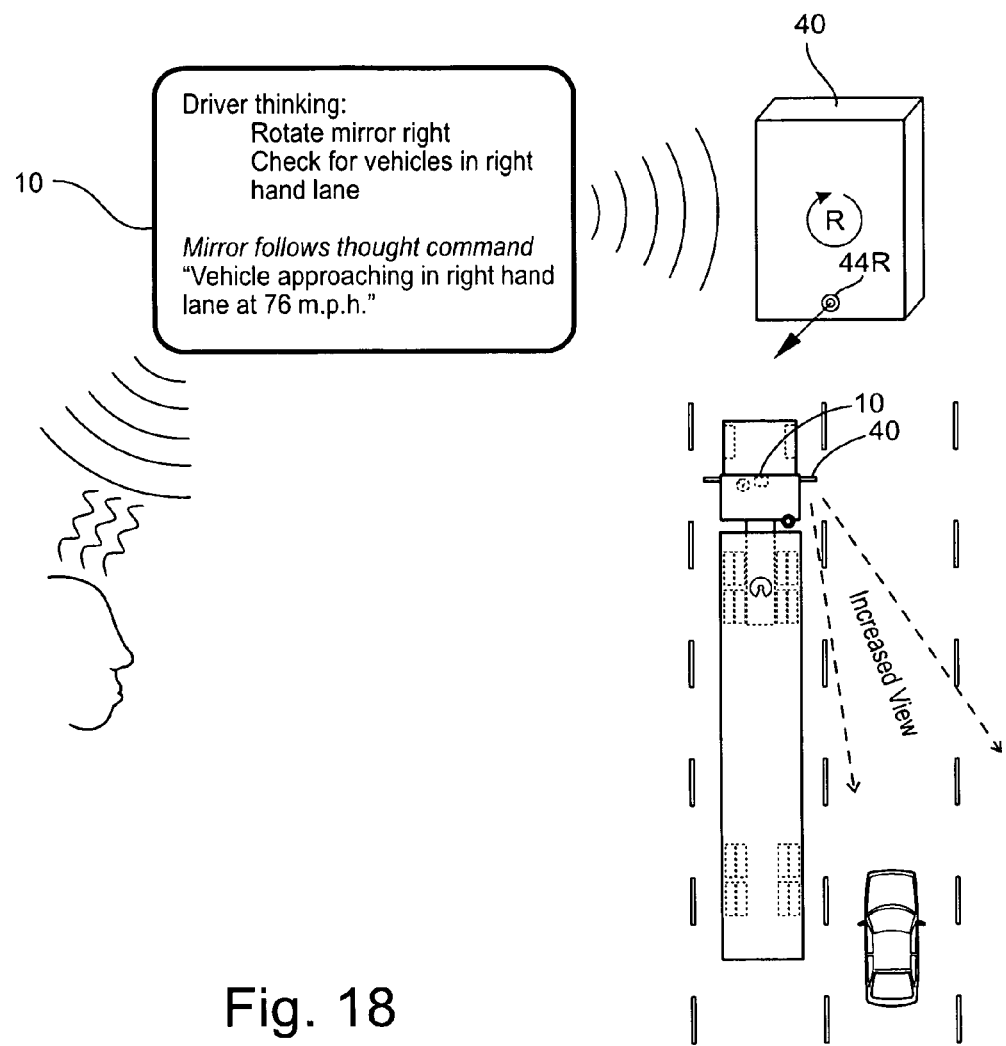
FIGS. 18 and 19 are schematic views demonstrating the use of thought-controlled computing and brainwaves for interfacing with the exemplary SCMs.
Figure 19:
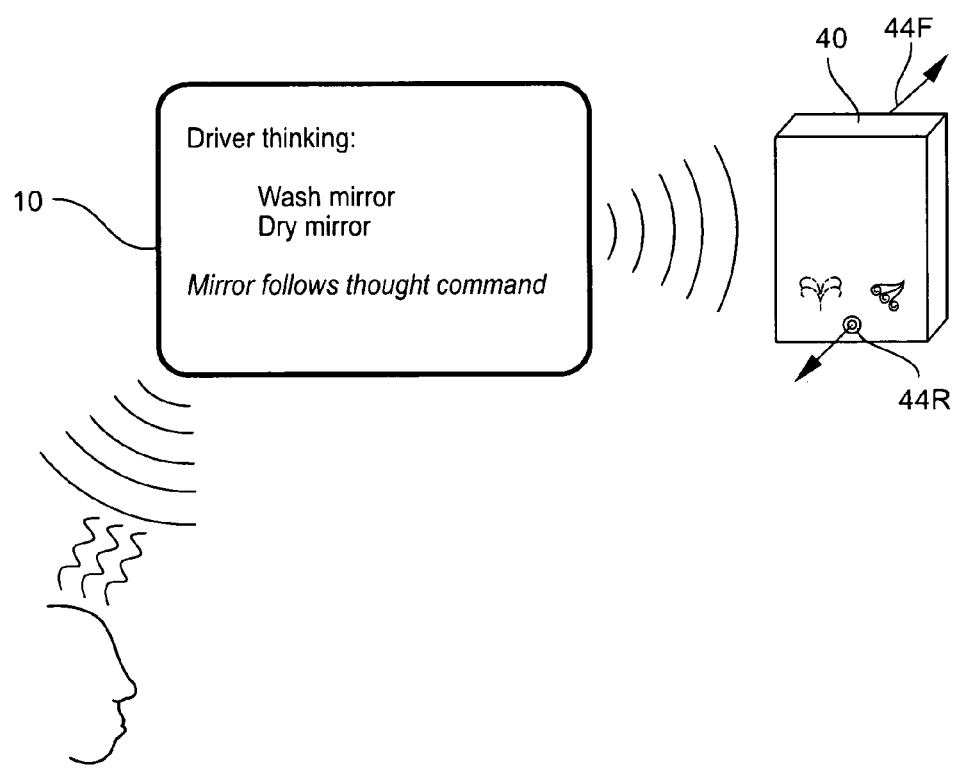

In further exemplary embodiments illustrated in FIGS. 18 and 19, the present disclosure contemplates the use of thought-controlled computing and brainwaves to initiate the transmission of signals from the driver's Tablet 10 to the SCMs 40. In these examples, a brain-computer interface (BCI) [also called a mind-machine interface (MMI) or direct neural interface or a brain-machine interface (BMI)], creates a direct communication pathway between the driver's brain and Tablet. The driver's brainwaves can initiate control signals to the ECUs without any physical movement, thereby "thought-controlling" operation of the SCMs. Thought-controlled computing and brainwaves together with the driver's hand condition and/or wheel grip may also be used to sense if or when the driver becomes drowsy.

Noise Cancellation

The Sensory Communication Mirrors (SCMs) 40 described above may further incorporate respective paired sensors, such as microphones, accelerometers, or other devices capable of detecting sound waves. The sensors of each pair face in opposite directions—e.g., one facing inwardly towards the vehicle and one facing outwardly away from the vehicle. The paired sensors cooperate to detect vehicle noise in a first sound waveform, and then convert the waveform to electrical signals which are transmitted wirelessly (via Wi-Fi, Bluetooth, or the like) to wireless speakers located on the driver and passenger sides of the vehicle cab. The ECU of each SCM directs the cab speakers to put the recorded signal exactly out of phase with the actual vehicle noise detected by the SCM sensors, such that the second sound waveform from the speaker is just the same and as loud as the vehicle noise (first sound waveform), but out of phase with the vehicle noise, thus canceling the first sound waveform and leaving only the environmental sounds of other nearby vehicles. According to exemplary noise cancellation circuitry, an output interrupter circuit causes intermittent sound indicating nearby traffic around or adjacent the vehicle. Signal filters may be used to prevent sound crossover from one cab speaker to the next.

The ECU utilizes software which cancels signal pairs that are common to the paired SCM sensors, and to keep newer/uncommon signals from the outward facing sensors. This newer/uncommon signal is the sound of nearby vehicles or other remote disturbances, and is transmitted to the cab speakers differentially according to sensor location (e.g., right or left SCM). This enhances the noise cancellation effect and allows the driver to hear the presence and exact direction of nearby traffic in time to evaluate its presence and to avoid any unsafe lane-changing or other maneuvering. The ECU could also refresh the model of ambient sound at some predetermined, timed interval. Doing so would correct for changes in the ambient sound caused by changes in vehicle speed, gear, braking, rain, etc.

Fender Mounted SCMs

Figure 20:
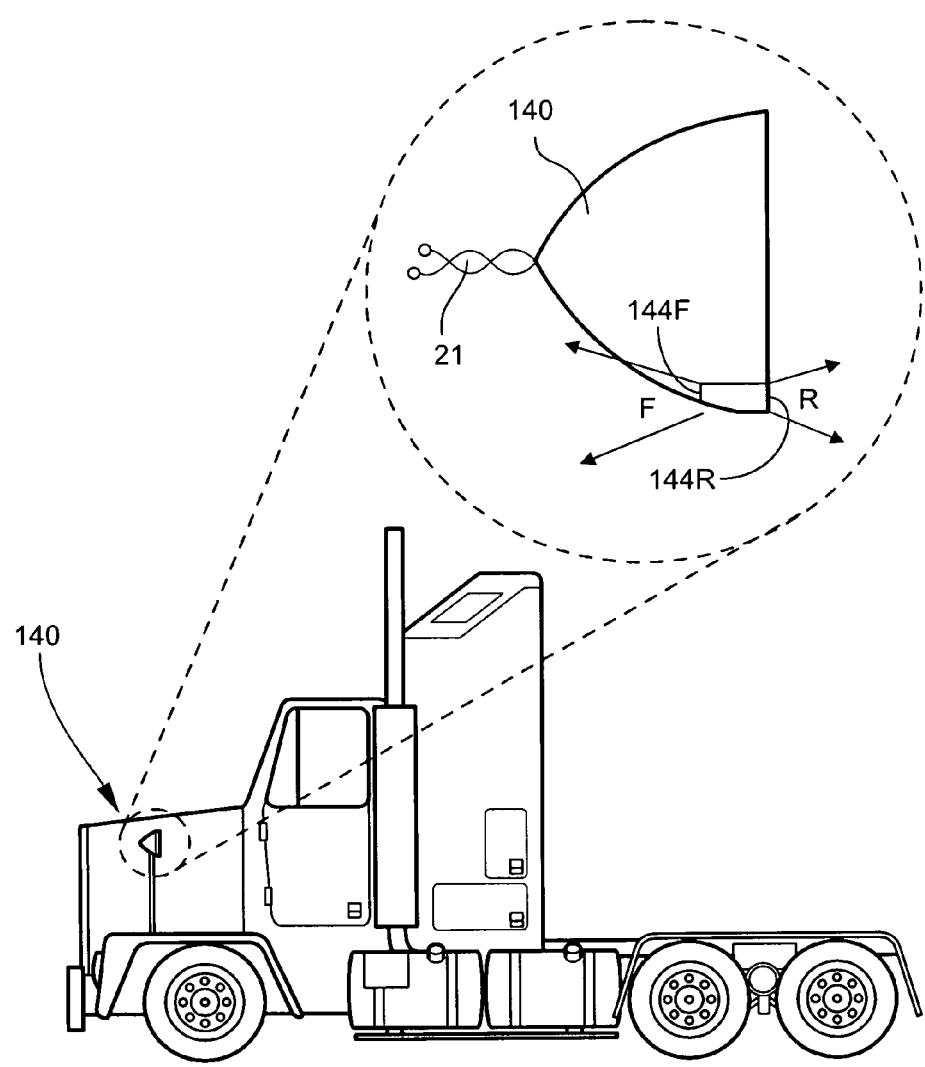
FIGS. 20-25 illustrate an alternative fender-mounted SCM of the present disclosure.
Figure 21:
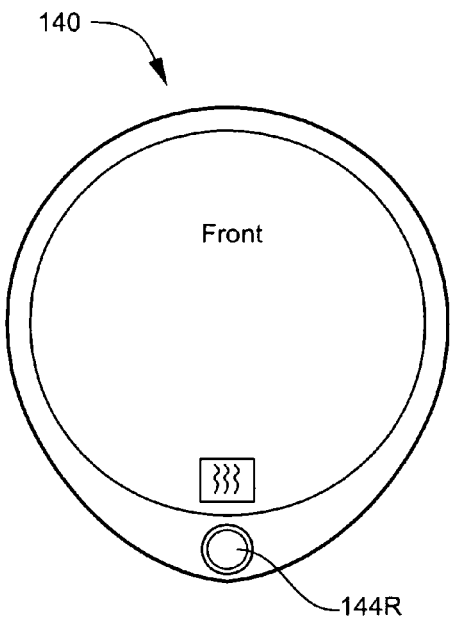
Figure 22:
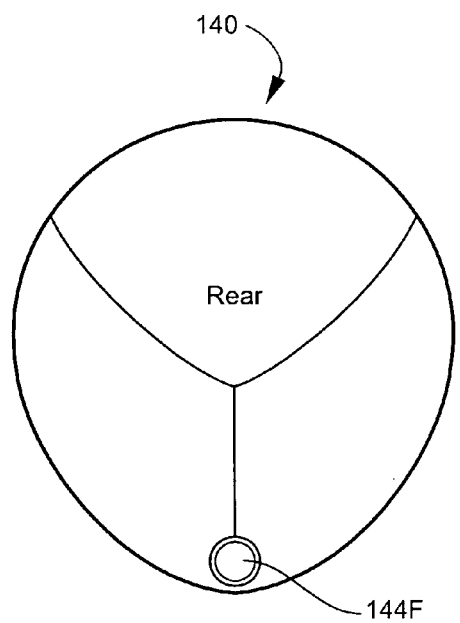

Referring to FIGS. 20-25, the present disclosure may further incorporate elevated fender mounted SCMs 140 as additional situation assessment tools to enhance driver SA. As shown in FIGS. 20, 21, and 22, each fender-mounted SCM comprises an exterior aerodynamic housing, integrated forward facing and rearward facing video cameras 144F and 144R (IP or CCTV), heating element and other electronics and electrical components described above, and a rearward facing reflective member. The SCMs 140 are carried on respective vertical mounting posts (FIG. 20) attached to the fenders on opposite sides of the vehicle hood—each mounting post having a fixed or adjustable height (e.g., between 2 ft and 4 ft). The SCMs 140 may be connected to the vehicle data bus 21 via SAE J1455 or other suitable interface standard.

Figure 23:
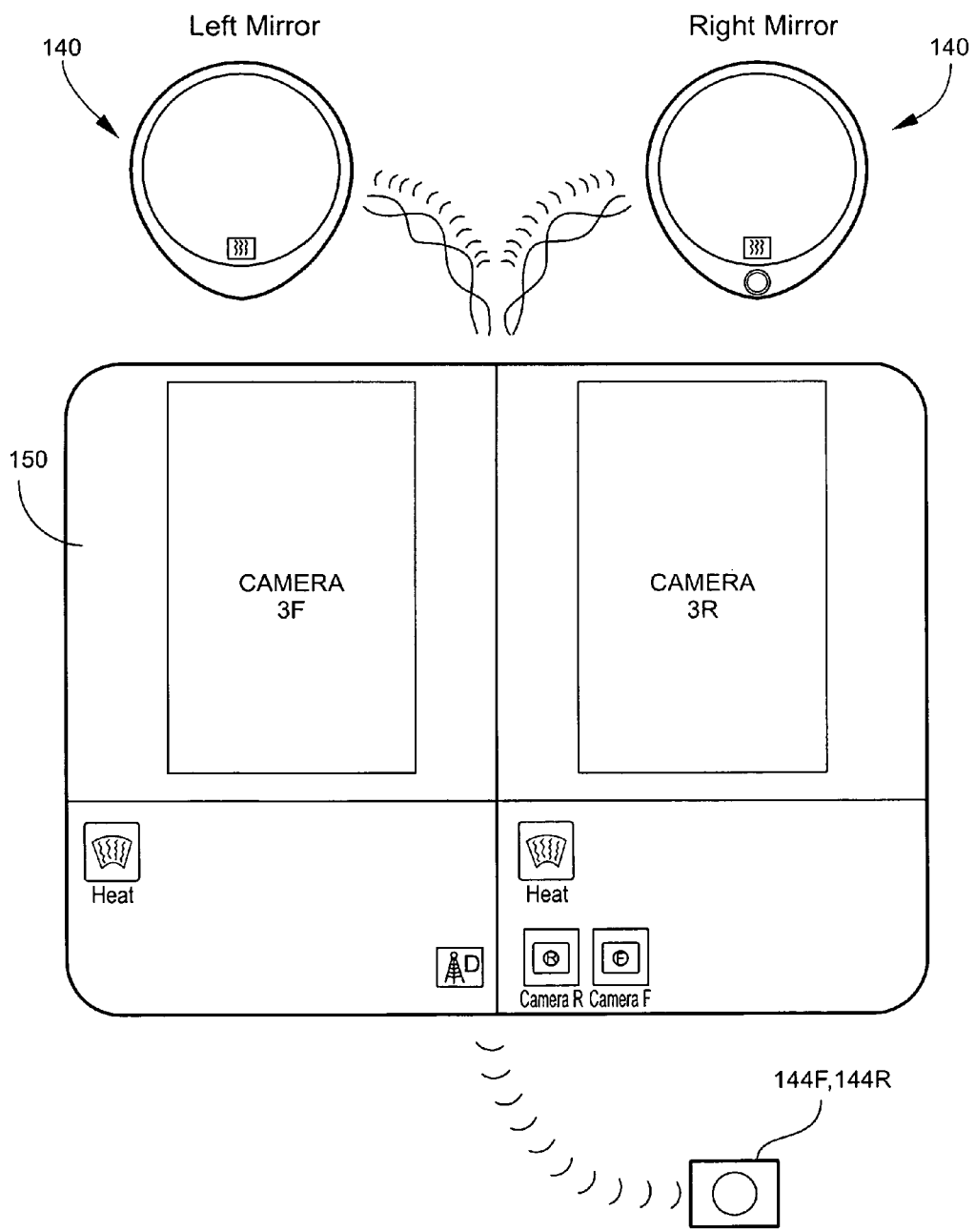

As shown in FIG. 23, an integrated touchscreen control panel 150 and video display may be located within the cab of the vehicle, and may comprise various control icons for heating the reflective surfaces, overriding any programmed operation of the video cameras, and selectively displaying input from only one or both cameras. The SCMs may connect to the display via data bus and/or wirelessly.

Figure 24:
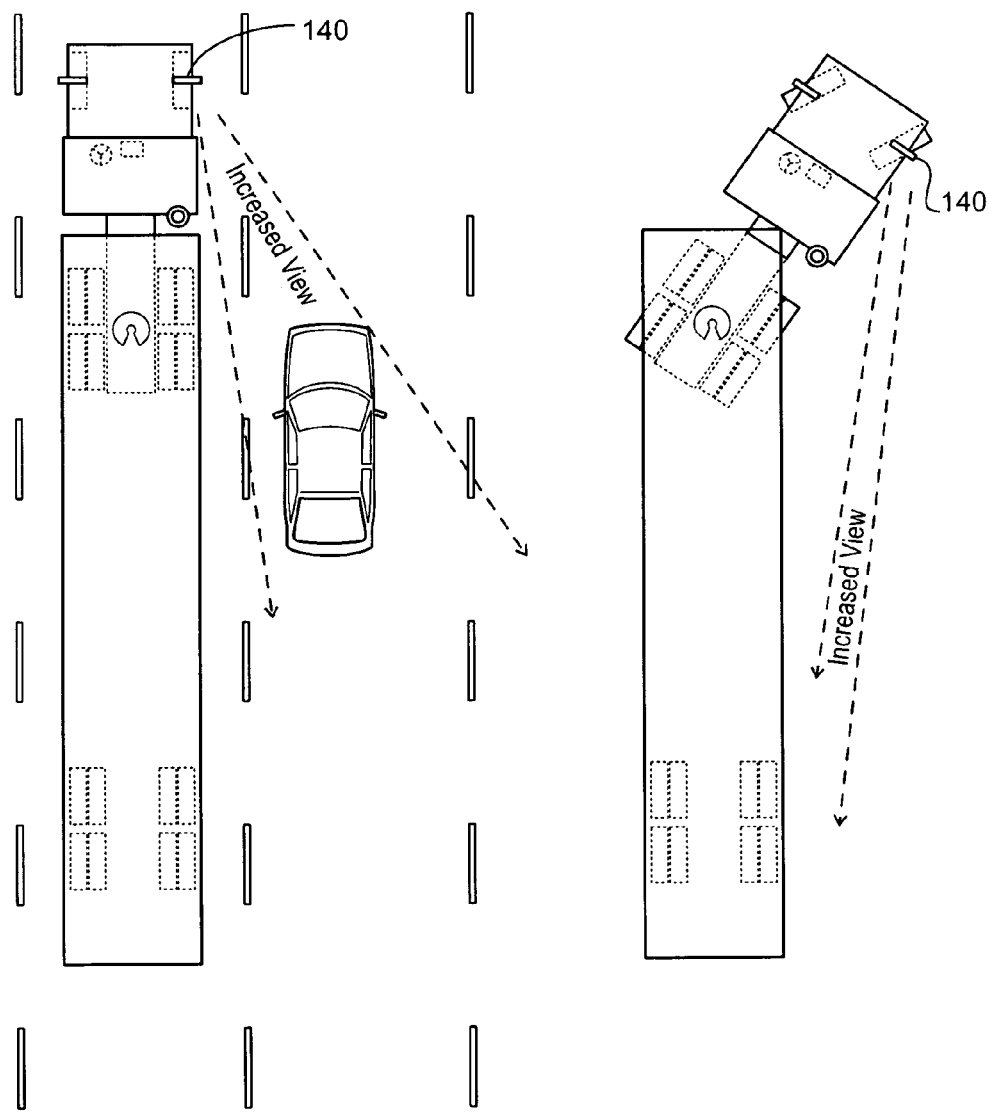
Figure 25:
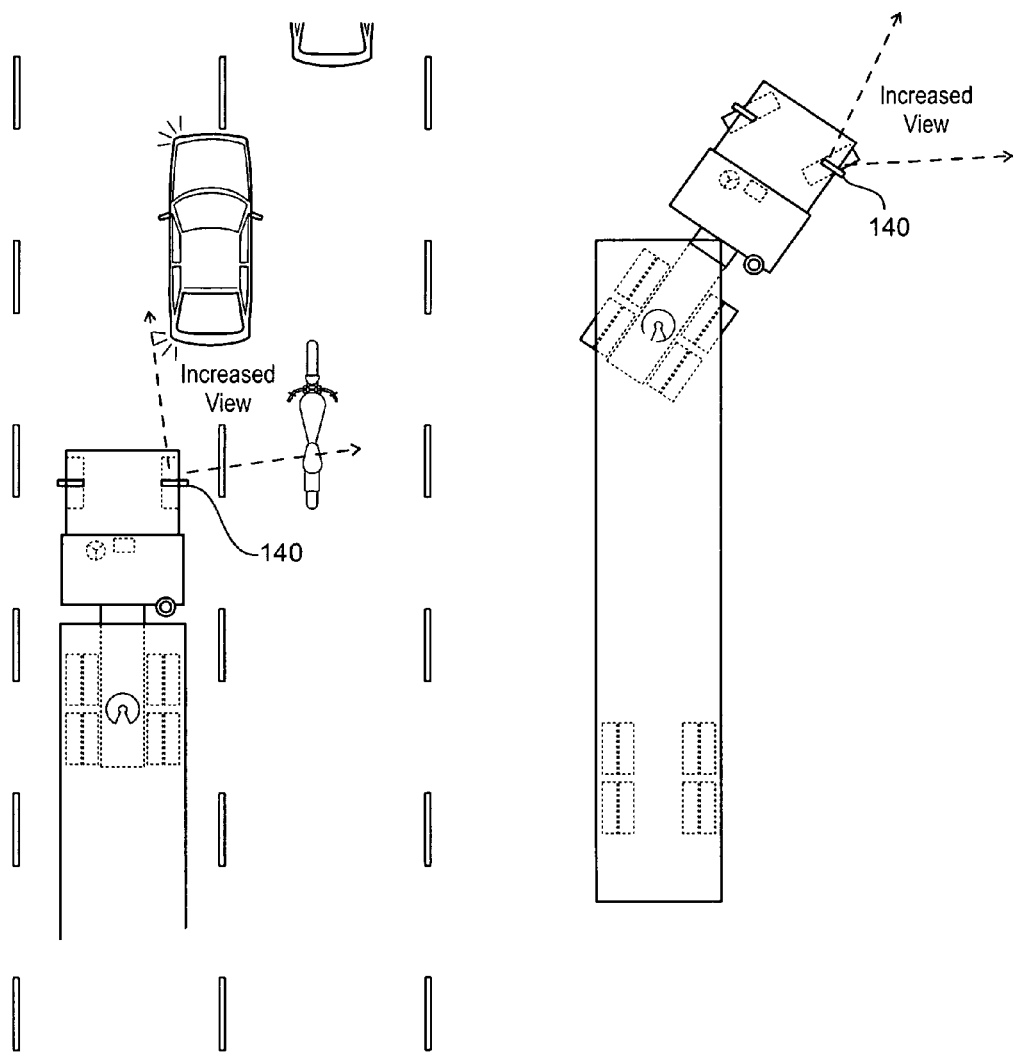

FIGS. 24 and 25 illustrate respective examples of enhanced driver situational awareness using the exemplary fender-mounted SCMs 140. As demonstrated in FIG. 24, by utilizing the right side SCM, rearward facing camera, and video display, the driver has a larger view range of the right side of the vehicle. When driving straight, the driver has an additional view range of the right hand lane, and can see (or sense) where other vehicles are located in relation to his vehicle. When making a right hand turn, the SCM increases the driver's view of the rear bogie wheels from the rearward-facing video camera feed. This increased view allows the driver to see any obstacles in relation to the rear of the trailer and wheels.

Additionally, utilizing the right side SCM 140, forward facing video camera, and video display, the driver has a larger view range of the right front fender area of the vehicle. As demonstrated in FIG. 25, when driving straight, the driver has an additional view range of the righthand lane or on-ramps in front of his vehicle, and can see where other vehicles are located in relation to his vehicle. When making a right hand turn, the forward facing camera view increases the driver's visibility of the right front fender area allowing the driver to see any obstacles that may be in the way. These and other features of the present disclosure are applicable to a wide range of transportation vehicles, including school buses—as the bus driver would be capable of seeing if a child walking in front of the bus to cross the road has cleared the area.

Strategically Arranged and SA-Oriented SCDs

Referring to FIGS. 26 through 35, the exemplary system and method of the present disclosure is applicable for enhancing driver situational awareness by strategically located a plurality of SCDs (including SCMs) on the transportation vehicle. The present disclosure may also be applicable in completing vehicle systems and parts inspections, cargo inspections, trailer inspections, vehicle operation monitoring, security surveillance, driver performance monitoring, safety checks, and others—all done by the driver from within or outside the cab, or by an administrator from a remote location.

Figure 26:
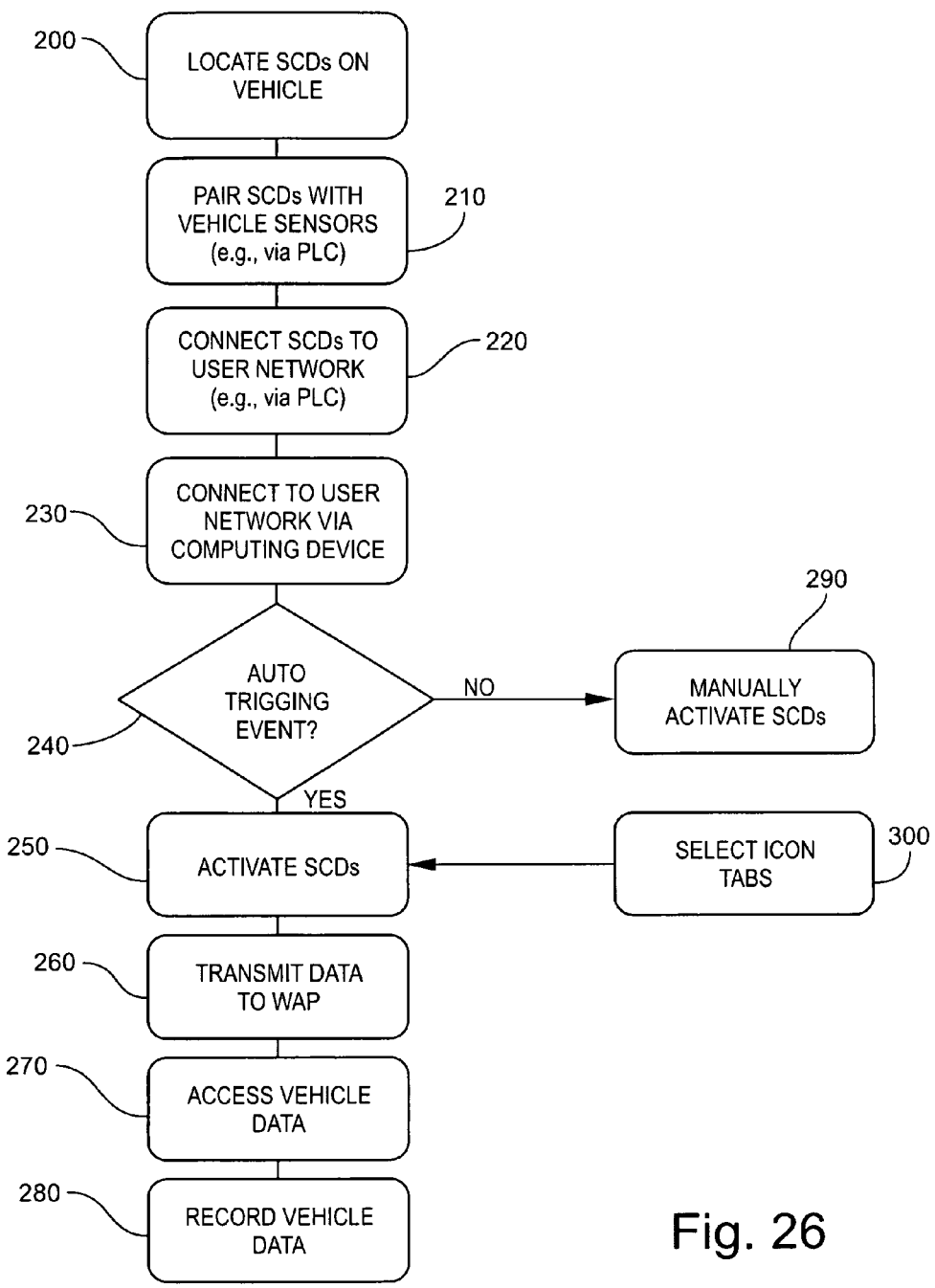
FIG. 26 is a flow diagram illustrating various steps of an exemplary system and method for enhancing situational awareness in a transportation vehicle according to the present disclosure.

As indicated at block 200 in FIG. 26, the exemplary method strategically locates a plurality of sensory communication devices ("SCDs") on the vehicle. As previously discussed, the SCDs may comprise one or more wireless CCTV video cameras, IP cameras ("netcams"), webcams, microphones, and other such devices (wireless or hardwired) adapted for capturing audio, video, and imagery data in and around the vehicle. The SCDs may be web-enabled, and may comprise transceivers and flash memory for software upgrades, troubleshooting, and the like. Each of the SCDs are operatively aligned or "paired" at block 210 with the vehicle data bus (e.g., power line carrier or "PLC") and one or more vehicle sensors including, for example, ABS braking sensors, vehicle turn signal sensors, headlight sensors, windshield wiper sensors, safety air bag sensors, transmission gear sensors, speedometer sensor, odometer sensor, clock sensor, steering wheel position sensor, sensors indicating position of tractor in relation to trailer, engine and ambient temperature sensors, distance and motion sensors, battery sensors, tire sensors, and others. The vehicle sensors may comprise or utilize transceivers, transmitters or other means for communicating their state or condition directly to respective paired SCDs or to a central onboard wireless access point (WAP) in the cab of the vehicle. The onboard access point cooperates with an onboard router and transceiver (or modem) to connect the SCDs and vehicle sensors to a local area user network, as indicated at block 220. The modem may include bridge and/or repeater modes. The connected devices and/or sensors may be hardwired to the onboard access point via existing vehicle data bus (using technology described in prior U.S. Pat. No.

7,817,019), or may connect wirelessly using Wi-Fi, Bluetooth, Wave, or related standards. The vehicle data bus may communicate with the access point, onboard recording devices, and vehicle subsystems such as ABS braking system, engine, transmission, and tire modules using SAE, ISO, or CAN standards (e.g., SAE J1708/1587, SAE J1939, SAE J1850, SAE J2497[PLC], and RS232). The complete disclosure of the aforementioned prior patent is incorporated by reference herein. The onboard access point may communicate with 30 or more SCDs (including SCMs) and vehicle sensors located within a radius of more than 100 m. Alternatively, the access point may be integrated with one of the onboard SCDs or onboard vehicle sensors.

The user connects to the local area network at block 230 using the Tablet computer or other mobile (e.g., web-enabled) or dedicated computing device. An exemplary dedicated computing device may comprise a display with touchscreen control panel permanently mounted or integrated within the vehicle cab. Examples of other mobile computing devices include a smartphone, laptop computer, netbook, computer, cellular telephone, PDA, and others. In one exemplary implementation, the Tablet automatically pairs with the sensory communication devices and vehicle sensors at vehicle start-up, and automatically connects the driver or other user to the network. Alternatively, in web-based implementations, the user may first be required to login to a designated user account with an authorization code, user ID, password, or the like. In the user network, the Tablet computer, sensory communication devices, and vehicle sensors may communicate with each other via PLC (or other data bus) and wireless mechanism (e.g., Wi-Fi, Bluetooth, Wave) in a secured closed-loop system. Once connected to the user network, a software application (e.g., mobile app) provides a dashboard-centric graphical interface on a display screen with tab icons representing each of the connected SCDs and vehicle sensors. The SCDs may also be manually activated, as indicated at block 290. Manually selecting a tab icon for a particular device (e.g., video camera), as indicated at block 300, provides a realtime view of the environmental area on which the camera is focused. The software application allows the user to drill down from the dashboard into the various network connected devices and sensors to make desired pairings and changes to existing pairings.

Figure 27:
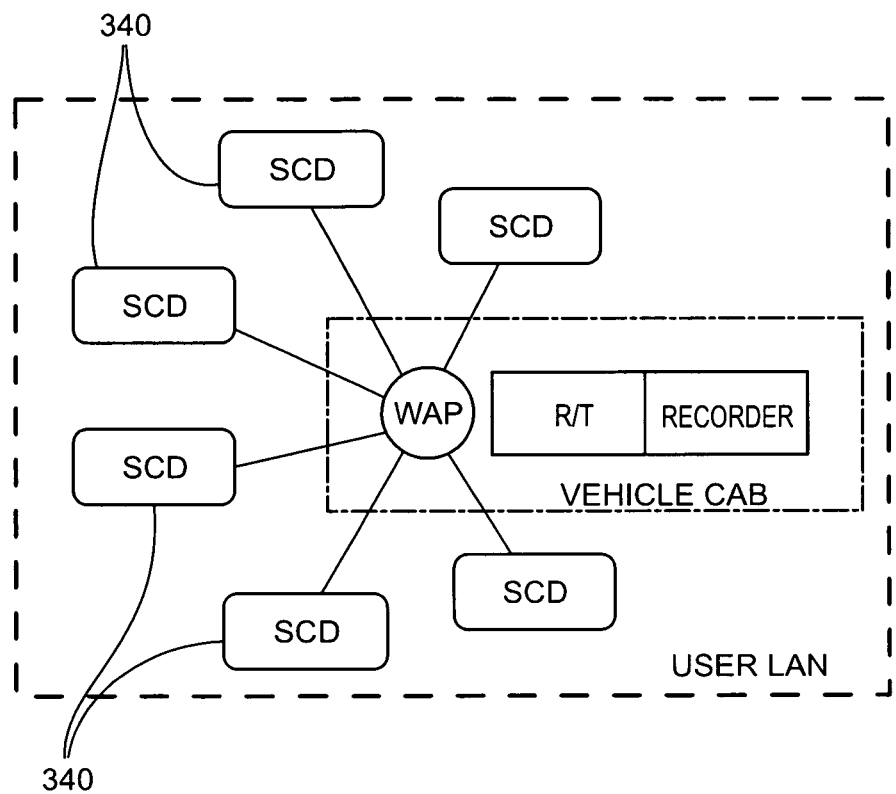
FIG. 27 is a schematic diagram showing various components and systems employed in the exemplary disclosure.

Referring to FIGS. 26 and 27 and blocks 240-280, an automatic triggering event occurs at block 240 when a particular vehicle sensor communicates a predetermined status to the access point WAP—either automatically or manually by operation of the driver. For example, a triggering event may occur when the driver manually activates the right turn signal within the vehicle cab. This turn signal sensor may be operatively paired with one or more high-definition, IP-based CCTV video cameras 240 mounted outside the vehicle at or around a right side of the front cab and trailer. The exemplary video cameras 340 may have computer-controlled technologies and flash memory that allow them to identify, track, and categorize objects in their field of view. As indicated at block 250, this event causes the designated cameras 340 to automatically active (awaken from a normal sleep mode) and transmit a data signal comprising realtime streaming video to the onboard access point at block 260. The access point passes the data to the onboard router/transceiver (or modem) where the realtime video is accessed on the user network, and automatically displayed to the driver on the screen of his Tablet 10 at block 270. The CCTV cameras 340 may incorporate audio surveillance microphones for simultaneously transmitting environmental noises to the driver, and may also comprise Digital Video Recorders for recording and storing the captured digital audio, video and images as indicated at block 280. Alternatively, the captured vehicle data may be recorded and stored on a remote server or on an onboard recorder, such as that described in prior U.S. Pat. No. 8,032,277—the complete disclosure of which is incorporated herein by reference. The CCTV cameras may also support recording directly to network-attached storage devices, and sufficient internal flash for completely stand-alone operation. For SCDs mounted outside the vehicle, the camera housing may be equipped with a camera wash nozzle, dryer, and defroster. Other exemplary SCDs may comprise closed circuit digital photography (CCDP), or other IP-based digital still cameras.

The exemplary CCTV cameras may also utilize Video Content Analysis (VCA) technology for automatically analyzing video to detect and determine temporal events not based on a single image. Using VCA the camera can recognize changes in the environment and identify and compare objects in a database using size, speed, and color. The camera's actions can be programmed based on what it is "seeing". For example, an alarm may be activated through the driver's Tablet if the camera detects movement of cargo within the trailer. In other exemplary embodiments, the CCTV cameras may comprise a facial recognition system (computer application) for automatically identifying or verifying a driver from a digital image or a video frame from a video source. This may be accomplished by comparing selected facial features from the image and a facial database.

The individual user network in the exemplary implementation may be combined with other user networks, and centrally monitored and accessed using a network protocol called "Television Network Protocol." Each user network (LAN) is an integrated system allowing users at any location (outside the vehicle) to connect remotely from the Internet and view what their SCD cameras are viewing remotely. All online communications may be encrypted using Transport Layer Security (TLS), Secure Socket Layer (SSL) or other cryptographic protocol.

Exemplary Implementations

Figure 28:
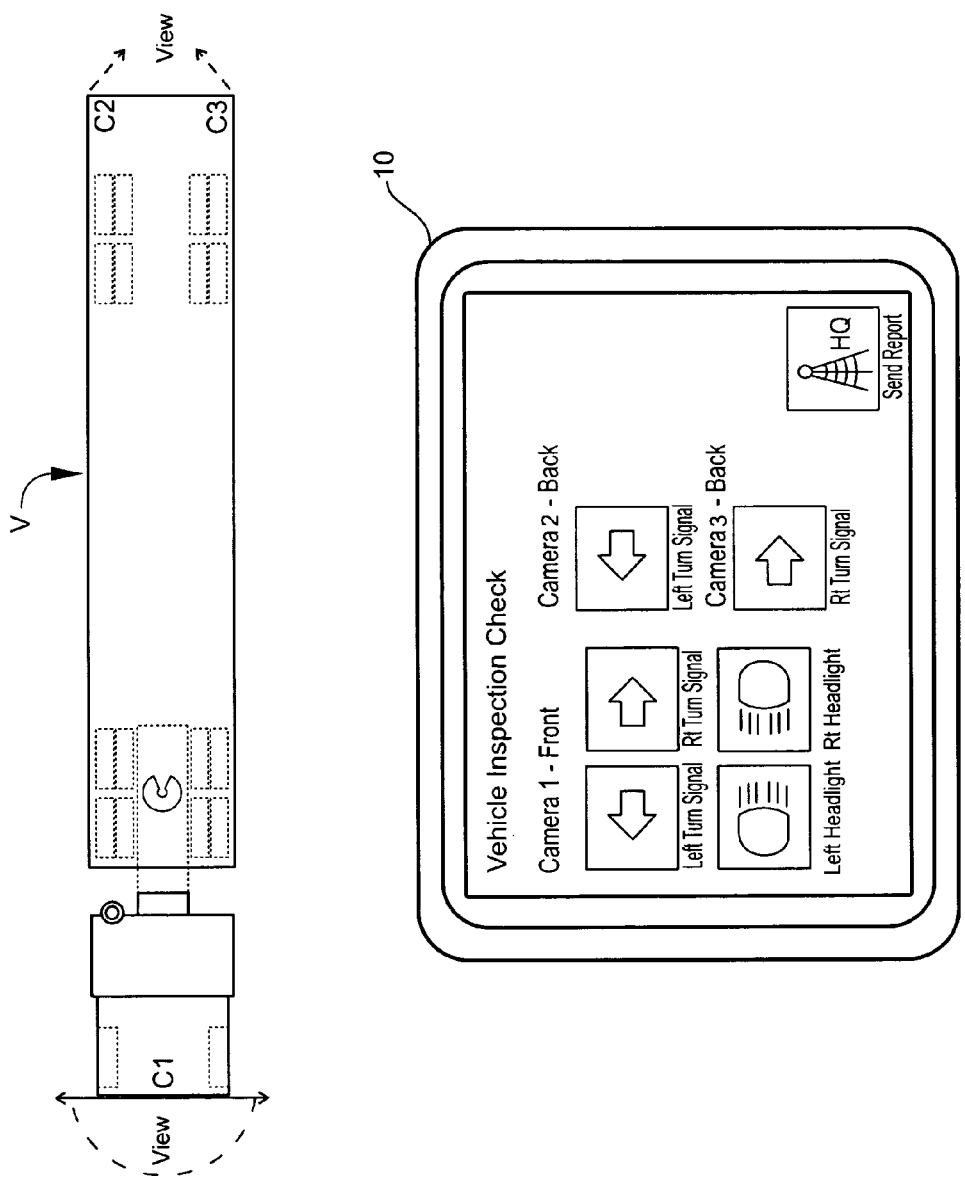
FIG. 28 illustrates an exemplary implementation of the present disclosure for vehicle parts and system inspection.

In the example illustrated in FIG. 28, multiple SCDs comprise respective video cameras C1, C3, C3 mounted to the vehicle "V" at rear corners of the trailer and above the front grille. The front (panoramic) camera C1 is operatively paired with vehicle sensors for the left/right turn signals and headlights, while the two rear cameras are paired only with the turn signals. The front and rear cameras C1, C2, C3 automatically activate, as described above, upon use of the turn signals. The front camera C1 automatically activates upon activation of the front headlights. When the cameras are activated, the driver's Tablet computer 10 streams realtime video (or displays a still photograph) of the areas within view of the SCD cameras. In this example, a vehicle inspection check may be performed by the driver or remote user by manually selecting the various tab icons signaling the associated turn signals and headlights to activate, thereby activating the paired SCD cameras C1-C3 and verifying their proper operation on the Tablet display screen. This vehicle data may be captured and stored, and transmitted to a remote headquarters location by selecting tab icon.

Figure 29:
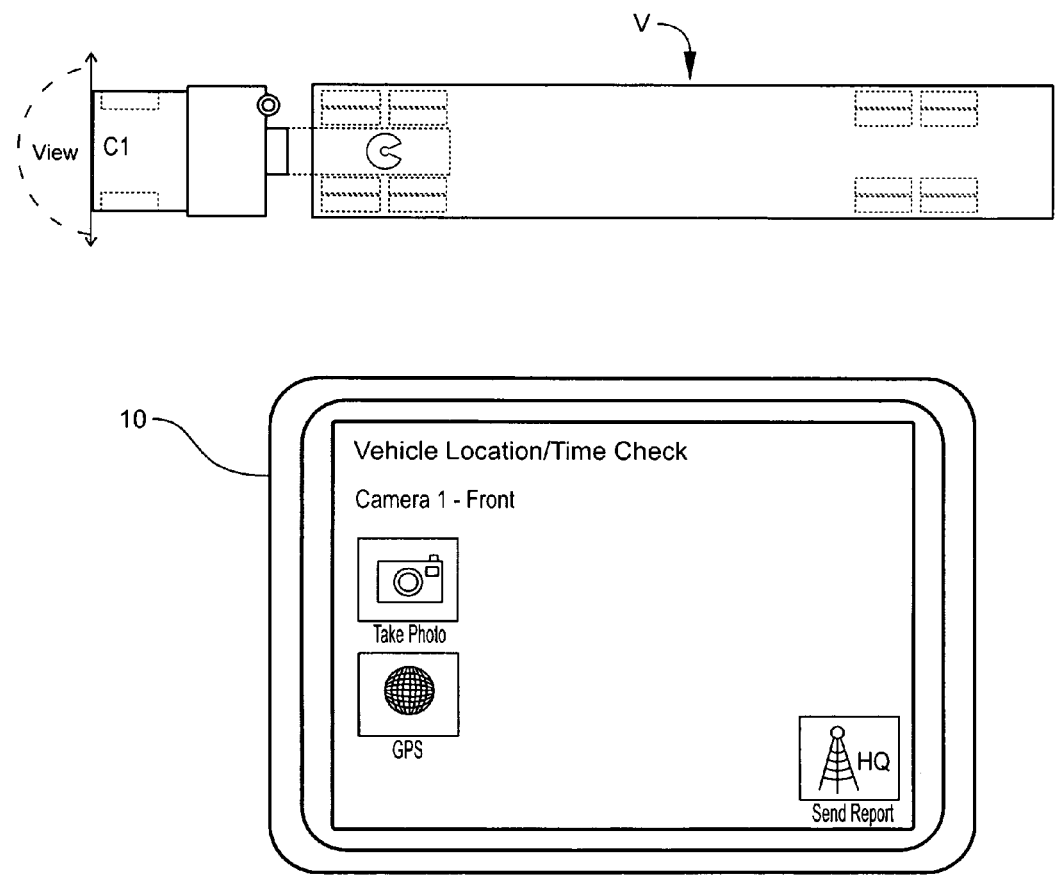
FIG. 29 illustrates an exemplary implementation of the present disclosure for documenting vehicle arrival and location.

In the example of FIG. 29, the SCD comprises a panoramic CCDP digital still camera C1 mounted to the vehicle "V" above the front grille. The camera C1 is operatively paired with a vehicle sensor for the transmission "park" gear. When the driver moves the vehicle transmission from any other gear into park the camera C1 automatically activates and captures a digital still photograph of the vehicle location. Using the driver's Tablet computer 10, the digital photograph is time and date stamped by selecting tab icon, and displayed in realtime to the driver (or other user) on the Tablet display screen. A GPS tab icon may also be selected by the driver (or other user) to display and record the exact coordinates of the vehicle location. This vehicle data may be captured and stored, and transmitted to a remote headquarters location by selecting tab icon.

Figure 30:
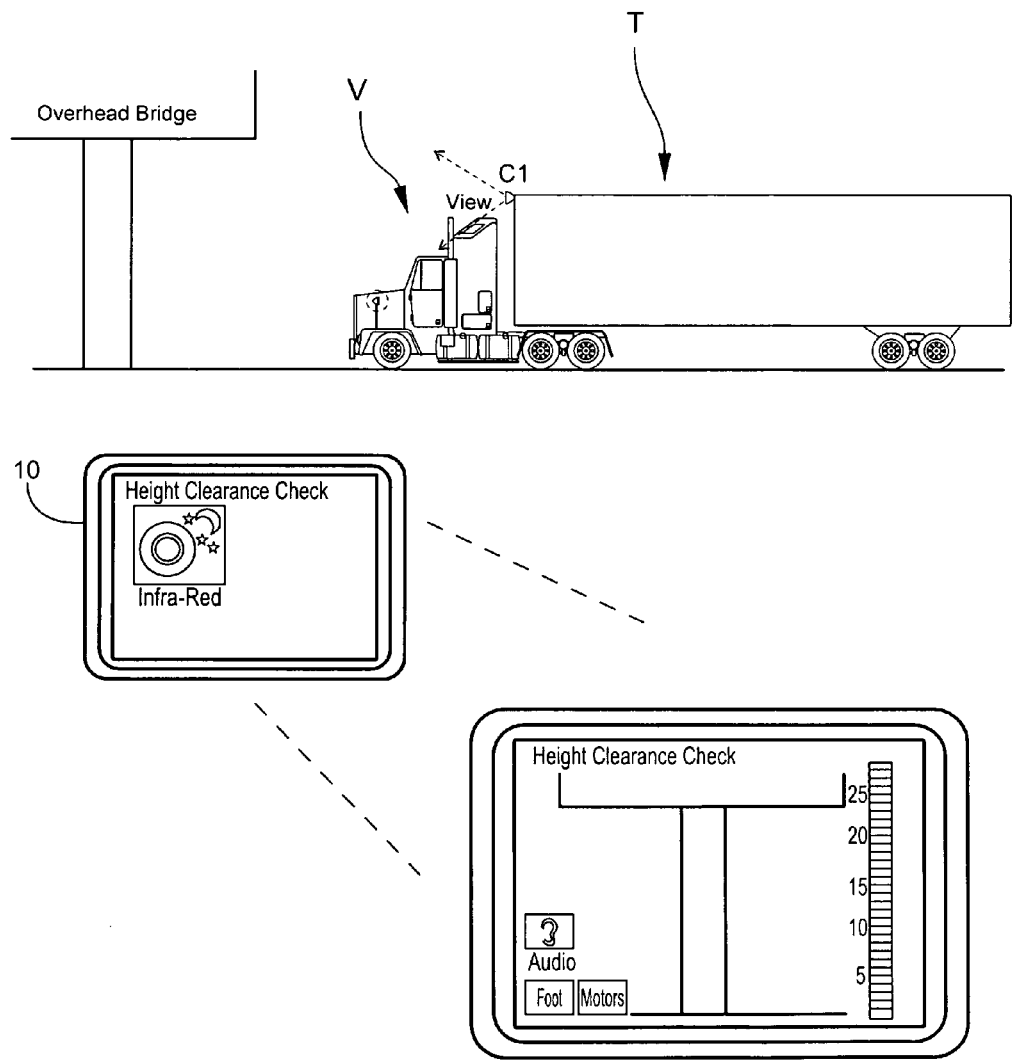
FIG. 30 illustrates an exemplary implementation of the present disclosure for providing height clearance confirmation.

In the example of FIG. 30, the SCD comprises a video camera C1 with infrared viewing mounted at a front top location on the vehicle trailer "T", As the vehicle "V" approaches an underpass, onboard GPS technology and distance sensors cooperate to automatically activate the SCD camera C1 Using the Tablet computer 10, a "height clearance check" is displayed in realtime to the driver (or other user) on the Tablet display screen. Alternatively, the height clearance may be confirmed with a spoken announcement from the Tablet's integrated audio system. This camera may also be manually activated by selecting a tab icon on the Tablet's display screen.

Figure 31:
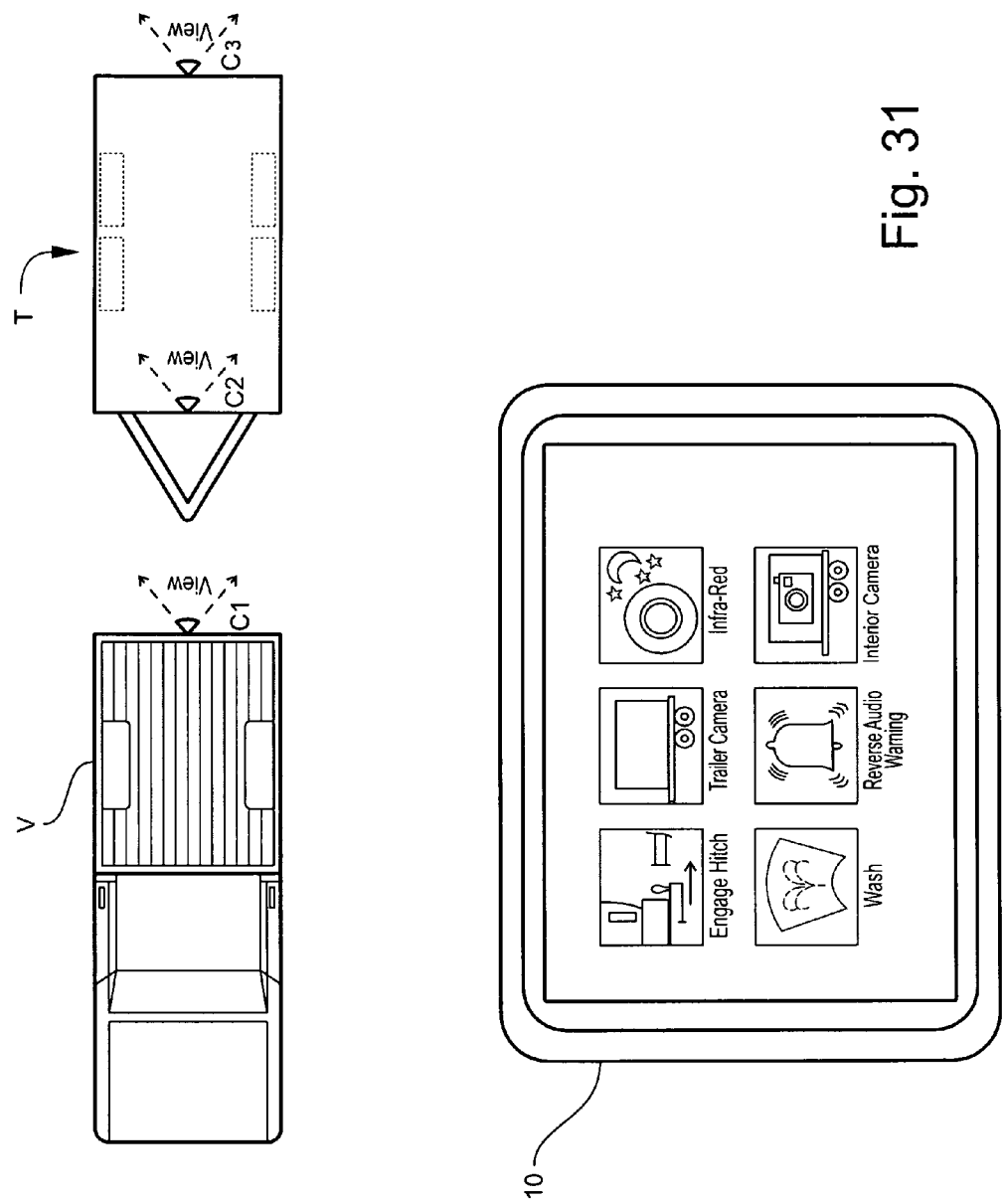
FIG. 31 illustrates an exemplary implementation of the present disclosure to assist with a vehicle hitch connection.

In the example of FIG. 31, the SCD comprises a CCTV video camera C1 mounted proximate a trailer hitch of the vehicle "V". As the vehicle approaches the trailer "T", a distance sensor automatically activates the SCD camera C1 and displays a rearward viewing area in realtime to the driver (or other use) on the Tablet display screen of Tablet 10. Alternatively, the SCD camera may be automatically activated upon movement of the vehicle transmission into the reverse gear. Additional CCTV video cameras C2, C3 may be located inside the trailer and at a rear of the trailer. Each camera may be selectively manually activated by selecting a tab icon on the Tablet's display screen. Additional tab icons may be provided and selected to enable infrared viewing, to activate a camera wash system, and to emit a reverse audio warning.

Figure 32:
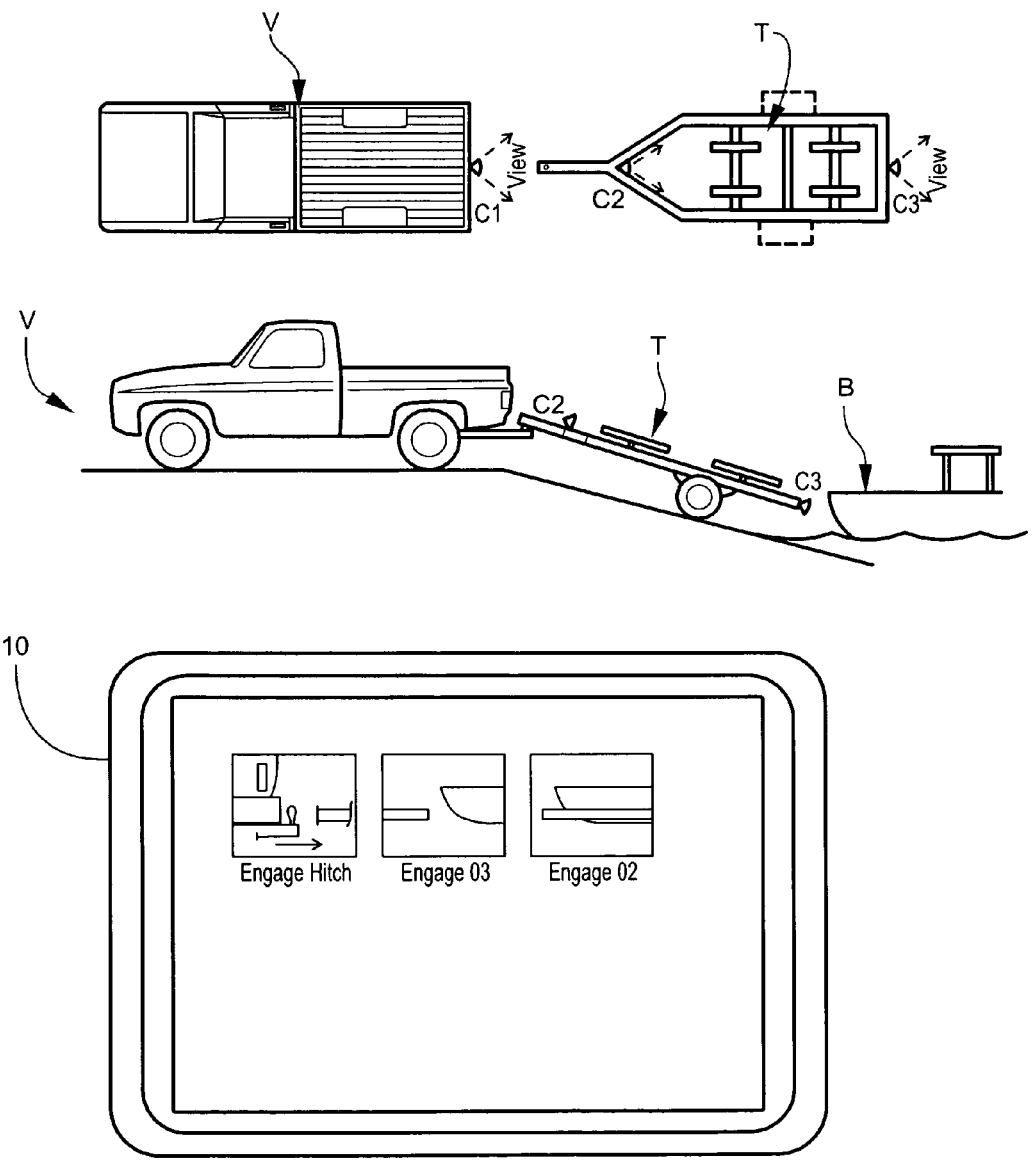
FIG. 32 illustrates an exemplary implementation of the present disclosure to assist with boat trailer hitch connection and trailer loading.

In the example of FIG. 32, the SCD comprises a CCTV video camera C1 mounted proximate a trailer hitch of the vehicle "V". As the vehicle approaches a boat trailer "T", a distance sensor automatically activates the SCD camera C1 and displays a rearward viewing area in realtime to the driver (or other user) on the display screen of Tablet 10. Alternatively, the camera C1 may be automatically activated upon movement of the vehicle transmission into the reverse gear. Additional waterproof IP-based cameras C2, C3 may be located at the front and rear of the boat trailer "T" to confirm that the boat "B" is properly loaded and secured on the trailer. Each camera C1, C2, C3 may be selectively manually activated by selecting a tab icon on the Tablet's display screen.

Figure 33:
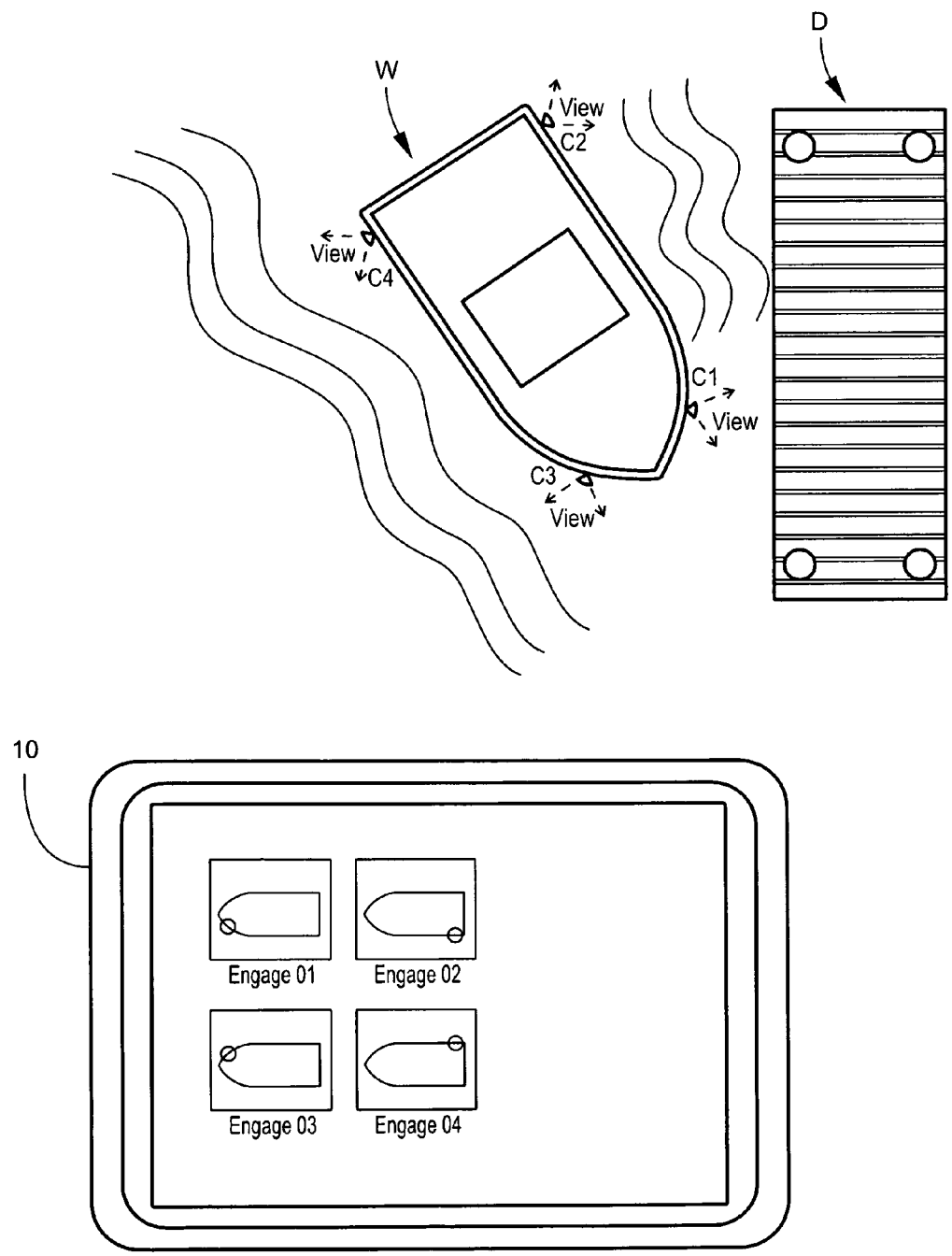
FIG. 33 illustrates an exemplary implementation of the present disclosure to assist with boat docking and maneuvering.
Figure 34:
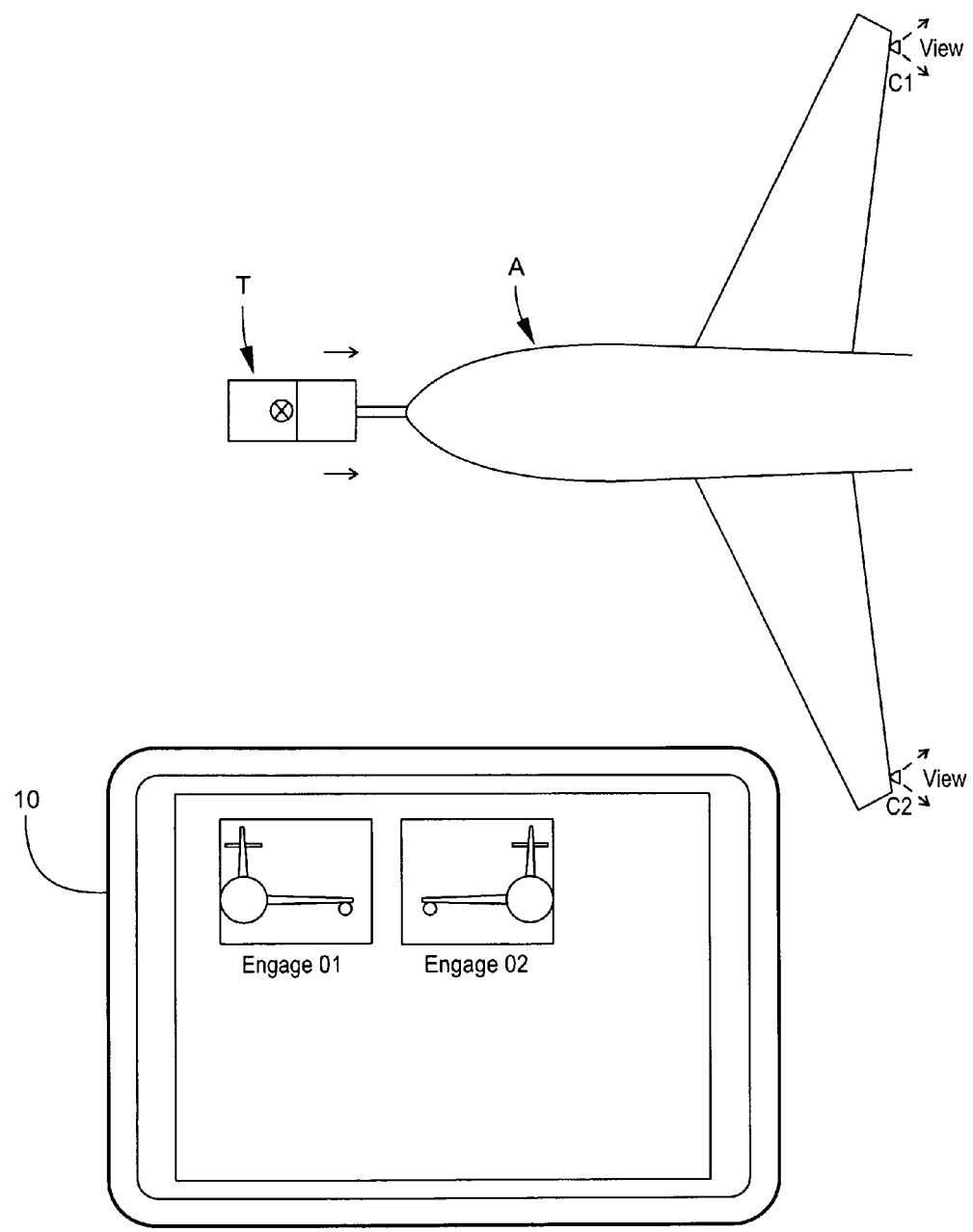
FIG. 34-37 illustrates exemplary implementations of the present disclosure to assist with airplane towing, maneuvering, monitoring, and inspection.
Figure 35:
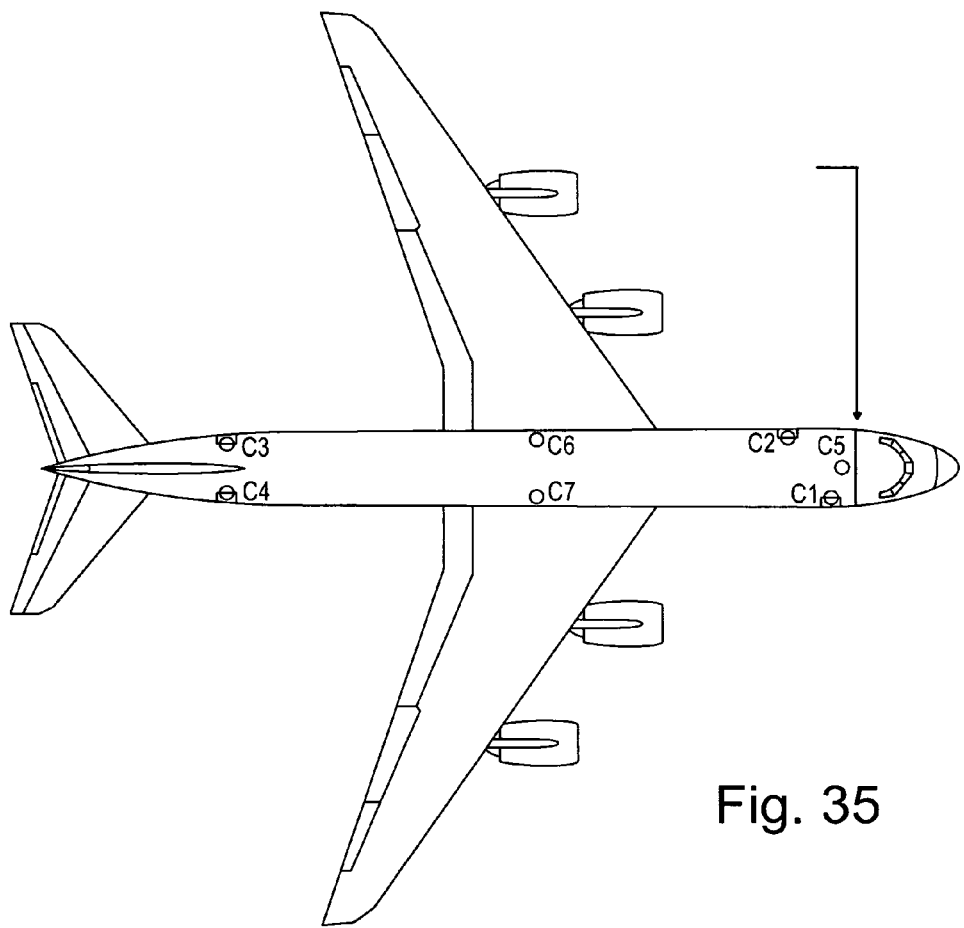
Figure 36:
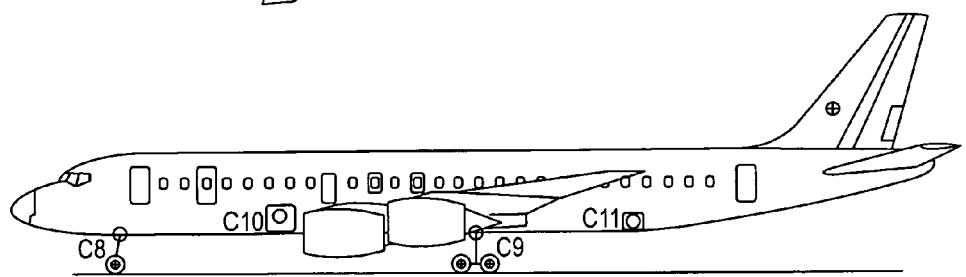
Figure 37:
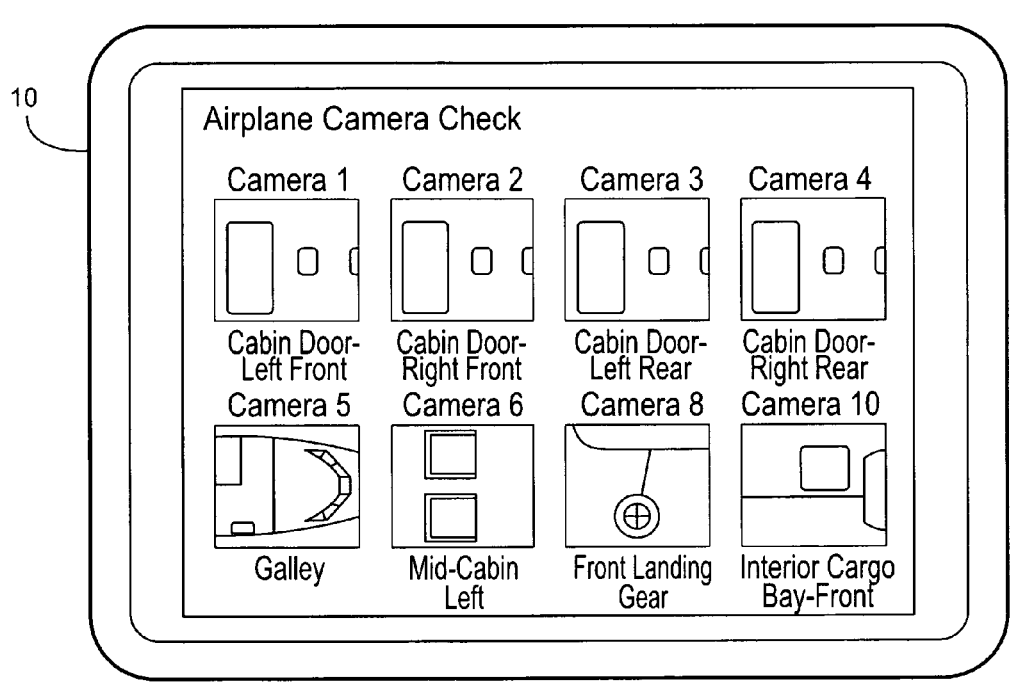

In the example of FIG. 33, multiple spaced-apart SCDs comprising respective waterproof IP-based video cameras C1, C2, C3, and C4 are mounted proximate the bow, stern, and port and starboard sides of a watercraft "W". As the watercraft "W" approaches a dock or slip "D", one or more distance sensors automatically activate one or more of the SCD cameras C1-C4 and displays the associated viewing area in realtime to the driver (or other user) on the display screen of Tablet 10. Each camera C1-C4 may also be selectively manually activated by selecting a tab icon on the Tablet's display screen.

In the example of FIGS. 34, 35, 36, and 37, SCDs comprising respective temporary CCTV video cameras C1, C2 are located at each wing of an aircraft "A". When the aircraft is "A" engaged by a tug or dolly "T", a tow sensor automatically activates the cameras and displays their associated viewing area in realtime to the tug or dolly operator (or other user) on the display screen of Tablet 10. Each camera C1, C2 may also be selectively manually activated by engaging a tab icon 91, 92 on the Tablet's display screen. Additional SCDs comprising CCTV video cameras may be located in the cockpit, cabin, and cargo areas of the aircraft, and proximate the landing gear. These areas can be separately viewed by the flight crew on the Tablet's display screen by selecting respective tab icons, as described above.

Figure 38:
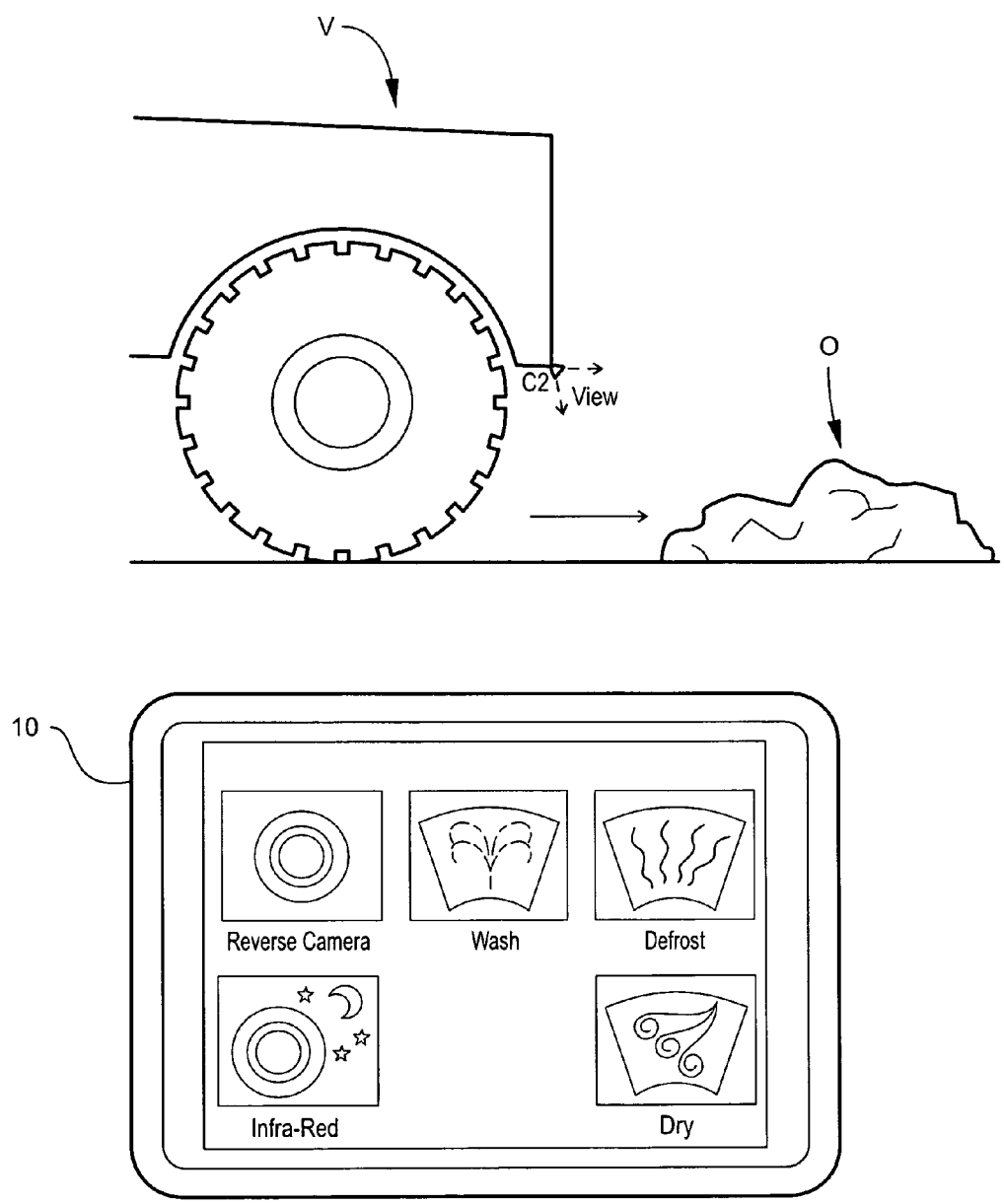
FIG. 38 illustrates an exemplary implementation of the present method to assist with reversing and maneuvering a heavy duty mining vehicle.

In the example of FIG. 38, the SCD comprises a CCTV video camera C1 mounted proximate the rear bumper of a mining vehicle "V" (or other construction vehicle). As the vehicle "V" approaches an obstacle "O ", a distance sensor automatically activates the camera C1 and displays a rearward viewing area in realtime to the driver (or other use) on the display screen of Tablet 10. Alternatively, the SCD camera C1 may be automatically activated upon movement of the vehicle transmission into the reverse gear. The camera may also be selectively manually activated by engaging a tab icon on the Tablet's display screen. Additional tab icons may be provided and selected to enable infrared viewing, to activate a camera wash system, to activate a camera defrost system, and to activate a camera drying system.

Figure 39:
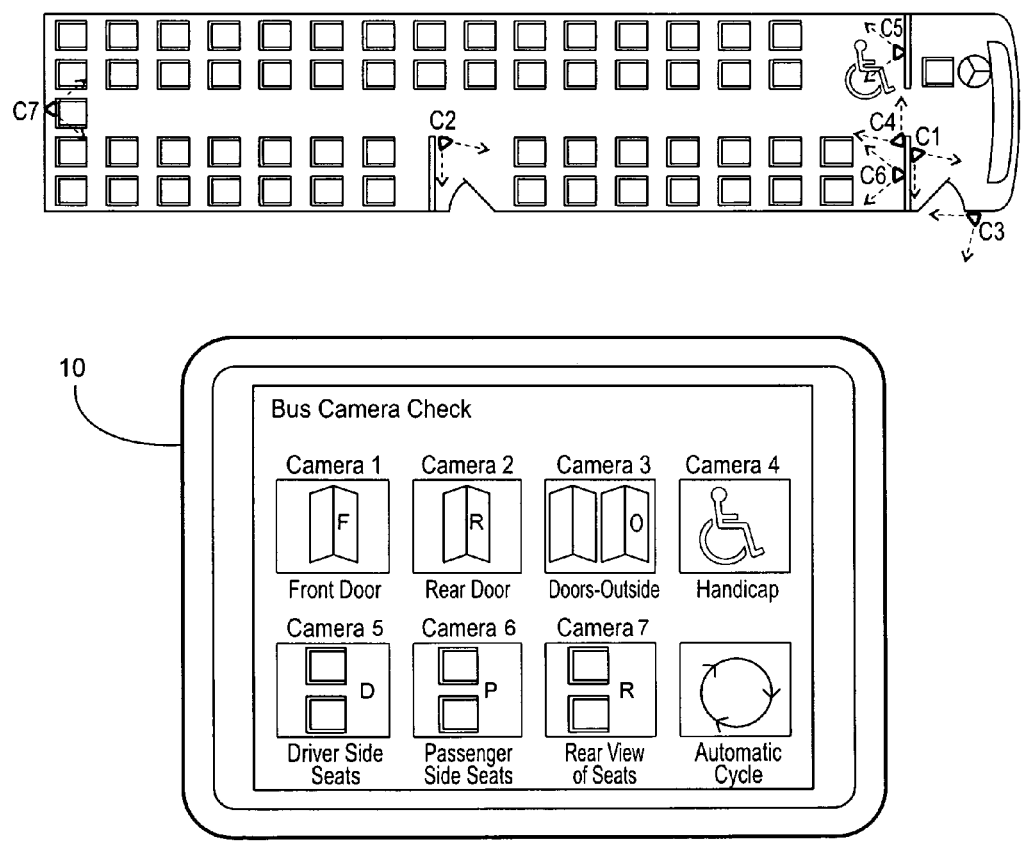
FIG. 39 illustrates an exemplary implementation of the present disclosure applicable in the bus transportation industry.

In the example of FIG. 39, multiple SCDs comprising wireless IP cameras are strategically located within the interior of a passenger bus, and are operatively paired or synched with the driver's Tablet computer 10. The bus driver can auto-cycle the individual camera feeds at predetermined intervals, or may select a touchscreen icon on his Tablet to display the video feed from any desired SCD. When driver stops to load and unload passengers, respective front and rear door open sensors (or switches) may automatically active certain SCD cameras thereby allowing the driver to readily view loading and unloading passengers to be certain that doorway areas are cleared before closing.

Other Exemplary Implementations (Not Shown)

In addition to the examples above, the present method may be implemented in numerous other vehicle-related scenarios. For example, in the event of a vehicle accident causing one or more air bags to deploy, an air bag sensor may trigger automatic activation of all SCD cameras mounted on the vehicle to capture and record realtime data at the scene.

In another example, a fuel tank sensor may trigger automatic activation of an exterior SCD camera proximate the fuel tank. This camera may be used to verify and/or authorize vehicle refueling. The fueling process may be viewed by a remote administrator in realtime on any web-enabled computer.

In yet another example, an engine starter sensor may trigger automatic activation of an interior cabin SCD camera proximate the driver's seat. This camera may capture and record the driver's facial image, and may incorporate facial recognition technology to verify and authorize vehicle operation. Once activated, the camera may be viewed by a remote administrator in realtime on any web-enabled computer.

In yet another example, sensors are located at the rear door of the vehicle trailer and are operatively paired with one or more trailer-mounted SCD cameras. When the door is opened, the sensors cause the cameras to automatically activate and display their viewing area in realtime on the user's Tablet display screen.

In other examples, the present disclosure may employ sensors connected to the vehicle steering wheel, ABS braking system, speedometer, lights, and turn signals which selectively activate respective paired SCD cameras. The activated cameras automatically display their viewing area in realtime on the driver's Tablet display screen to facilitate vehicle operation and maneuvering. Additionally, cameras located inside the vehicle cab may automatically activate and record any improper usage of a cell phones, smartphone, Tablet, or other computing devices by the driver while operating the vehicle.

In another exemplary implementation, video cameras may be strategically arranged at a vehicle dock location, and may automatically pair (via Wi-Fi or Bluetooth) with the driver's Tablet computer when the vehicle reverses towards the dock. The driver can then use the Tablet display screen to assist in maneuvering the vehicle.

Exemplary Maneuvers Utilizing Vehicle SCDs

Figure 40:
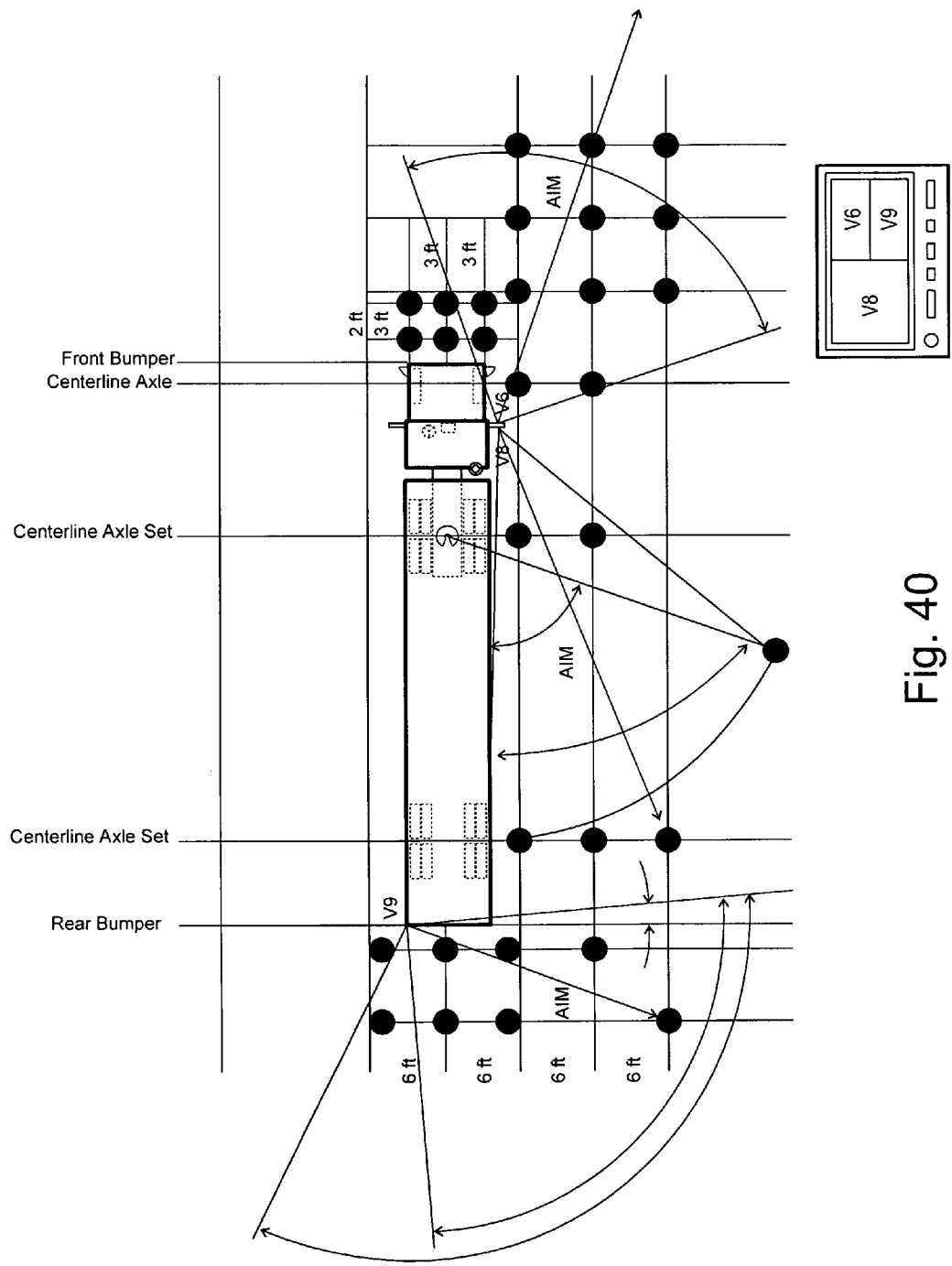
FIGS. 40-43 illustrate increased driver view ranges achieved during various maneuvers in a heavy-duty vehicle utilizing the exemplary SCDs (including SCMs) of the present disclosure.

FIGS. 40-43 demonstrate exemplary implementations of the present disclosure utilizing a plurality of SCDs mounted on tractor-trailer vehicle. The exemplary SCDs comprise forward facing and/or rearward facing video cameras, as previously described. In FIG. 40, the tractor-trailer vehicle incorporates SCD cameras V6, V8 and V9—which are collectively and individually viewable on a cab-integrated screen (or driver Tablet) with touchscreen control panel. As shown in FIG. 44, the cab-integrated display screen may be located inside the cab to the right of the steering wheel. SCD camera V6 is aimed as indicated at arrow to capture a 90-degree forward-facing minimum view angle. SCD camera V8 is aimed as indicated at arrow to capture a 40 to 50-degree rearward-facing minimum view angle. Cameras V6 and V8 are mounted (e.g., in tandem-oppositely directed) at an uppermost point of the vehicle's passenger side mirror bracket. SCD camera V9 is located at a passenger side corner of the trailer, and may be aimed as indicated at arrow to capture a 90-degree rearward-facing view angle. Alternatively, camera V9 may be aimed as indicated by arrow to capture wider 120-degree rearward-facing view angle. The SCD cameras V6, V8, V9 are operatively linked to the vehicle right turn signal, such that the cameras automatically display on the cab-integrated screen when driver uses the turn signal to indicate a right lane change/merge maneuver.

Figure 41:
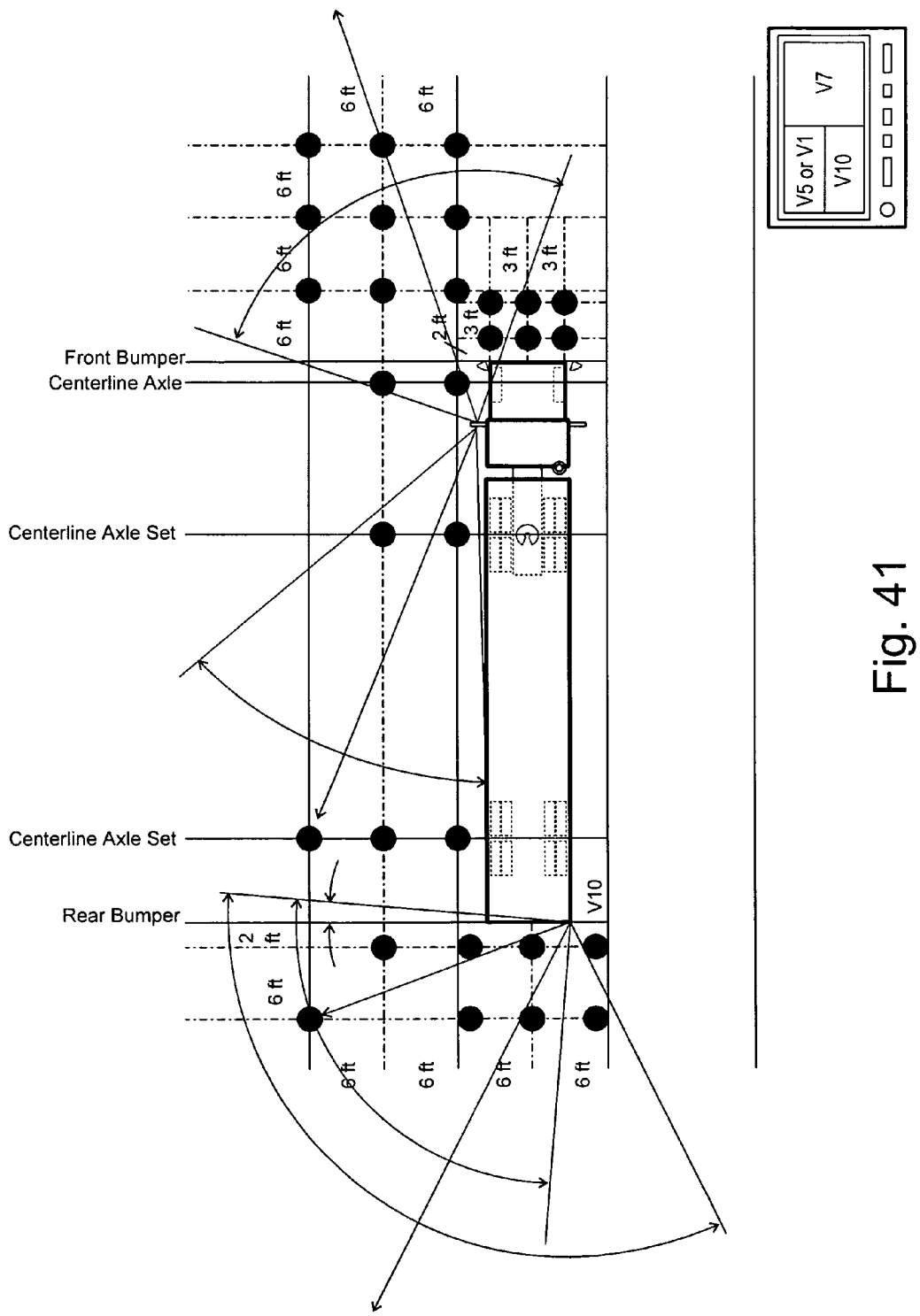

As indicated in FIG. 41, the tractor-trailer vehicle incorporates SCD cameras V5, V7 and V10—which are collectively and individually viewable on the cab-integrated screen (or driver Tablet) with touchscreen control panel. As shown in FIG. 44, the display screen may be located inside the cab at a base of the driver side pillar and to the left of the steering wheel. SCD camera V5 is aimed as indicated at arrow to capture a 90-degree forward-facing minimum view angle. SCD camera V7 is aimed as indicated at arrow to capture a 40 to 50-degree rearward-facing minimum view angle. Cameras V5 and V7 are mounted (e.g., in tandem-oppositely directed) at an uppermost point of the vehicle's driver side mirror bracket. SCD camera V10 is located at a passenger side corner of the trailer, and may be aimed as indicated at arrow to capture a 90-degree rearward-facing view angle. Alternatively, camera V10 may be aimed as indicated by arrow to capture wider 120-degree rearward-facing view angle. The SCD cameras V5, V7, V10 are operatively linked to the vehicle left turn signal, such that the cameras automatically display on the cab-integrated screen when driver uses the turn signal to indicate a left lane change/merge maneuver.

Figure 42:
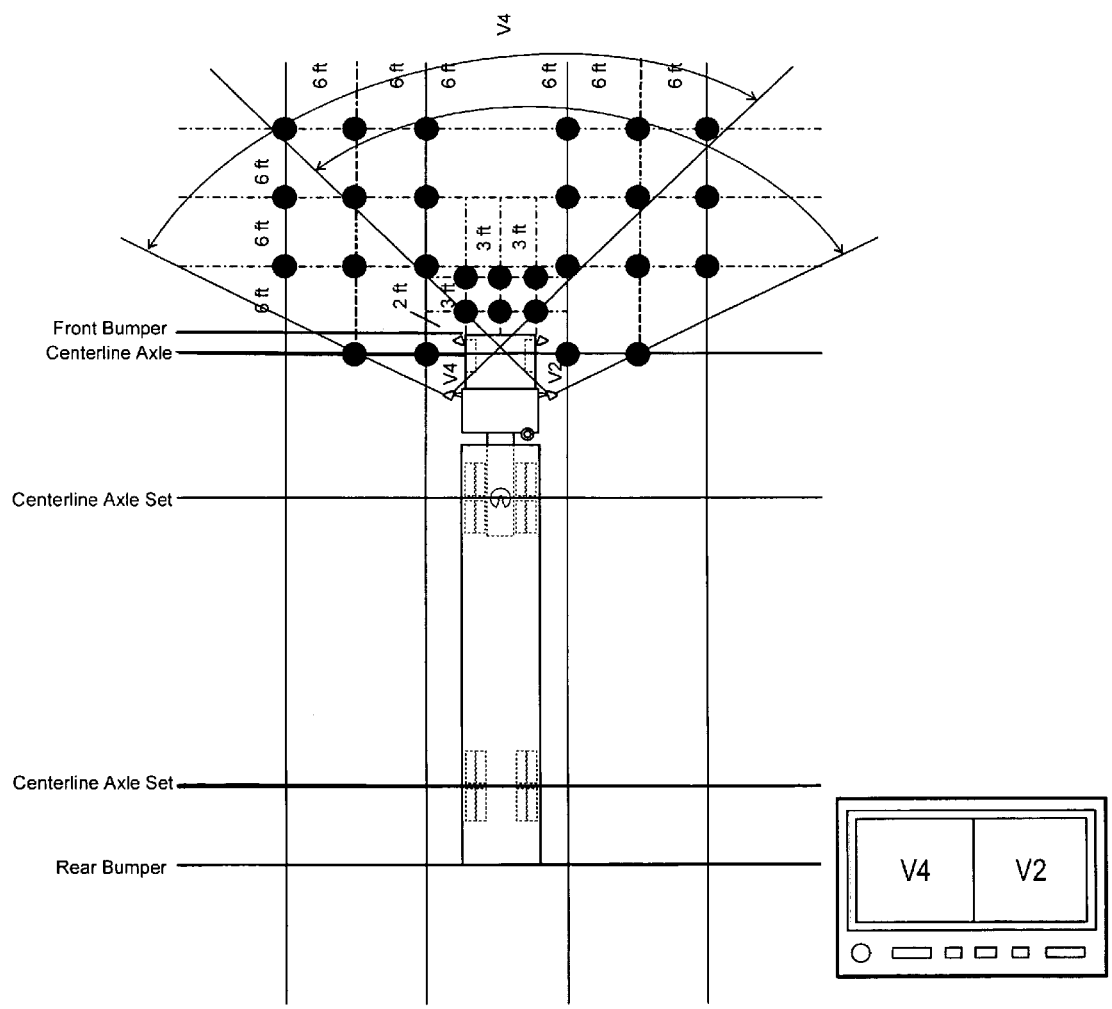

In the example of FIG. 42, the tractor-trailer vehicle incorporates SCD cameras V2 and V4—which are collectively and individually viewable on the cab-integrated screen (or driver Tablet) with touchscreen control panel. In this example, the display screen may be located inside the cab either at a base of the driver side pillar and to the left of the steering wheel, or to the right of the steering wheel. SCD camera V2 is mounted at an uppermost point of the vehicle's driver side mirror bracket, and is aimed as indicated at arrow to capture a 120-degree forward-facing minimum view angle. SCD camera V4 is mounted at an uppermost point of the vehicle's passenger side mirror bracket, and is likewise aimed as indicated at arrow to capture a 120-degree forward-facing minimum view angle. The SCD cameras V2 and V4 are operatively linked to the vehicle's transmission and/or ECM, such that when the vehicle is in a low gear or moving slowly (e.g., less than 15 mph) the cameras automatically display on the cab-integrated screen.

Figure 43:
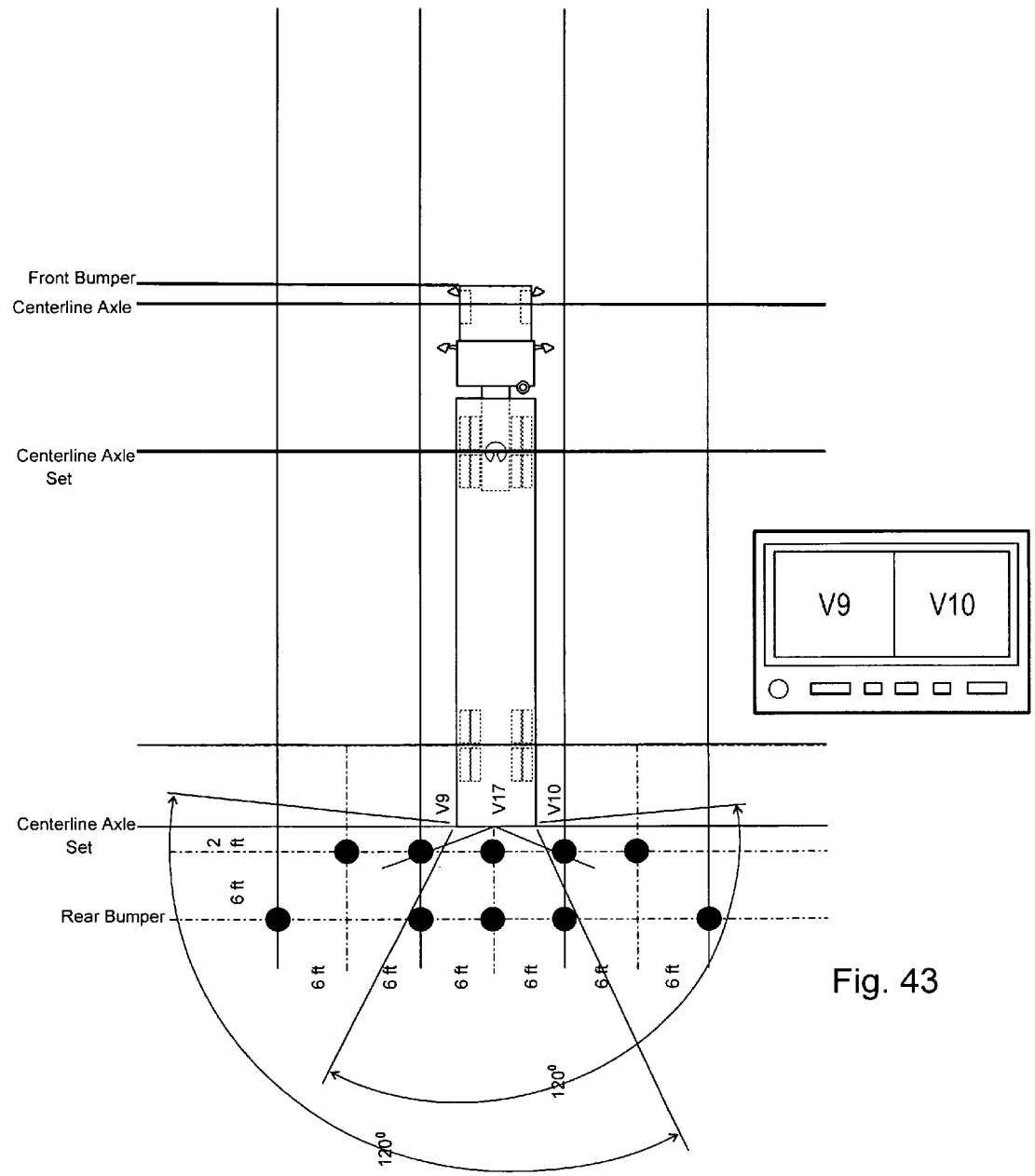
Figure 44:
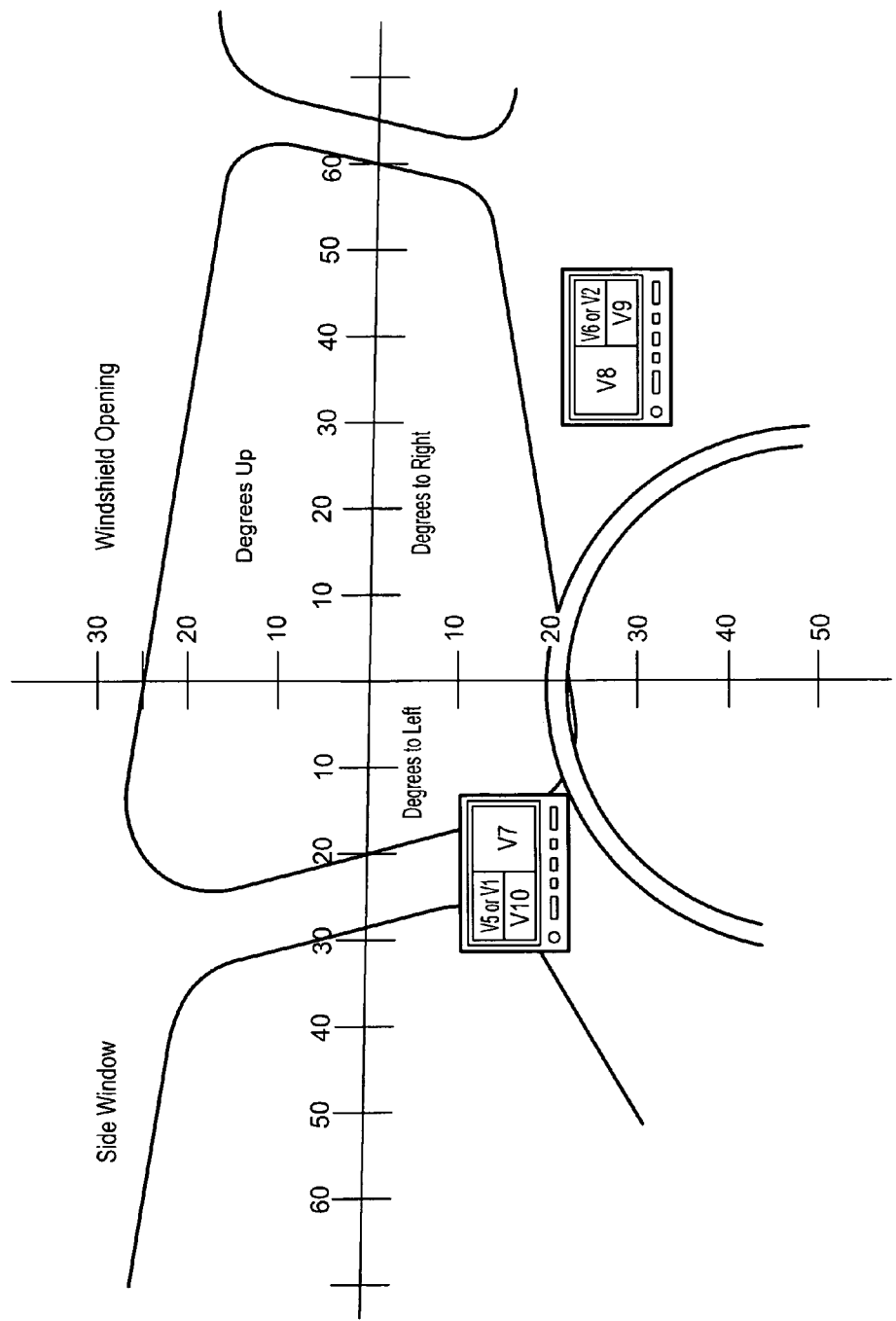
FIG. 44 is a schematic illustration showing an inside of the vehicle cab, and exemplary locations for locating a cab-integrated display screen and touchscreen control panel (interface)

In the example of FIG. 43, the tractor-trailer vehicle incorporates SCD cameras V9, V10, and V17—which are collectively and individually viewable on the cab-integrated screen (or driver Tablet) with touchscreen control panel. In this example, the display screen may be located inside the cab either at a base of the driver side pillar and to the left of the steering wheel, or to the right of the steering wheel. SCD cameras V9 and V10 are located at driver and passenger side corners of the trailer, respectively, and may be aimed as indicated at arrows to capture respective 120-degree rearward-facing view angles. SCD camera V17 is centrally located at a top end of the trailer, and may be aimed as indicated at arrow to capture a 120-degree rearward-facing view angle. The SCD cameras V9, V10 and V17 are operatively linked to the vehicle's transmission and/or ECM, such that when the vehicle is reverse gear the cameras automatically display on the cab-integrated screen.

Digital Transfers Between Vehicle Tractor and Trailer

Figure 45:
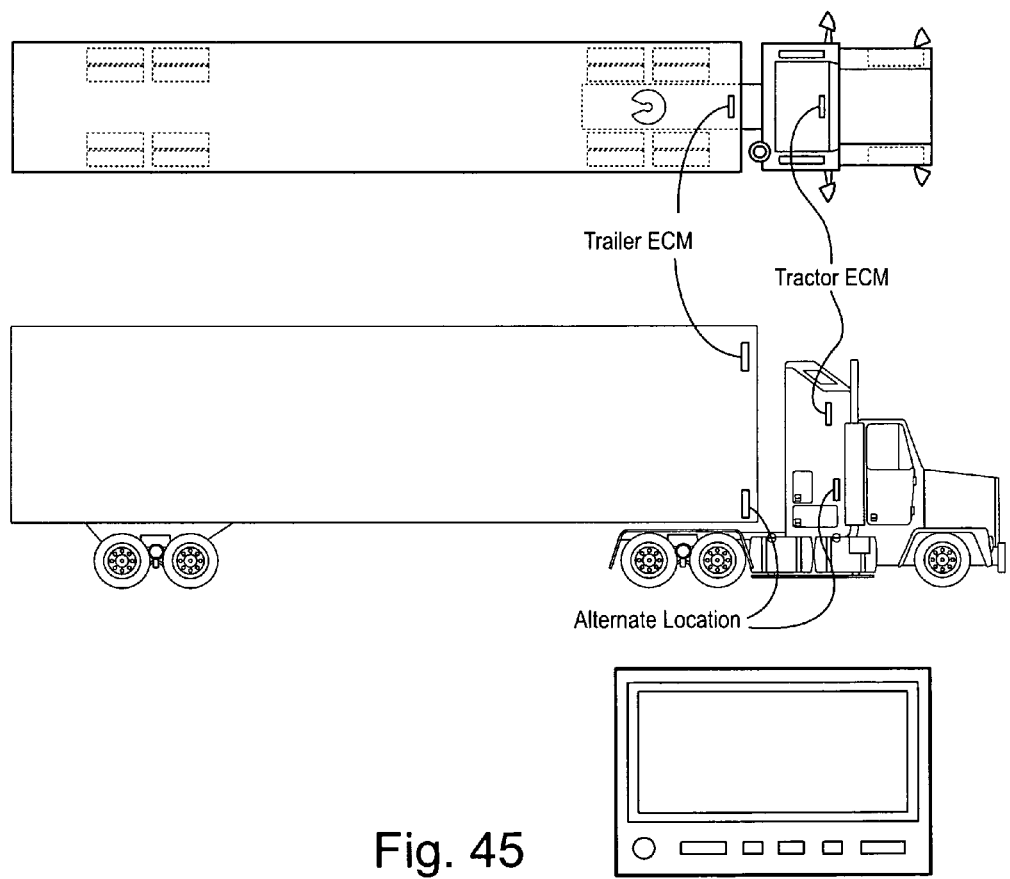
FIG. 45 is a schematic view illustrating exemplary electronic control modules (ECMs) for effecting digital transfers between tractor and trailer of a heavy-duty vehicle.
Figure 46:
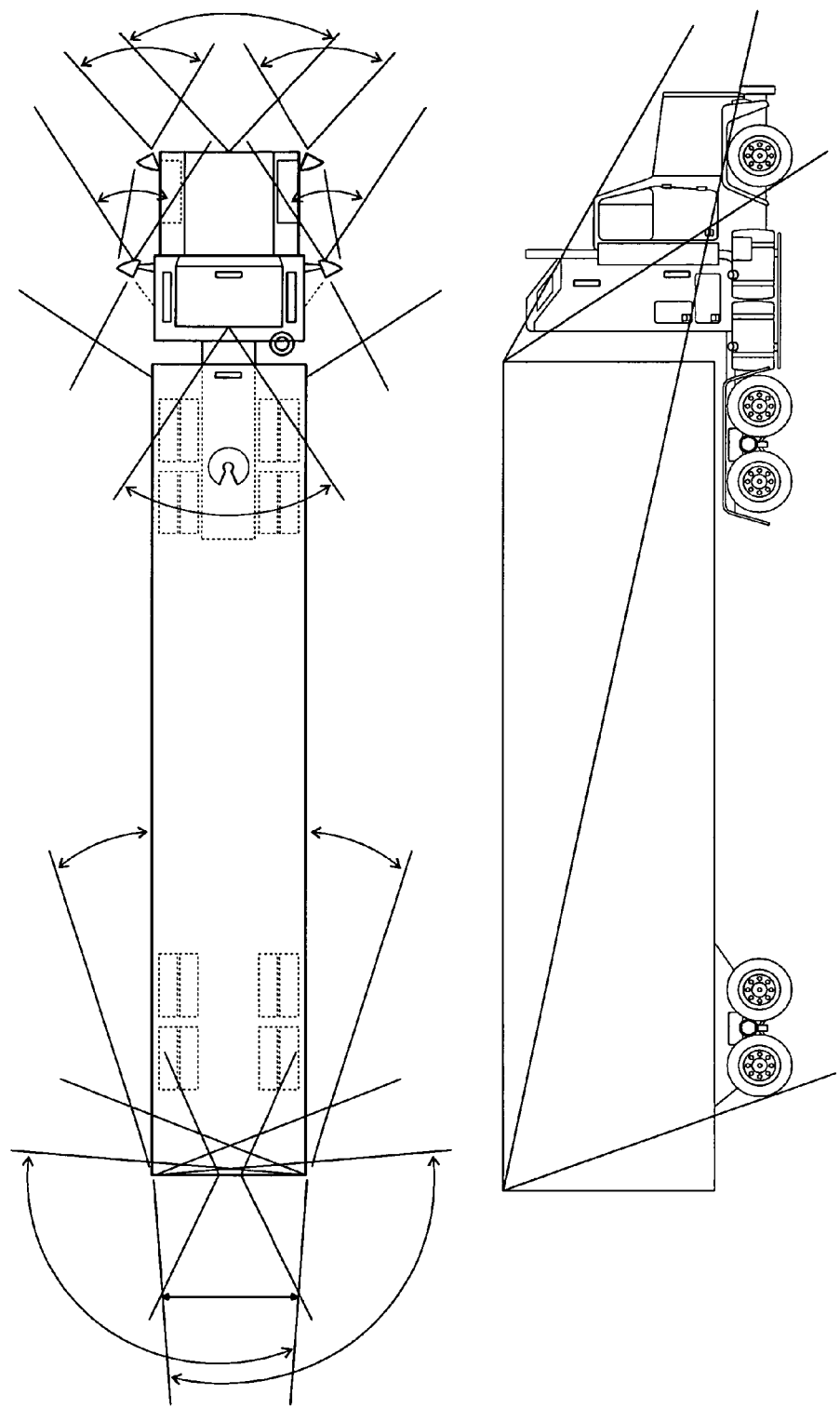
FIG. 46 is a further schematic view illustrating exemplary SCD camera locations on the vehicle.

Referring to FIGS. 45 and 46, digital transfers between tractor and trailer of the combination heavy-duty vehicle may occur via respective electronic control modules (ECMs). The trailer ECM is located at a front end of the trailer, and comprises an exposed (but weather protected) antenna. ECM functions as a collection point for digital trailer data, information and video signals. The tractor ECM is located on a back of the cab (or sleeper), and comprises an exposed weather-protected antenna arranged in line-of-sight with the trailer antenna.

FIG. 46 illustrates one example of a combination tractor-trailer vehicle equipped with 18 SCD cameras. Fender-mounted SCMs (as previously described) incorporate forward and rearward facing cameras 1, 2, 3, and 4. Side-mounted SCMs (previously described) comprise forward and rearward facing cameras 5, 6, 7, and 8. Other SCD camera locations include the rear trailer at opposite upper corners (cameras 9 and 10) facing rearward, the front trailer at opposite upper corners (cameras 11 and 12), facing forward, the rear trailer at opposite upper corners (cameras 13 and 14) facing forward, the center of vehicle grill (camera 15) facing forward, the center of the cab (camera 16) facing rearward toward 5th wheel, the center of the trailer (camera 17) facing rearward toward docking point, and the rear center of the trailer (camera 18) facing forward inside the trailer towards contents. The camera are collectively and individually viewable on a cab-integrated screen (or driver Tablet). In one example, the monitor may display a plan (or bird's eye) view of the entire combination vehicle with the various fields-of-view "stitched together", and automatically adjusting to show the articulation angle between the tractor and trailer when turning.

Synching SCDs and Tablet Using Near Field Communication

Figure 47:
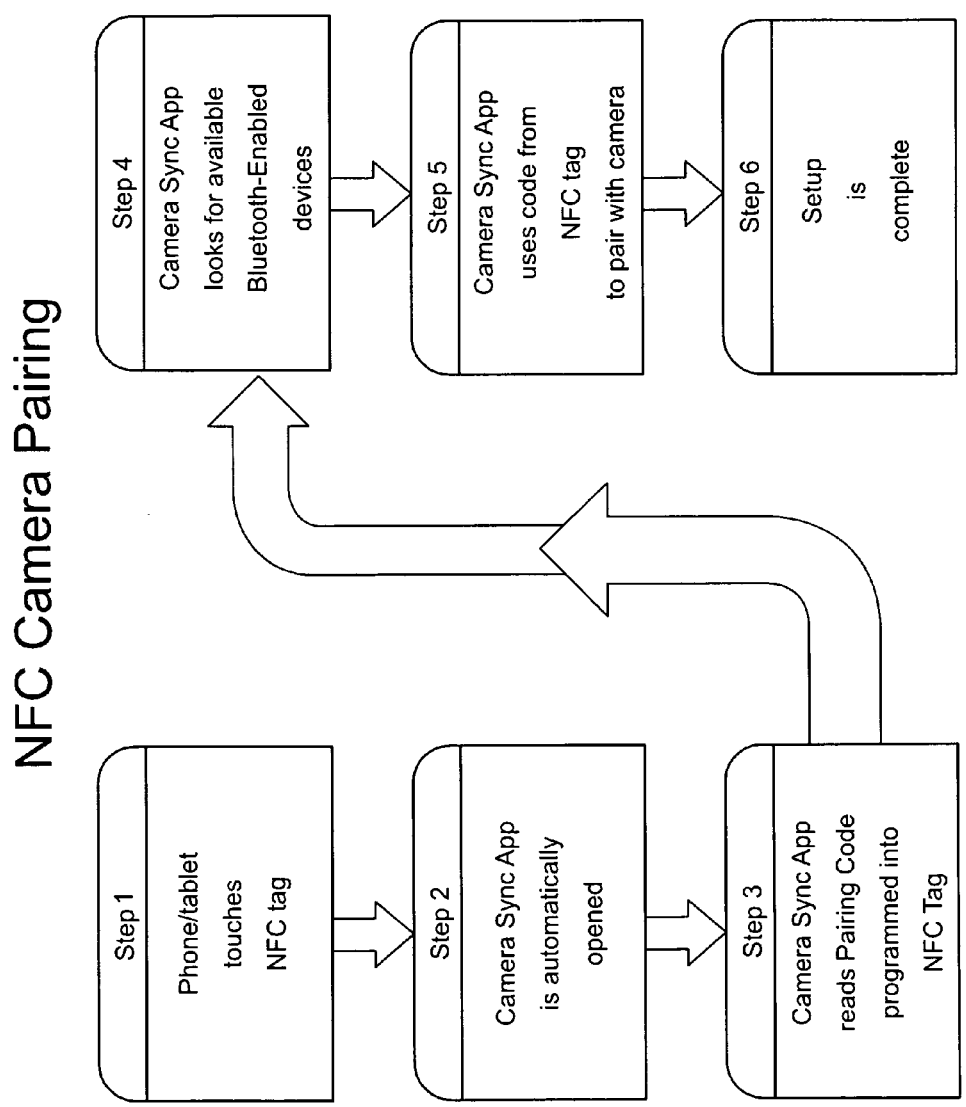
FIGS. 47, 48 and 49 demonstrate an exemplary process for synching or "pairing" the SCD cameras, Tablet computer, and vehicle subsystems.
Figure 48:
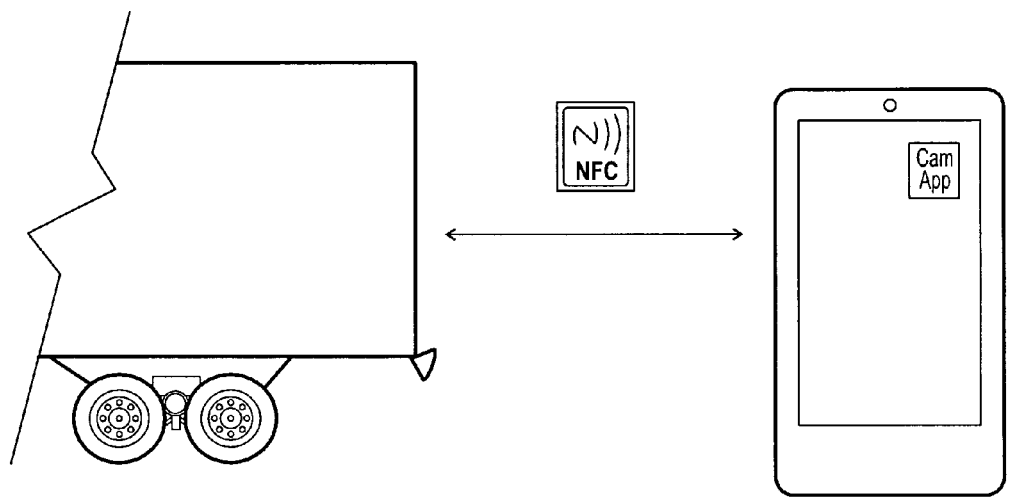
Figure 49:
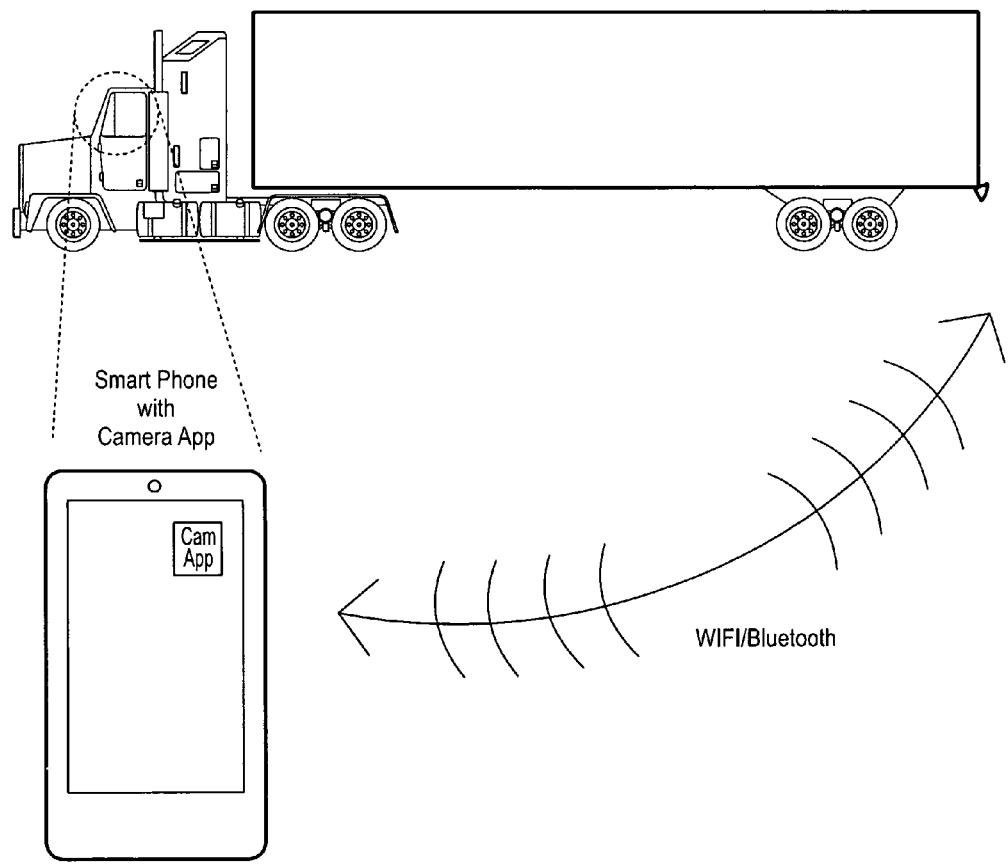

Referring to FIGS. 47, 48, and 49, Near Field Communication (or "NFC") may be utilized for wirelessly synching or "pairing" the driver's Tablet computer, SCD cameras and other electronics, and vehicle systems and subsystems (via PLC signals). NFC is a set of standards for Tablet computers, smartphones, and similar computing devices to establish radio communication with each other by touching them together or bringing them into close proximity, usually no more than a few centimeters. As illustrated in the flow diagram of FIG. 47, the present disclosure may utilize NFC and unpowered NFC chips (or "tags") for synching the driver's Tablet computer and the vehicle SCD cameras. In one implementation, NFC tags are located on each of the SCD cameras to be paired with the Tablet, as demonstrated in FIG. 48. The driver first "touches" the Tablet to a particular NFC tag, as indicated at Block 100. This action automatically opens a suitable camera sync (CS) app pre-installed on the Tablet. The CS app reads a pairing code programmed into the NFC tag, and then looks for available Bluetooth-enabled devices. The CS app uses the pairing code from the NFC tag to pair the located Tablet with the SCD camera. This completes the setup. Once paired, the Tablet computer, paired SCD camera, and vehicle communicate via WiFi/Bluetooth, as demonstrated in FIG. 49, thereby allowing the driver to see images and realtime video feed from the associated SCD. Alternatively, activation of a vehicle component or subsystem (such as the trailer brake valve or other panel valve) can be used to simultaneously power the connected tractor/trailer combination unit (via SAE J318 and J1067) and complete the pairing process—an approach transparent to the driver or user. NFC technology may also be used to automatically adjust vehicle seats and mirrors according to desired specifications pre-programmed by the driver using his Tablet computer.

SCD Housing and Maintenance

Figure 50:
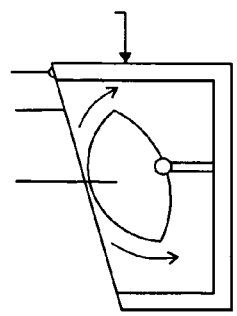
Figure 51:
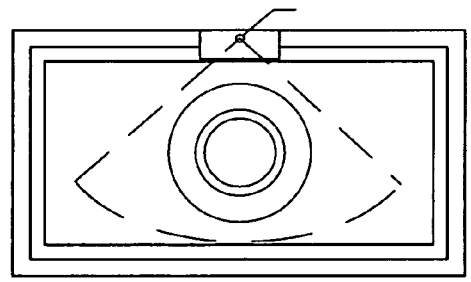
FIGS. 51, 52, and 53 illustrate an exemplary housing assembly of the present SCD, and a software-enabled user interface for commanding various maintenance features.
Figure 52:
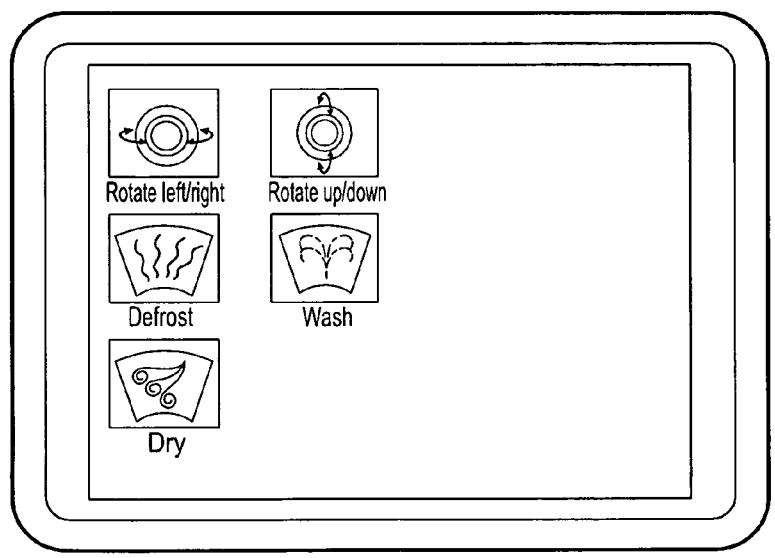

Referring to FIGS. 50, 51 and 52, the exemplary SCDs may include various maintenance functions and systems designed for selectively cleaning, drying and/or heating a transparent protective surface of the exterior housing. As previously described, the SCD wash system may comprise a focused wash nozzle, fluid line, wash fluid reservoir, and electric pump controlled by the driver via touchscreen icons on the wirelessly-connected Tablet. In locations with harsh environments and freezing temperatures, the wash system may further comprise a heated fluid option selected by the driver via touchscreen icon on the Tablet. The Tablet computer may further utilize gravity controls and wireless (Wi-Fi) communication for tilt adjusting the video camera within the protective housing, such that tilting the Tablet simultaneously tilts the camera in the same direction.

Hybrid Sensory Communication Mirror (SCM) with Realtime Video Display

Figure 53:
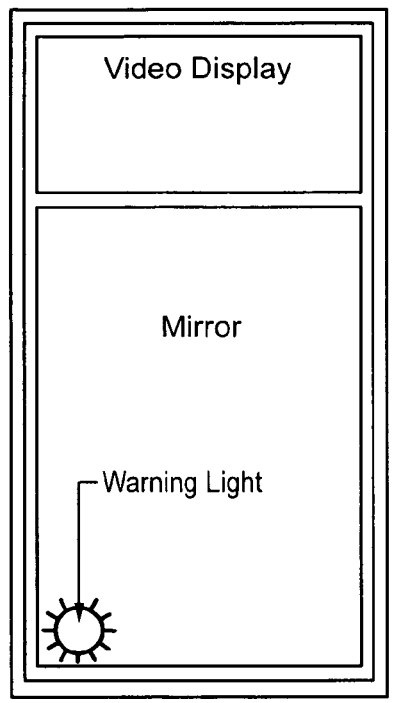
Figure 54:
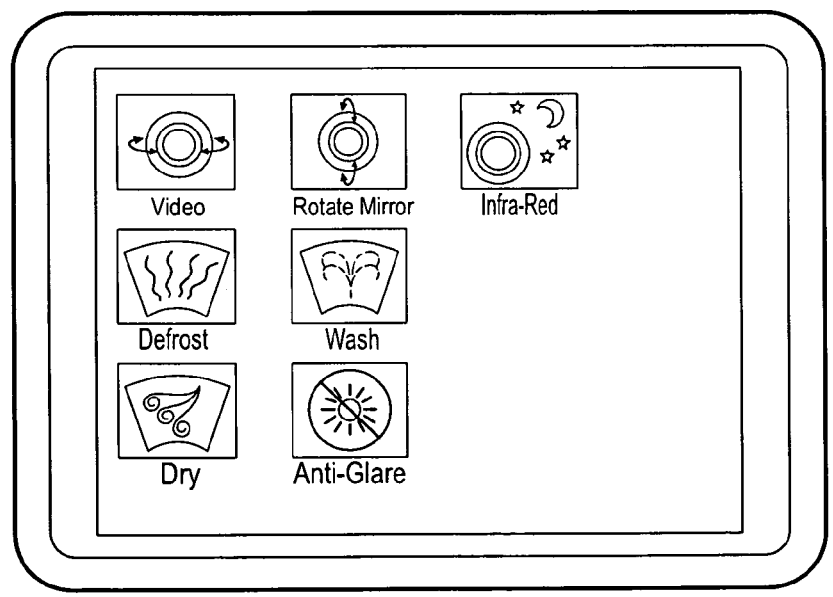
Figure 55:
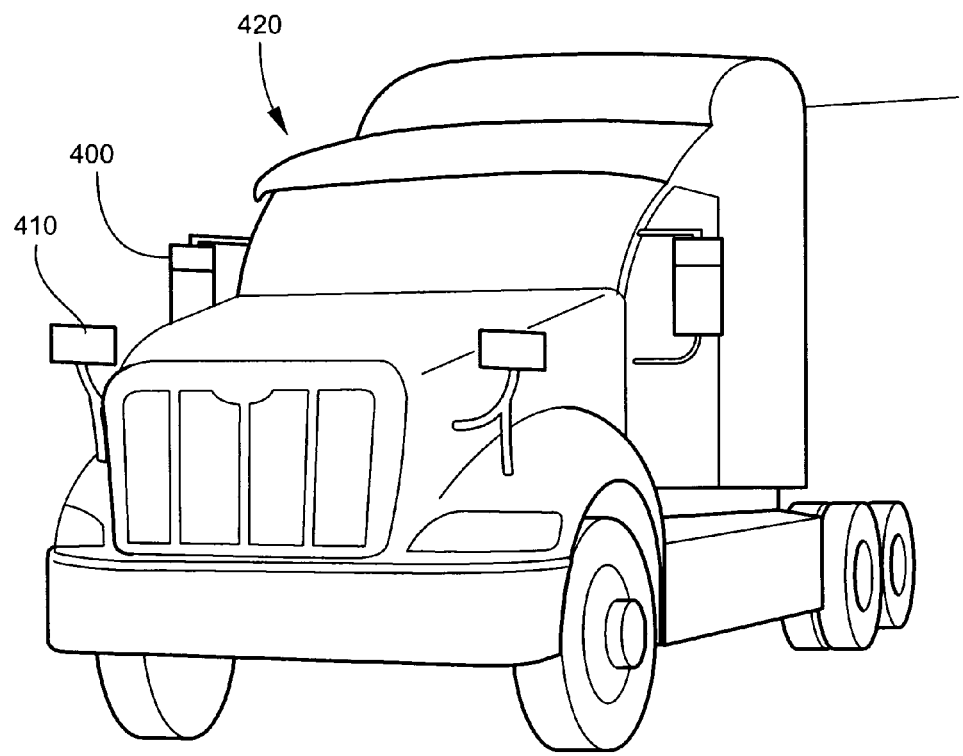
FIG. 55 shows a portion of a heavy-duty vehicle incorporating exemplary side and fender-mounted SCMs of the present disclosure.
Figure 56:
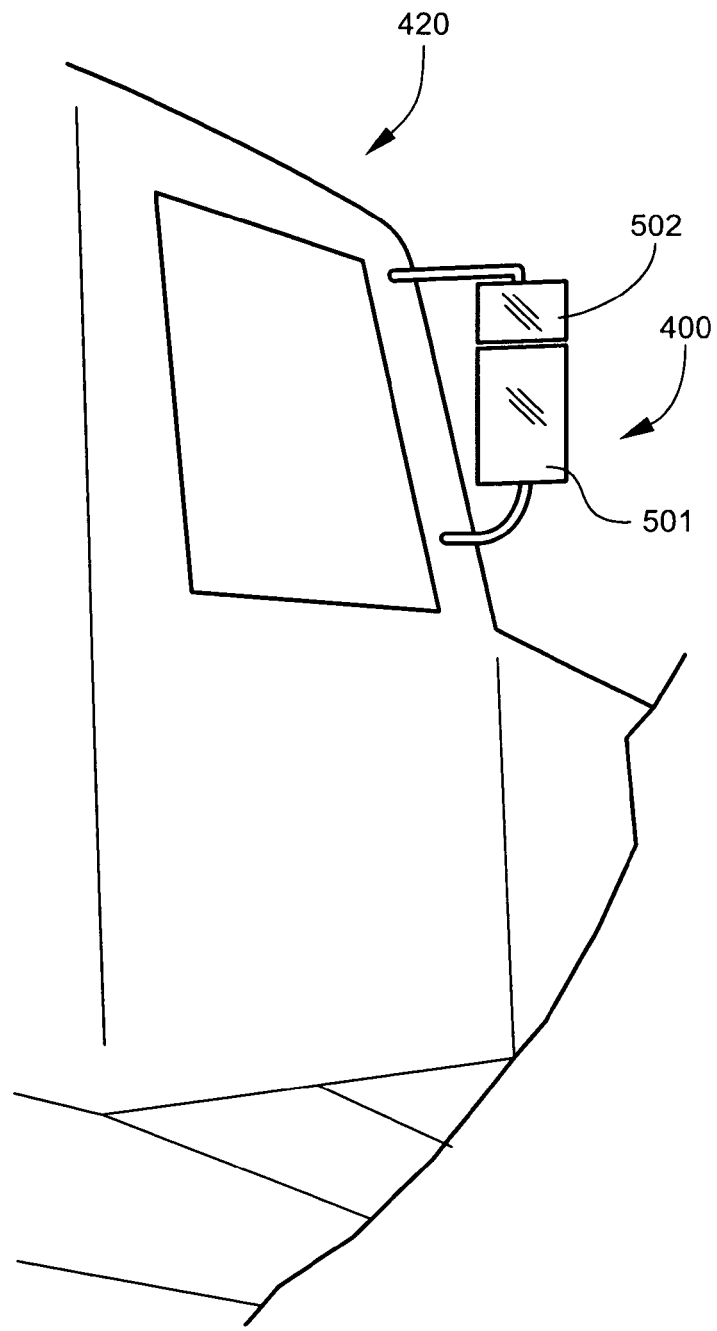
FIG. 56 illustrates a single side-mounted SCM located below a conventional (e.g., 50 sq-inch) flat mirror.
Figure 57:
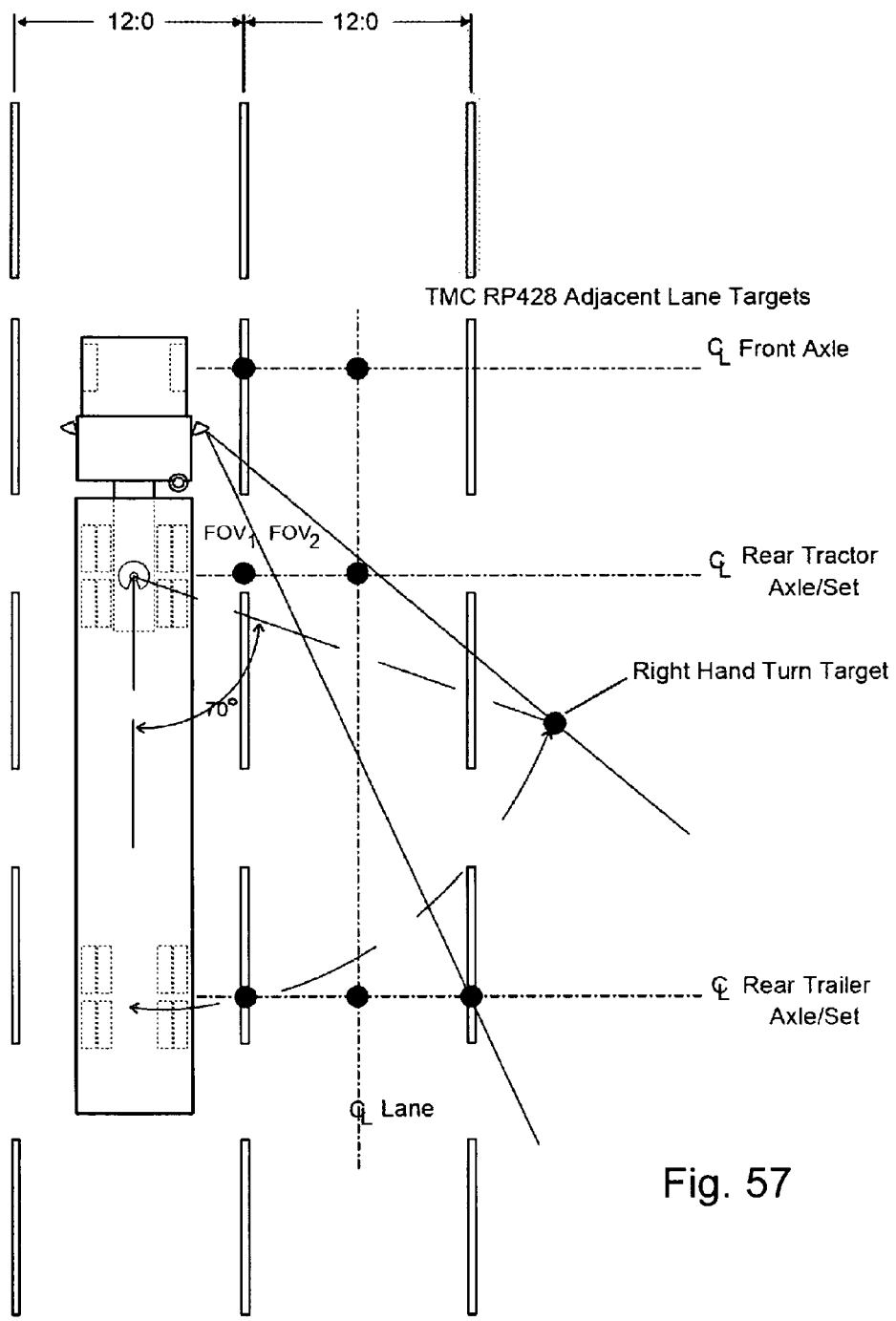
FIG. 57 illustrates various vision targets specified by TMC RP428.
Figure 58:
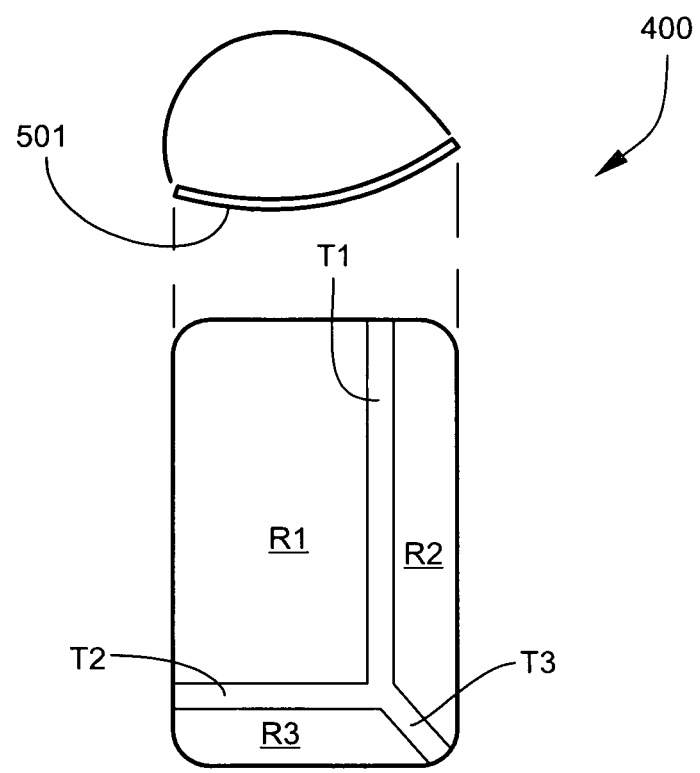
FIG. 58 shows one embodiment of the exemplary side-mounted SCM.

FIG. 53 illustrates a "hybrid" SCM comprising a rearview reflective member, forward and rearward facing video cameras, as previously described, and a video display capable of streaming realtime video feeds from one or both of the integrated cameras. The video display above the reflective member allows the driver to see a front view from Camera 1 (CI), while simultaneously viewing images in the rearview reflective member adjacent the driver's side of the vehicle. The hybrid SCM video display can be activated through voice commands received by Tablet microphone, thereby allowing the driver to maintain his focus and attention on the road. As shown in FIG. 54, touchscreen icons may also be provided on the driver's Tablet for enabling SCM features including (e.g.) defrost, wash, dry, anti-glare, infra-red for night vision, and orientation controls. In one embodiment, the reflective member and/or video cameras may be adjusted/oriented using gravity control software on the Tablet. These and other features may be also be selectively enabled by voice activation or other means.

Alternative SCD: Aerodynamic SCM with Multi-Radius Reflective Member

Referring to FIGS. 55-71, alternative SCDs of the present disclosure comprise aerodynamic situation communication mirrors (SCMs) 400, 410 applicable use on heavy-duty vehicles 420. SCMs 400 are mounted to the vehicle body using conventional support structure (e.g., framing) and hardware on driver and passenger sides, while SCMs are mounted on respective vehicle fenders in a related known manner at both driver and passenger sides. In each case, the SCM comprises an aerodynamic housing and multi-radius reflective member.

Exemplary side-mounted SCMs 400 are illustrated in FIGS. 55-62—each comprising an aerodynamic housing and rearwardly facing multi-radius reflective member 501. The side-mounted SCMs 400 cooperate to increase the driver's view range (FOV) on both driver and passenger sides of the vehicle 420, and may be used alone or in combination with respective conventional 50 sq-in flat mirrors 502 shown in FIG. 56. The increased passenger side view (FOV1 and FOV2) relative to various TMC RP428 vision targets is demonstrated in FIG. 57. In the exemplary SCM 400, the driver field of view is increased using a multi-radius reflective member best shown in FIGS. 58-62 comprising first, second, and third arcuately distinct reflective surface areas R1, R2 and R3, respectively, divided by respective transition lines T1, T2, and T3. The first reflective surface area R1 is relatively large and generally rectangular, and has a curvature radius ranging from 500 to 3000 mm. In one example, the first reflective surface area R1 is approximately 5×13 inches. The second reflective surface area R2 is located at an outside margin of the reflective member 501, and is divided from the first area R1 by a longitudinal 0.75-inch wide reflective transition line T1. This surface area R2 is approximately 2 inches wide and 16 inches long. The curvature radius of the second reflective surface area R2 is in the range of 300 to 600 mm. The transition line T1 extends from a top of the reflective member 501 to the third reflective surface area R3. This reflective surface area R3 is formed at a bottom margin of the reflective member 501, and has a curvature radius in the range of 200 to 400 mm. The third surface area R3 is approximately 2 inches wide and 7.75 inches long. The first and third surface areas R1, R3 are divided by a longitudinal 0.75-inch wide reflective transition line T2 extending from an inside edge of reflective member 501 to the second reflective surface area R2. The second and third reflective surface areas R2, R3 are divided by a short 0.75-in wide reflective diagonal transition line T3.

Figures 63, 64:
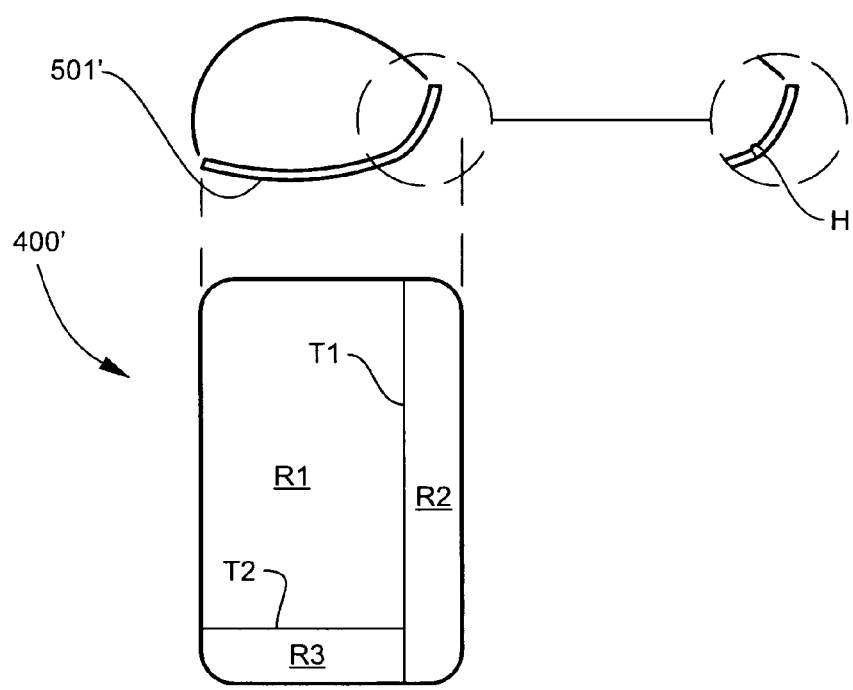
FIGS. 63 and 64 illustrate an alternative exemplary side-mounted SCM.
Figure 65:
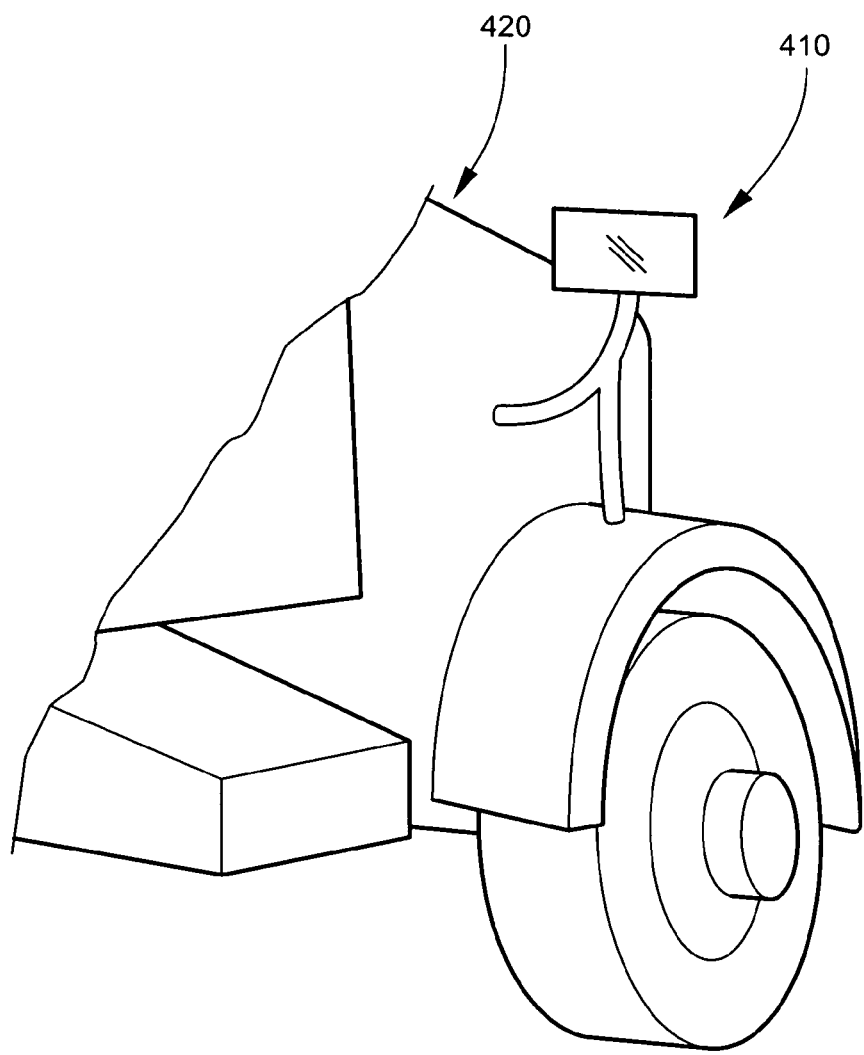
FIG. 65 shows a portion of a heavy-duty vehicle incorporating exemplary fender-mounted SCMs.
Figure 66:
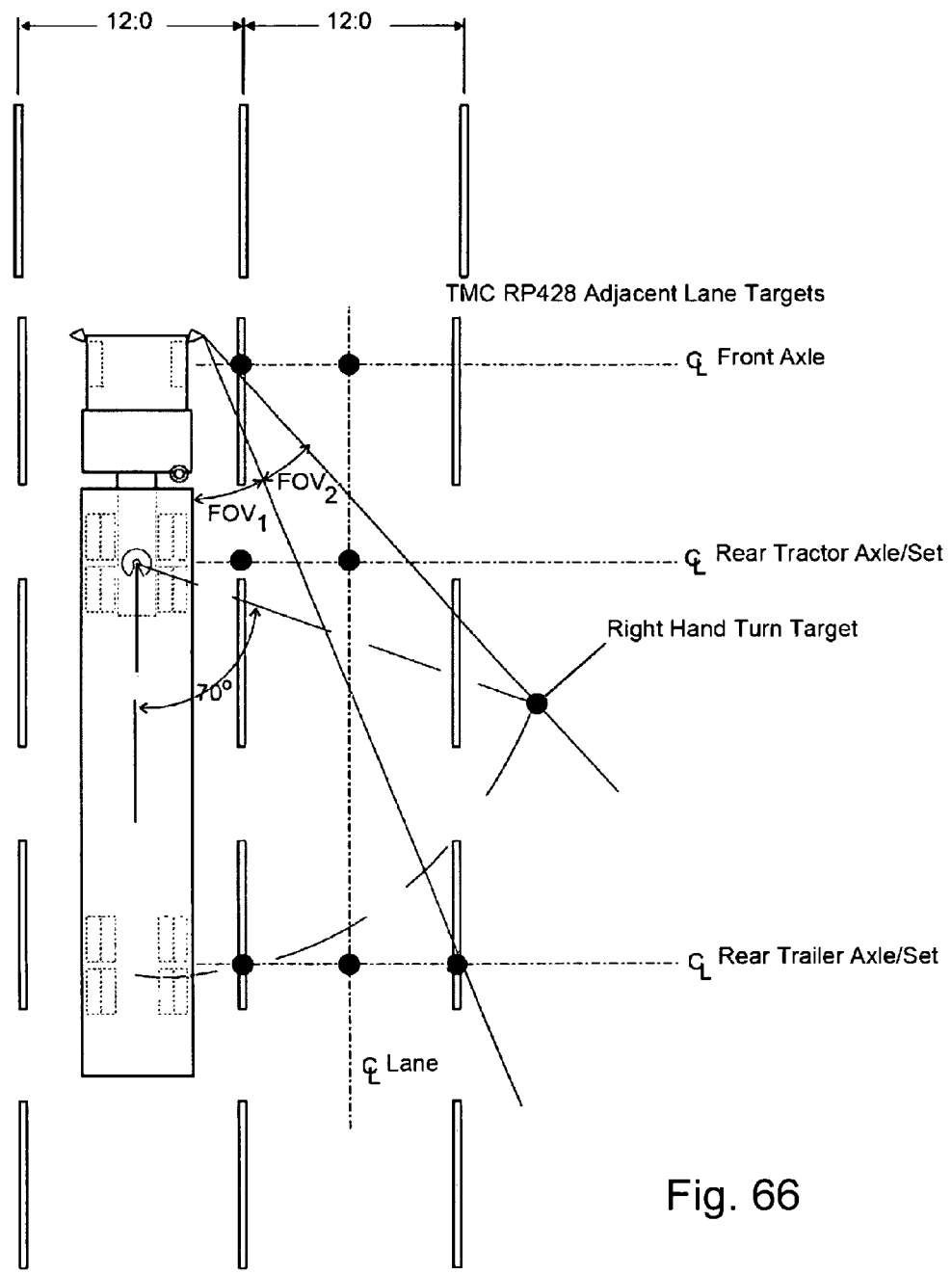
FIG. 66 illustrates various vision targets specified by TMC RP428.
Figure 67:
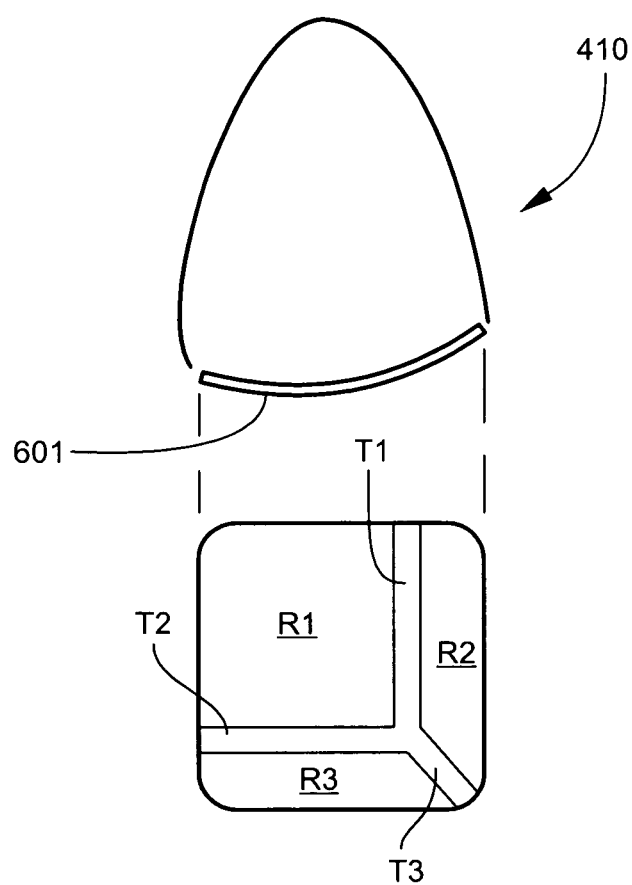
FIG. 67 shows one embodiment of the exemplary fender-mounted SCM.

In an alternative SCM 400' shown in FIGS. 63 and 64, the driver field of view is increased using a multi-radius reflective member 501' comprising first, second, and third arcuately distinct reflective surface areas R1, R2, R3 divided by sharp (or less 0.25 inches wide) transition lines T1, T2. The first reflective surface area R1 is relatively large and generally rectangular, and has a curvature radius ranging from 500 to 3000 mm. The second reflective surface area R2 is located at an outside margin of the reflective member 501', and is divided from the first area by a sharp longitudinal transition line T1. The curvature radius of the second reflective surface area R2 is in the range of 300 to 600 mm. The transition line extends from a top edge of the reflective member 501' to the bottom of the reflective member 501'. The third reflective surface area R3 is formed at a bottom margin of the reflective member 501', and has a curvature radius in the range of 200 to 400 mm. The first and third surface areas R1, R3 are divided by a sharp longitudinal transition line T2 extending from an inside edge of reflective member 501' to the second reflective surface area R2. The second and third reflective surface areas R2, R3 are likewise generally rectangular. In this embodiment, living hinges "H" (e.g., FIG. 64) may be provided at respective transition lines T1, T2 to enable slight flexing of the reflective surface areas R1, R2, R3 relative to one another.

Exemplary fender-mounted SCMs 410 are illustrated in FIGS. 65-71—each comprising an aerodynamic housing and rearwardly facing multi-radius reflective member 601. The fender-mounted SCM 410 cooperate to increase the driver's view range (FOV) on both driver and passenger sides of the vehicle 420. The increased passenger side view (FOV1 and FOV2) relative to various TMC RP428 vision targets is demonstrated in FIG. 66. In the exemplary SCM 410, the driver field of view is increased using a multi-radius reflective member 601 best shown in FIGS. 67-71 comprising first, second, and third arcuately distinct reflective surface areas R1, R2, R3 divided by respective transition lines T1, T2, T3. The first reflective surface area R1 is relatively large and generally rectangular, and has a curvature radius ranging from 500 to 3000 mm. In one example, the first reflective surface area R1 is approximately 5.25×7.25 inches. The second reflective surface area R2 is located at an outside margin of the reflective member 601, and is divided from the first area R1 by a longitudinal 0.75-inch wide transition line T1. This surface area R2 is approximately 2 inches wide and 8 inches long. The curvature radius of the second reflective surface area R2 is in the range of 300 to 600 mm. The transition line T1 extends from a top of the reflective member 601 to the third reflective surface area R3. This reflective surface area R3 is formed at a bottom margin of the reflective member 601, and has a curvature radius in the range of 200 to 400 mm. The third surface area R3 is approximately 2 inches wide and 10.0 inches long. The first and third surface areas R1, R3 are divided by a longitudinal 0.75-inch wide transition line T2 extending from an inside edge of reflective member 601 to the second reflective surface area R2. The second and third reflective surface areas R2, R3 are divided by a short 0.75-in wide diagonal transition line T3.

In each of the exemplary SCMs 400, 410 discussed above, the multi-radius reflective member 501, 601 locates key visual areas in close proximity. The largest surface area of the reflective member provides a broad field of view (FOV) with relatively little visual distortion, and may be used to observe the adjacent lane with increased coverage—balancing the broad FOV with image size needed for clarity of view (COV). The driver FOV may be sufficient to capture 5 adjacent lane RP428 vision targets. The smaller radius surface area on the outside margin of the reflective member provides a wider FOV allowing detection of encroaching vehicles or objectives, and is particularly useful to observe the rear trailer wheels when turning a corner (e.g., FOV may include 70-degree turn RP428 vision target). The smaller radius surface area on the bottom margin of the reflective member provides an increased FOV towards the road surface (e.g.) less than 3 feet aft of the SCM.

The exact placement of the exemplary SCMs on the vehicle is optional and with trade-offs. The forward mounted location of the fender SCMs provides a greater FOV of the adjacent lane, but is farther from the driver and therefore offers reduced COV. The typical location at the side of the vehicle is closer to the driver but reduces the adjacent lane FOV. The combination of both side and fender locations may comprise a preferred solution, allowing the driver to select an optimum reflective (mirror) view for a specific driving maneuver. The reflective surfaces of the SCMs may be constructed of a scratch-resistant plastic or glass substrate. Reflective surfaces areas of the driver side and passenger side SCM are symmetrically opposite. In other words, in each case the longitudinal outside margin of the driver and passenger side reflective member is the side margin farthest from the vehicle body.

Exemplary Mobile Apps

In further exemplary embodiments, the present disclosure comprises a computer program product (e.g., mobile app) including program instructions tangibly stored on a non-transitory computer-readable medium and operable to cause the driver's Tablet (or other stand-alone or integrated computing device) to communicate information, vehicle data, entertainment, and more. For example, the driver's Tablet may comprise application software for enabling a dashboard-centric interface with tab icons for manually activating selected SCD video cameras, such that when the driver selects on a tab icon, realtime vehicle information transmitted by the video camera is output to the Tablet. The mobile app default setting may be video camera(s). Video cameras can also be displayed by driver request (voice activated when driving), or may be displayed automatically when the vehicle is in motion—the Tablet being capable of detecting movement of the vehicle.

According to another exemplary embodiment, the driver's Tablet may comprise a radio/music app using WiFi or Bluetooth and transmitting through wireless speakers within the vehicle cabin. This app may be voice-activated when the vehicle is moving, and allows the driver to select music, weather, sports, talk radio, news, or the like. Alternatively, the driver can manually select from a variety of touchscreen icon(s) when the vehicle is stopped. Within each category, the driver can create icons for various choices; or, for example, might choose to have a music service provider (e.g., Pandora) as a radio default with a preselected music preference. A wireless module on the steering wheel can be used to change stations/categories and control volume. These can also be changed/adjusted by voice command.

According to another exemplary embodiment, the driver's Tablet may further comprise a media entertainment app using WiFi or Bluetooth and transmitting audio through wireless speakers within the vehicle cabin. The exemplary media entertainment app cannot be activated while the vehicle is in motion. The Tablet's motion sensor detects vehicle movement and overrides ability to enable the app when driving. When at rest, the driver can select a movie through any available commercial service (e.g., Netflix or Flixster) or watch television shows with Hulu or other similar apps. Within each category, the driver can create icons for various choices and can manually select icons via the Tablet's touchscreen interface, or choose icons through voice command. Volume/sound can also be adjusted by voice command if activated.

According to another exemplary embodiment, the Tablet may further comprise a video conferencing app using WiFi or Bluetooth and transmitting audio through wireless speakers within the vehicle cabin. The exemplary video conferencing app cannot be activated while the vehicle is in motion. The Tablet's motion sensor detects vehicle movement and overrides ability to enable the app when driving. When at rest, the driver can video call with Skype (or other related service) to corporate office, home, or other location. This option can be voice activated for hands free communication while driving.

According to another exemplary embodiment, the Tablet may further comprise a GPS app which can be activated by manually selecting a touchscreen icon or through voice activation. The driver can input a desired route into the GPS app before starting his/her shift, and can periodically check the route for inclement weather, road closures, construction, accidents, and the like. Alternate routes can be located through the GPS using voice activation while driving (hands free communication). The GPS app can interface with MapQuest, DOT roadway information (weather/accidents), and local television traffic updates to notify the driver of realtime conditions along the current route. The GPS app can "speak" to the driver using Bluetooth and wireless speakers within the vehicle cab.

According to another exemplary embodiment, the Tablet may further comprise a weather app using WiFi or Bluetooth and transmitting audio through wireless speakers within the vehicle cabin. The weather app can be voice activated when driving to get realtime audio updates on weather. The exemplary app may provide current weather conditions, a 24-hour forecast, or a 5-day forecast. The driver may also retrieve weather updates for specific cities or locations along the route—all through voice activation. When the vehicle is stopped, the driver can select icons manually.

According to another exemplary embodiment, the Tablet may further comprise a truck stop vacancy app which allows the driver to find a convenient place to stop for the night, or through a required rest period. The truck stop app can be accessed manually through the Tablet's touchscreen icon or through voice activation. Future applications could utilize sensors in truck stop parking areas that monitor if space is occupied (similar to airport parking vacancy monitors, but located in-ground). If a travel stop is fully occupied, the app would display on the map as not having parking available, and the driver would continue to next truck stop without losing time exiting and searching for a parking spot.

According to another exemplary embodiment, the Tablet may further comprise a road temperature app which allows the driver to obtain an accurate reading of the road temperature while driving. The app can be enabled by the Tablet's touchscreen icon or through voice activation. This app is particularly useful for DOT/city snow maintenance trucks. By knowing road surface temperature, drivers can better treat the roadways, potentially cutting costs as only those areas that are at or below freezing would need to be treated. Used in conjunction with the GPS app discussed above, real data can be captured as to roads/sections of roads that are most frequently treated. This may help in prioritizing the treatment of certain roads by entering this data into GIS database. The system could also be automated, so that when a road temperature reading drops below 32 degrees F., magnesium chloride (or the like) is automatically dispensed.

According to another exemplary embodiment, the Tablet may further comprise a tire pressure/temperature app which allows a driver to obtain an accurate reading of the PSI (pressure) and temperature of vehicle tires while driving or at rest. This app can be selected manually via touchscreen icon or through voice activation. By checking PSI and temperature of tires on a regular basis, the driver may spot potential problems with tires and have them properly reconditioned or repaired. This app may save cost for the driver/trucking company, and would increase highway safety by potentially reducing the occurrence tire blow-outs.

According to another exemplary embodiment, the Tablet may further comprise a brake temperature app which allows a driver to obtain an accurate temperature of the brakes while driving or at rest, on both the tractor and the trailer. This app can be selected manually by touchscreen icon or through voice activation. By checking the temperature of brakes on a regular basis, the driver may prevent the brakes from overheating and locking up. This is especially important along routes where trucks must descend steep grades. By knowing when the brakes are starting to overheat, the driver can pull over quickly and allow the brakes to cool. This app may save cost for the driver/trucking company by decreasing downtime, and should also increase the safety of highways by reducing accidents caused by brake failure.

According to another exemplary embodiment, the Tablet may further comprise a fluid levels app which allow the driver to obtain an accurate reading of various fluid levels in the vehicle. This app can be selected manually by touchscreen icon or through voice activation. By checking the fluid levels on a regular basis, the driver may reduce vehicle breakdowns and/or overheating. Knowing that fluid levels are falling below established minimums, the driver can pull over and add more fluids or have the vehicle serviced. This app will not only save cost for the driver/trucking company by decreasing vehicle downtime, but may also increase the safety of highways by reducing breakdowns in high traffic areas and narrow roadways with no shoulders.

According to another exemplary embodiment, the Tablet may further comprise a reefer interface app which will allow a driver to obtain an accurate temperature of contents stored in the reefer tank. This app can be selected manually by touchscreen icon or through voice activation. By checking the temperature of the reefer tank on a regular basis, the driver may be able to prevent fluids (e.g., milk, orange juice, or the like) from spoiling if the temperature becomes to warm or begins to fluctuate. Knowing when the reefer temperature reaches becomes either too high or too low, the driver can pull over and have the reefer cooling system checked. This app may save cost for the driver/trucking company by ensuring that the contents of the reefer are transported and delivered at a safe temperature, thereby decreasing the risk of spoilage.

According to another exemplary embodiment, the Tablet may further comprise a mileage app which will allow the driver to accurately record miles driven and the hours of rest for the mileage/rest log (as required for all trucking vehicles). A motion sensor on the driver's Tablet automatically records mileage—when vehicle movement begins and continues until the vehicle stops. When the vehicle is at rest, the Tablet computes the minutes/hours the vehicle is not moving. The mobile app records all data for the driver to transmit back to the corporate office for log keeping.

According to another exemplary embodiment, the Tablet may further comprise auto cycle app which allows the driver to choose a frequency at which apps are automatically checked (e.g., every 60 min, 2 hours, etc.). The auto cycle app will check all Tablet apps at predetermined intervals and report to the driver, audibly, if there are any problems that he needs to be aware of, or if all systems are functioning properly. This app allows the driver to focus on driving without the need to remember when he last checked the systems, or if he checked all of the systems. The auto cycle would also be capable of generating a report, stating the time and day that the auto check occurred allowing the report to be saved and/or sent directly to the corporate office for record keeping. In the event that auto check reports a problem (e.g., brakes are overheating), the driver response time to get the system inspected and fixed would also be recorded (i.e., time it takes driver to stop and time at rest allowing brakes to cool down).

According to another exemplary embodiment, the Tablet may further comprise an interior video app which allows the driver to view the interior contents of the trailer, through infrared video, to make certain that loads have not shifted while driving. This app can be chosen manually by touchscreen icon, or through voice activation.

For the purposes of describing and defining the present invention it is noted that the use of relative terms, such as "substantially", "generally", "approximately", and the like, are utilized herein to represent an inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

Exemplary embodiments of the present invention are described above. No element, act, or instruction used in this description should be construed as important, necessary, critical, or essential to the invention unless explicitly described as such. Although only a few of the exemplary embodiments have been described in detail herein, those skilled in the art will readily appreciate that many modifications are possible in these exemplary embodiments without materially departing from the novel teachings and advantages of this invention. Accordingly, all such modifications are intended to be included within the scope of this invention as defined in the appended claims.

In the claims, any means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. Unless the exact language "means for" (performing a particular function or step) is recited in the claims, a construction under §112, 6th paragraph is not intended. Additionally, it is not intended that the scope of patent protection afforded the present invention be defined by reading into any claim a limitation found herein that does not explicitly appear in the claim itself.

What is claimed:

1. A situation communication mirror adapted for mounting to a transportation vehicle, said situation communication mirror comprising:
   a rearward facing reflective member comprising at least three integrally-formed and arcuately distinct reflective surface areas;
   the first reflective surface area having a relatively slight curvature defining a relatively focused driver field of view, and wherein the first reflective surface area extends from a top edge of said reflective member towards a bottom edge of said reflective member, and from an inside edge of said reflective member towards an outside edge of said reflective member;
   the second and third reflective surface areas each having an increased curvature as compared to the first surface area, and respectively defining wider driver fields of view, wherein the second reflective surface area comprises a longitudinal outside margin of said reflective member opposite the first reflective surface area, and extends from the top edge of said reflective member towards the bottom edge of said reflective member, and wherein the third reflective surface area comprises a longitudinal bottom margin of said reflective member, and extends from an inside edge of said reflective member towards an outside edge of said reflective member; and
   first, second, and third reflective elongated transition zones adjacent respective first, second, and third reflective surface areas, each transition zone having a degree of curvature intermediate the slight curvature of the first reflective surface area and the increased curvature of the second and third reflective surface areas, and said transition zones dividing the first, second, and third reflective surface areas and defining a visual transition between the relatively focused driver field of view provided by the first reflective surface area and the wider driver fields of view provided by the second and third reflective surface areas, and wherein the first transition zone extends longitudinally adjacent and between the first and second reflective surface areas, and has a width dimension greater than 20% of a width of said second reflective surface area, and wherein the second transition zone extends longitudinally adjacent and between the first and third reflective surface areas, and has a width dimension greater than 20% of a width of said third reflective surface area, and wherein the third transition zone extends diagonally adjacent and between the second and third reflective surface areas, and has a width dimension equal to the width dimension of said first and second transition zones.

2. A situation communication mirror according to claim 1, wherein said first reflective surface area is greater in dimension than said second and third reflective surface areas.

3. A situation communication mirror according to claim 1, wherein said first reflective surface area has a curvature radius in the range of 500 to 3000 mm.

4. A situation communication mirror according to claim 1, wherein said second reflective surface area has a curvature radius in the range of 300 to 600 mm.

5. A situation communication mirror according to claim 1, wherein said third reflective surface area has a curvature radius in the range of 200-400.

6. In combination with a transportation vehicle, a situation communication mirror mounted to the vehicle and comprising:
   a rearward facing reflective member comprising at least three integrally-formed and arcuately distinct reflective surface areas;
   the first reflective surface area having a relatively slight curvature defining a relatively focused driver field of view, and wherein the first reflective surface area extends from a top edge of said reflective member towards a bottom edge of said reflective member, and from an inside edge of said reflective member towards an outside edge of said reflective member;
   the second and third reflective surface areas each having an increased curvature as compared to the first surface area, and respectively defining wider driver fields of view, wherein the second reflective surface area comprises a longitudinal outside margin of said reflective member opposite the first reflective surface area, and extends from the top edge of said reflective member towards the bottom edge of said reflective member, and wherein the third reflective surface area comprises a longitudinal bottom margin of said reflective member, and extends from an inside edge of said reflective member towards an outside edge of said reflective member; and
   first, second, and third reflective elongated transition zones adjacent respective first, second, and third reflective surface areas, each transition zone having a degree of curvature intermediate the slight curvature of the first reflective surface area and the increased curvature of the second and third reflective surface areas, and said transition zones dividing the first, second, and third reflective surface areas and defining a visual transition between the relatively focused driver field of view provided by the first reflective surface area and the wider driver fields of view provided by the second and third reflective surface areas, and wherein the first transition zone extends longitudinally adjacent and between the first and second reflective surface areas, and has a width dimension greater than 20% of a width of said second reflective surface area, and wherein the second transition zone extends longitudinally adjacent and between the first and third reflective surface areas, and has a width dimension greater than 20% of a width of said third reflective surface area, and wherein the third transition zone extends diagonally adjacent and between the second and third reflective surface areas and has a width dimension equal to the width dimension of said first and second transition zones.

7. A combination according to claim 6, wherein said first reflective surface area is greater in dimension than said second and third reflective surface areas.

8. A combination according to claim 6, wherein said first reflective surface area has a curvature radius in the range of 500 to 3000 mm.

9. A combination according to claim 6, wherein said second reflective surface area has a curvature radius in the range of 300 to 600 mm.

10. A combination according to claim 6, wherein said third reflective surface area has a curvature radius in the range of 200-400.

11. A combination according to claim 6, wherein said situation communication mirror is mounted to a body of the vehicle adjacent at least one of the driver and passenger side doors.

12. A combination according to claim 6, wherein said situation communication mirror is mounted to a body of the vehicle adjacent at least one of the driver and passenger side fenders.

* * * * *